US011991211B1

(12) United States Patent
Gangur et al.

(10) Patent No.: US 11,991,211 B1
(45) Date of Patent: May 21, 2024

(54) SYMMETRIC CROSS-REGION NETWORK DATA FLOW MANAGEMENT

(71) Applicant: Amazon Technologies, Inc., Seattle, WA (US)

(72) Inventors: Hrushikesh Jaibheem Gangur, Cupertino, CA (US); Tomasz Jozef Adamski, San Francisco, CA (US); Christian Elsen, San Francisco, CA (US); Baihu Qian, Chicago, IL (US); Nick Matthews, Westminster, CO (US); Omer Hashmi, Bethesda, MD (US); Bashuman Deb, Aldie, VA (US); Thomas Nguyen Spendley, Rockville, MD (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 17/643,781

(22) Filed: Dec. 10, 2021

(51) Int. Cl.
*H04L 9/40* (2022.01)
*H04L 12/46* (2006.01)

(52) U.S. Cl.
CPC .......... *H04L 63/20* (2013.01); *H04L 12/4675* (2013.01); *H04L 63/0263* (2013.01); *H04L 63/0272* (2013.01)

(58) Field of Classification Search
CPC ............ H04L 12/4641; H04L 12/4675; H04L 41/0806; H04L 41/0893; H04L 63/02–0227; H04L 63/0263; H04L 63/0272; H04L 63/20–205
See application file for complete search history.

(56) References Cited

U.S. PATENT DOCUMENTS 5,361,256 A 11/1994 Doeringer et al.
5,819,071 A 10/1998 Mazer
6,505,228 B1 1/2003 Schoening et al.
8,880,690 B1 11/2014 Kennedy et al.
9,065,738 B2 6/2015 Ennis, Jr. et al.
(Continued)

FOREIGN PATENT DOCUMENTS

CN 110557316 B 6/2021
EP 3681110 A1 7/2020
(Continued)

OTHER PUBLICATIONS

International Search Report and Written Opinion dated Feb. 27, 2023 in PCT Application No. PCT/US2022/050214 in 17 pages.

*Primary Examiner* — Kevin Bechtel
(74) *Attorney, Agent, or Firm* — Knobbe, Martens, Olson & Bear, LLP

(57) ABSTRACT

Systems and methods are provided for enforcing symmetric flows of cross-region network traffic through firewalls in multi-region network environments. Enforcement may be configured automatically by analyzing network policy data to identify cross-region traffic that is to be firewalled, and configuring gateway nodes in the various regions to implement symmetric bidirectional flows through any firewalls in the communication path. Beneficially, by enforcing symmetric bi-directional flows of traffic through any firewalls in a communication path, the firewalls may maintain the state of a given communication session even when the communication session is between endpoints in different regions that have different architectures.

16 Claims, 24 Drawing Sheets

HUB AND SPOKE CONFIGURATION
REGION 2200
REGION 2202
VPN 2210
FIREWALL 2150
VPC 2212
SD-WAN 2214
GATEWAY NODE 140A
GATEWAY NODE 140B
VPC 2220
DIRECT CONNECT 2222
SD-WAN 2224
[A] [B] [C] [D] [E] [F]
SEGMENT 2230
SEGMENT 2232

(56) References Cited

U.S. PATENT DOCUMENTS 9,350,811 B1 * 5/2016 Kiefer .................... G06F 16/27
10,833,992 B1 11/2020 Dickinson
11,171,939 B1 11/2021 Blank et al.
11,310,155 B1 4/2022 Qian et al.
11,799,755 B2 10/2023 Dawani et al.
2003/0189919 A1 10/2003 Gupta et al.
2005/0182839 A1 8/2005 Geoffrion
2015/0372857 A1 12/2015 Hasan et al.
2016/0014025 A1 1/2016 Wang
2016/0218947 A1 7/2016 Hughes et al.
2016/0294631 A1 10/2016 Byrnes et al.
2016/0337206 A1 11/2016 Bugenhagen et al.
2017/0116038 A1 4/2017 Netto et al.
2018/0115514 A1 * 4/2018 Chou ..................... H04L 63/20
2018/0375760 A1 12/2018 Saavedra
2019/0089620 A1 3/2019 Hefel et al.
2019/0312790 A1 10/2019 Hinrichs et al.
2020/0092193 A1 3/2020 Tillotson et al.
2020/0162282 A1 5/2020 Ashaputre et al.
2020/0162362 A1 5/2020 Deb et al.
2020/0162407 A1 5/2020 Tillotson
2020/0169534 A1 5/2020 Fritz et al.
2020/0213224 A1 7/2020 Cheng et al.
2020/0374201 A1 11/2020 Wang et al.
2020/0374216 A1 11/2020 Ganesh et al.
2021/0011466 A1 1/2021 Kephart, Jr. et al.
2021/0111946 A1 4/2021 Wang et al.
2021/0112034 A1 4/2021 Sundararajan et al.
2021/0168125 A1 6/2021 Vemulpali
2021/0266346 A1 8/2021 Gordon et al.
2021/0297429 A1 9/2021 Sundararajan et al.
2021/0306265 A1 9/2021 K A et al.
2021/0314388 A1 10/2021 Zhou et al.
2021/0314423 A1 10/2021 Rolando et al.
2021/0328977 A1 10/2021 Luo et al.
2021/0377166 A1 12/2021 Brar et al.
2021/0392047 A1 12/2021 Jamkhedkar et al.
2022/0029891 A1 1/2022 Wright et al.
2022/0303246 A1 * 9/2022 Miriyala ................ G06F 21/53
2023/0028947 A1 1/2023 Ritter
2023/0164076 A1 5/2023 Dawani et al.

FOREIGN PATENT DOCUMENTS

WO WO 2015/179508 A1 11/2015
WO WO 2023/096811 A1 6/2023

* cited by examiner

SYMMETRIC CROSS-REGION NETWORK DATA FLOW MANAGEMENT

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical virtualization host to be shared among multiple users by providing each user with one or more "guest" virtual machines hosted by the single virtualization host.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
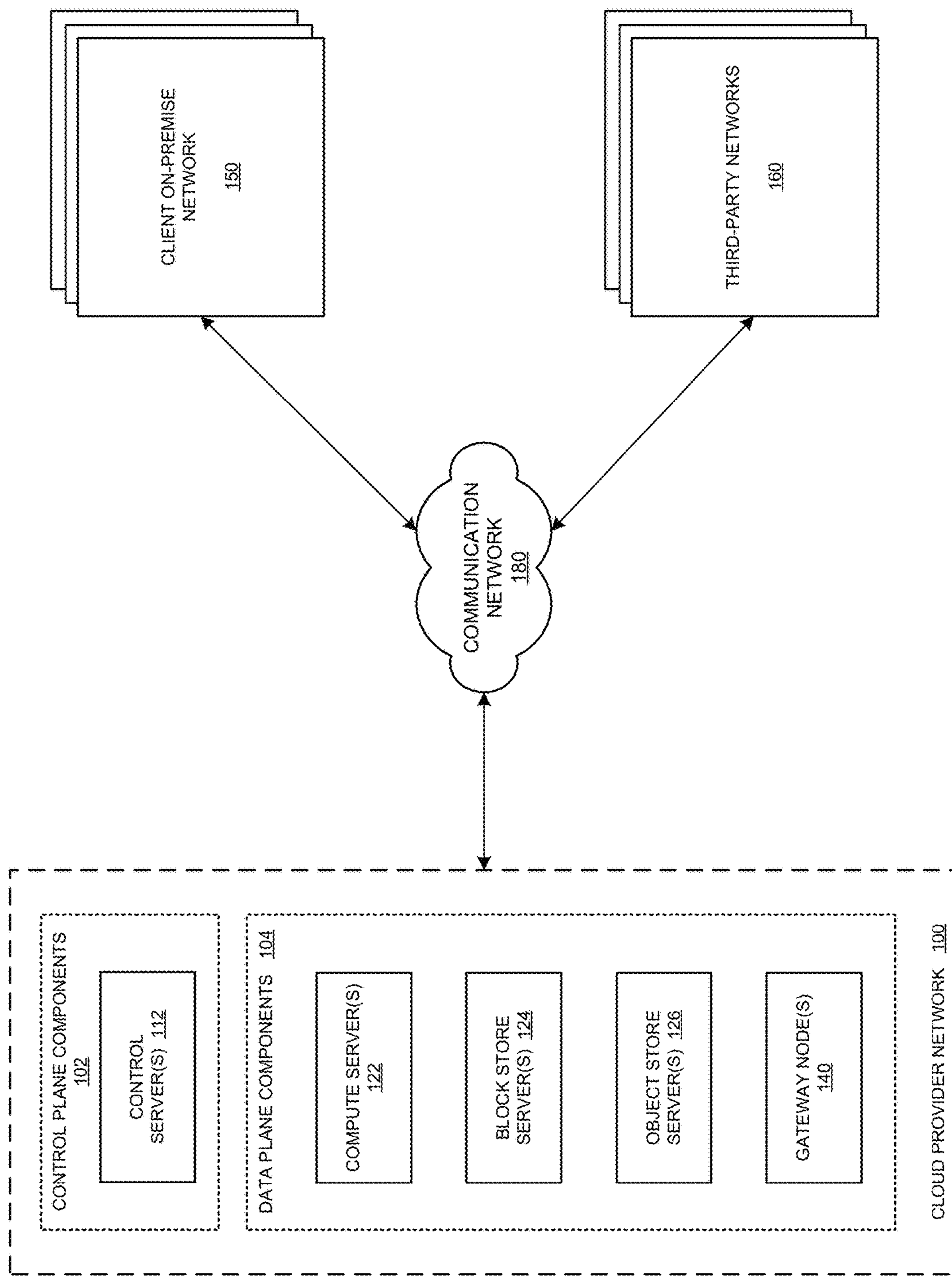
FIG. 1 is a block diagram depicting an illustrative network environment in which cross-region segment management and routing may be implemented according to some embodiments.

Generally described, the present disclosure relates to enforcing symmetric flows of cross-region network traffic through firewalls in multi-region network environments. Enforcement may be configured automatically by analyzing network policy data to identify cross-region traffic that is to be firewalled, and configuring gateway nodes in the various regions to implement symmetric bidirectional flows through any firewalls in the communication path. Beneficially, by enforcing symmetric bi-directional flows of traffic through any firewalls in a communication path, the firewalls may maintain the state of a given communication session even when the communication session is between endpoints in different regions that have different architectures.

Some cloud-based network providers provide clients with access to shared, geographically-dispersed network infrastructure. For example, virtualized compute instances, distributed storage systems, virtual private clouds ("VPCs"), and the like may be hosted within the shared network infrastructure. As another example, clients may connect their on-premise networks to the shared network infrastructure of a cloud-based network provider over a direct physical link (e.g., a "direct connection" or "direct connect" for brevity), through a software-defined wide area network ("SD-WAN"), through a virtual private network ("VPN") tunnel, or the like. Within the shared network infrastructure, networking and interconnectivity-related features may be provided to meet the requirements of applications being implemented using services hosted in the infrastructure. For example, routers or other gateways in different, distinct geographic regions or other physical and/or logical divisions of the network architecture may be peered such that they share routing data and provide end-to-end routing throughout the shared network infrastructure in a manner that is transparent to clients. However, the complexity of such networks due to their size and physical and/or logical separation into regions or other divisions may make it difficult or impossible to implement firewalls that maintain the state of communication sessions and permit traffic accordingly, particularly when there is asymmetry in the manner in which regions manage flows of traffic. Although some conventional networks may implement firewall state sharing, the implementation may be difficult and resource-intensive. To avoid such difficult, resource-intensive firewall state sharing, many conventional networks forgo use of firewalls altogether in certain architectures.

Some aspects of the present disclosure address some or all of the issues noted above, among others, using automated analysis of policy data to determine an architecture for enforcing symmetric data flows through firewalls. Advantageously, this facilitates maintenance of traffic flow state by firewalls without implementing difficult and resource intensive state sharing between firewalls. In some scenarios, regions through which cross-region traffic will flow may each have a firewall, and the policy data may indicate that certain cross-region communications (e.g., communications between endpoints that are not only in different regions, but also in different logical network segments) are to be routed through firewalls in one or more of the regions, while other cross-region communications (e.g., communications between endpoints that are within the same logical network segment even though they may be in different regions) are not to be passed through firewalls. Without special configuration, the bidirectional cross-region communications may take different paths in each direction, with some communications being routed through one firewall and return communications routed through an additional and/or different firewall. In this case, without sharing state between the firewalls, the return traffic is at risk of being dropped due to a firewall in the return path lacking the necessary state to forward the traffic on. To avoid this situation in which communication between regions is effectively blocked, the routers and/or various other gateway nodes in the different regions may be configured to enforce flow symmetry in both directions of a bidirectional cross-region path. For example, traffic in each direction may be forced through firewalls in each endpoint's region, even if firewall rules are not applied in one or another direction. By forcing the traffic in each direction through the firewalls in each endpoint's region, the firewalls can maintain state and avoid blocking traffic that would otherwise be permitted, such as a response to a network connection handshake request. This configuration may be extended to three or more regions in a similar manner, to result in a "full mesh" architecture that enforces traffic symmetricity to preserve firewall state.

In some scenarios, not each region through which cross-region traffic will flow may have a firewall, while the policy data indicates that certain cross-region communications are to be routed through firewalls whenever traffic from an endpoint in one region is sent to an endpoint in another region. To ensure that the traffic is sent through a firewall even when both the source region and destination lack a firewall, and without adding a firewall to each of the regions, the gateway nodes of the regions that lack a firewall may be configured to forward the cross-region traffic specified by the policy to a gateway node of a region with a firewall, from where the traffic will ultimately be forwarded on to the destination in another region. This configuration may be extended to any number of regions in a similar manner, to result in a "hub and spoke" architecture that enforces traffic symmetricity to preserve firewall state. Because the firewall is located in the hub region, firewall rules may be maintained at one location, providing ease of management.

In some scenarios, while reach region though which cross-region traffic will flow may have a firewall, and while the policy data indicates that certain cross-region communications are to be routed through firewalls whenever traffic from an endpoint in one region is sent to an endpoint in another region, it may be desirable to avoid sending cross-region traffic through multiple firewalls in each direction of bidirectional communication path. For example, sending cross-region traffic through multiple firewalls in each direction may introduce latency, increase computing resource requirements and costs, and the like. Thus, to satisfy the network policy represented by the policy data while avoiding the use of multiple firewalls in each direction of a bidirectional communication path, gateway nodes for some regions may be configured to send cross-region traffic on to another region without first going through a firewall, instead relying on the firewall in the other region to satisfy the network policy. However, other traffic of the region, such as intra-region traffic, or traffic associated with other segments, other network policies, and the like may continue to be sent through the firewall. Because the traffic is not forced through multiple firewalls in this configuration, cross-region communications may experience less latency, computing resource requirements, costs, and the like.

Additional aspects of the present disclosure relate to using automated network analysis to recommend and implement an optimal sequence of network mutations that will produce a desired state of a network. A user may define a network or a change to a network using network policy data that includes a high-level declarative statement or series of statements (e.g., a statement or series of statements for adding segmentation to an existing network). To deploy the network or network change represented by the policy statement or set of statements, a set of individual lower-level deployment actions, also referred to as implementation operations, may need to be executed. In some cases, the number of implementation operations may be greater—by one or more orders of magnitude—than the number of policy statements (e.g., dozens, hundreds, or more individual operations to implement a single policy-based network change). Additionally, different sequences in which the implementation operations are preformed may result in different intermediate, transient states even if each sequence results in the same end state. Moreover, different sequences in which the implementation operations are performed may result in different periods of time required to fully implement the network or network change.

To automate the evaluation of the potentially complex interplay between various sequences of implementation operations, the network may be modeled as a set of logical conditions that can be analyzed using a reasoning engine. In some embodiments, the reasoning engine may be or include a datalog solver, a satisfiability modulo theories ("SMT") solver, a first-order theorem prover, or the like. The reasoning engine may obtain the model generated from a formal specification and a snapshot of the network architecture. The formal specification may formalize the semantics of the current configuration and the network architecture. For example, the formal specification details how a route table directs traffic, how a firewall applies rules, or how a load balancer balances a given load. Further, the snapshot may describe the topology and details of the network. For example, the snapshot details the routing devices, the environments, the route tables, the routing rules, etc. associated with a serviced environment. The reasoning engine or some other component may combine the formal specification and the snapshot in order to generate a model that represents the set of paths associated with the network, or from which the set of paths associated with the network can be derived.

For each individual implementation operation, the resulting intermediate state of the network may be modeled by applying the change to the network model. The resulting model of the network's intermediate state may then be analyzed using the reasoning engine to determine whether one or more routing-based criteria and/or other constraints are satisfied. Such an analysis may be used if it is desired to implement the changes in a way that results in a minimal degree of non-compliance with constraints during intermediate transient states of implementation.

In some embodiments, other criteria may be used in addition to, or instead of, compliance with constraints at transient states. For example, each implementation operation may be associated with an average amount of time or range of times that performance of the operation is likely to require. Some operations may be able to be performed in parallel with others, and some operations may also or alternatively be associated with different time averages depending upon the position in a sequence of operations at which they are performed. By considering the performance times in the analysis of various sequences (e.g., by weighting the operations and sequences thereof in proportion to their performance times), automated analysis can produce a sequence of implementation operations that satisfies a desired time-based criterion.

Further aspects of the present disclosure relate to using automated network analysis to determine whether two or more resources are able to communicate with each other in a network when a particular set of routing-based criteria have been implemented. As described above and in greater detail below, the network may be modeled as a set of logical conditions that can be analyzed using a network-based reasoning engine. When it is desired to determine whether two particular resources can communicate (e.g., to validate deployment of a network policy, to troubleshoot network connectivity, etc.), the reasoning engine may perform a static "packetless" analysis (e.g., without sending any data across the network to test reachability) by evaluating the model to determine whether a communication path exists between the two resources. If the resources cannot communicate due to the current implementation of the network, the reason for the lack of communication may be determined and translated into one or more high-level declarative statements of network policy that can be presented to a user. In some embodiments, determining whether two resources can communicate may require analysis of different portions of the network using different techniques or network-based reasoning engines. For example, if one endpoint is in a VPC in one region and/or segment of the network while the second endpoint is in a different VPC in a different region and/or segment of the network, different network-based reasoning engines may be employed: a first tool may be used to evaluate communication within VPC (e.g., from the first endpoint within the VPC to a cross-region gateway at the edge of or outside of the VPC); a second tool may be used to evaluate cross-region communication between various gateways and eventually to a second VPC in which the second endpoint is located; and the first tool again to evaluate communication within the second VPC to the second endpoint. If the communication being evaluated is bi-directional, then the entire process may be repeated in reverse.

Still further aspects of the present disclosure relate to systems and methods to implement isolated segments that span regions or other network divisions. A virtual private cloud-based global wide area network (also referred to as a "VPC global WAN" or simply "VPC-WAN" for brevity) may be configured within a cloud-based network provider's shared network infrastructure (also referred as a "cloud provider network"). The VPC-WAN may be considered "private" in the sense that it is separated from any other traffic and/or clients (including but not limited to other VPC-WANs) sharing the same cloud provider network. Thus, the VPC-WAN may also be referred to more generally as a "private wide area network," or as an example of a "private network." The VPC-WAN may be considered "virtual" and "cloud-based" in the sense that it is implemented on top of the cloud-based network provider's shared network infrastructure rather than being implemented on separate infrastructure of a client.

The VPC-WAN may be configured using network policy data that defines various aspects. For example, the network policy data may define regions encompassed by the VPC-WAN, segments that may span multiple regions within the VPC-WAN but remain isolated or substantially isolated from each other, the manner in which isolated networks (VPCs, VPNs, SD-WANs, direct connections to on-premise client networks, etc.) are to be attached to segments, and the like. Thus, a VPC-WAN may span multiple regions of the cloud provider network, and may include any number of isolated networks that may be hosted within the cloud provider network's physical data centers (e.g., VPCs) or may be physically external to the cloud provider's data centers (e.g., on-premise client networks or third-party networks communicating with the cloud provider network via VPN, SD-WAN, direct connections, etc.). This allows client traffic originating from one endpoint to be transmitted to another endpoint of the VPC-WAN regardless of whether one or both endpoints are within or external to the cloud provider network's physical data centers. Moreover, a client may segment traffic of a VPC-WAN by defining segments within the network policy data using one or more rules for attachment of isolated networks to the segments. For example, a rule for a particular segment may specify that attachments associated with a particular tag are to be automatically associated with the segment. In some embodiments, other rules, attributes, and the like may be specified in the policy data. For example, rules requiring authorization to attach an isolated network to a given segment, rules maintaining isolation of all attachments to a given segment, rules regarding resources to be shared among otherwise isolated attachments or segments, or the like may be defined.

Additional aspects of the present disclosure relate to methods of signaling segment-specific routing data between gateways in different regions or other network divisions. These methods facilitate formation of a cross-region segment from a group of region-specific segments, while ensuring traffic in one such cross-region segment remains isolated from traffic in another cross-region segment even if both segments share some or all of the same regions, gateways, etc. When a route table or other routing data is generated within a region for a region-specific segment, and where that region-specific segment is to be part of a cross-region segment, the routes in the region-specific route table may be signaled to other regions in connection with a region-specific segment identifier. Other gateways in other regions may obtain the route table data and add it to their own segment-specific route tables. In this way, the gateways may build up tables of routing data for all regions of a given segment. Use of the segment identifiers allows routers to maintain different route tables for different segments. Thus, within a given region, a single gateway (e.g., a router or system of routers) may route traffic for multiple segments in the region, while also maintaining isolation between the segments by not sharing routes across segments (unless otherwise permitted or specified).

Further aspects of the present disclosure relate to using packet header metadata to implement policy-based routing. At layer 3 of the of the open systems interconnection ("OSI") model, some networks perform routing operations using packet headers that include a 5-tuple of metadata: source address, such as an internet protocol ("IP") address for the sender of the packet; destination address, such as an IP address for the intended destination of the packet; source port, such as the sender's transmission control protocol ("TCP") or user datagram protocol ("UDP") port from which the packet originated; destination port, such a TCP or UDP port of the intended destination of the packet; and protocol to be used. In some embodiments, to facilitate routing of traffic in a given segment across regions while maintaining isolation among different segments, additional metadata may be added to a packet header to indicate the segment of the source of the packet. For example, the layer 3 packet header may be expanded to a 6-tuple of metadata for routing, with the additional metadata item being a segment identifier. The additional metadata item may be added to the header by a gateway or the sender of the packet (e.g., by the host device from which the packet originates, by a virtual machine instance or hypervisor executing on the host device, etc.). A policy may be implemented at the gateway such that when a packet is received, the gateway may evaluate the segment identifier and determine which routing data (e.g., segment-specific route table) to use to route the packet. In this way, a single gateway or system of gateways within a given region may be able to resolve the segment to which the packet belongs, and route traffic for multiple segments that include the region while also maintaining isolation between the segments by using segment-specific route information.

Still further aspects of the present disclosure relate to using metadata and/or metrics to select a particular path to a particular destination, among all available paths to the destination. In some embodiments, when a gateway is selecting a path to update a route table, the gateway may use a dynamic, optimized best path selection between any two points based on multiple factors, such as: number of hops, physical distance between each hop, network latency between each hop, packet loss between each hop, jitter between each hop, link utilization between each hop, or the like.

Various aspects of the disclosure will now be described with regard to certain examples and embodiments, which are intended to illustrate but not limit the disclosure. Although aspects of some embodiments described in the disclosure will focus, for the purpose of illustration, on particular examples of network regions, divisions, segments, metadata, gateways, and signaling protocols, the examples are illustrative only and are not intended to be limiting. In some embodiments, the techniques described herein may be applied to additional or alternative network regions, divisions, segments, metadata, gateways, signaling protocols, and the like. Any feature used in any embodiment described herein may be used in any combination with any other feature, without limitation.

Overview of Example Computing Environment

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience), any number of client on-premise networks 150 (also referred to herein simply as "on-premise networks" for convenience) external to the cloud provider network 100, and any number of third-party networks 160 external to the cloud provider network 100. The cloud provider network 100, on-premise networks 150, and third-party networks 160 may communicate with each over via a communication network 180, such as an intranet or the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of central processor units ("CPUs") and graphics processing unites ("GPUs"), optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for clients to access cloud infrastructure by allowing clients to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their clients or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas. The disclosed techniques can provide clients with a cloud wide area network ("WAN") service that enables them to use the cloud provider backbone network to connect their own on-premise networks (as well as their networks hosted on the cloud provider network) to one another.

Clients can connect to availability zones of the cloud provider network via a publicly accessible network (e.g., the Internet, a cellular communication network). Transit Centers ("TC") are the primary backbone locations linking clients to the cloud provider network, and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or "PoPs"). In some implementations, the cloud provider network can include one or more cellular networks managed and provided by the cloud provider, which can include access points at a client's premise and which can use in-region resources to run various parts of the network. Clients can connect their premises to one another using the disclosed cloud WAN service via TCs, cloud-provided cellular networks, and/or edge locations.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a client network that hosts client resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes client resources that are implemented on the cloud provider network 100 (e.g., computing instances, containers, block storage volumes, databases, file storage, etc., as described in greater detail below). Data plane traffic generally includes non-administrative operations such as transferring data to and from the client resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more clients. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane can also include one or more block store servers 124, which can include persistent storage for storing volumes of client data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Clients can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Clients may use buckets to store objects of a variety of types, including machine images that can be used to launch VMs, and snapshots that can be used to restore volumes.

In some embodiments, the data plane may include one or more gateway nodes 140 configured to implement aspects of the present disclosure for routing data packets through the cloud provider network 100 from sources to destinations. A gateway node 140 may be implemented on a device (e.g., router, server, etc.) or set of devices separate from storage servers and compute servers of the data plane 104. In some embodiments, a gateway node 140 may share one or more virtualized servers with storage or compute servers. In some embodiments, gateway nodes 140 or certain modules or components thereof may be part of the control plane such that they are control plane components 102.

Some clients may desire to use the resources and services of the cloud provider network 100, but for various reasons (e.g., latency in communications with client devices, legal compliance, security, or other reasons) prefer for these resources and services to be provisioned within their own network, for example on premises of the client. A piece of the cloud provider network—referred to herein as a "provider substrate extension" or PSE—may be provisioned within the client's network. A client may access their PSE via the cloud provider network 100 or their own network, and may use the same APIs to create and manage resources in the PSE as they would use to create and manage resources in the cloud provider network 100 region.

The PSE may be pre-configured, e.g., by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the client network. As described above, the cloud provider network 100 may offer a set of predefined instance types, each having varying types and quantities of underlying hardware resources. Each instance type may also be offered in various sizes. In order to enable clients to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to client devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a client workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a client or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the client who owns the premises (and any other accounts allowed by the client). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with client resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to client devices and/or workloads.

Cross-Region Segmentation

Figure 2:
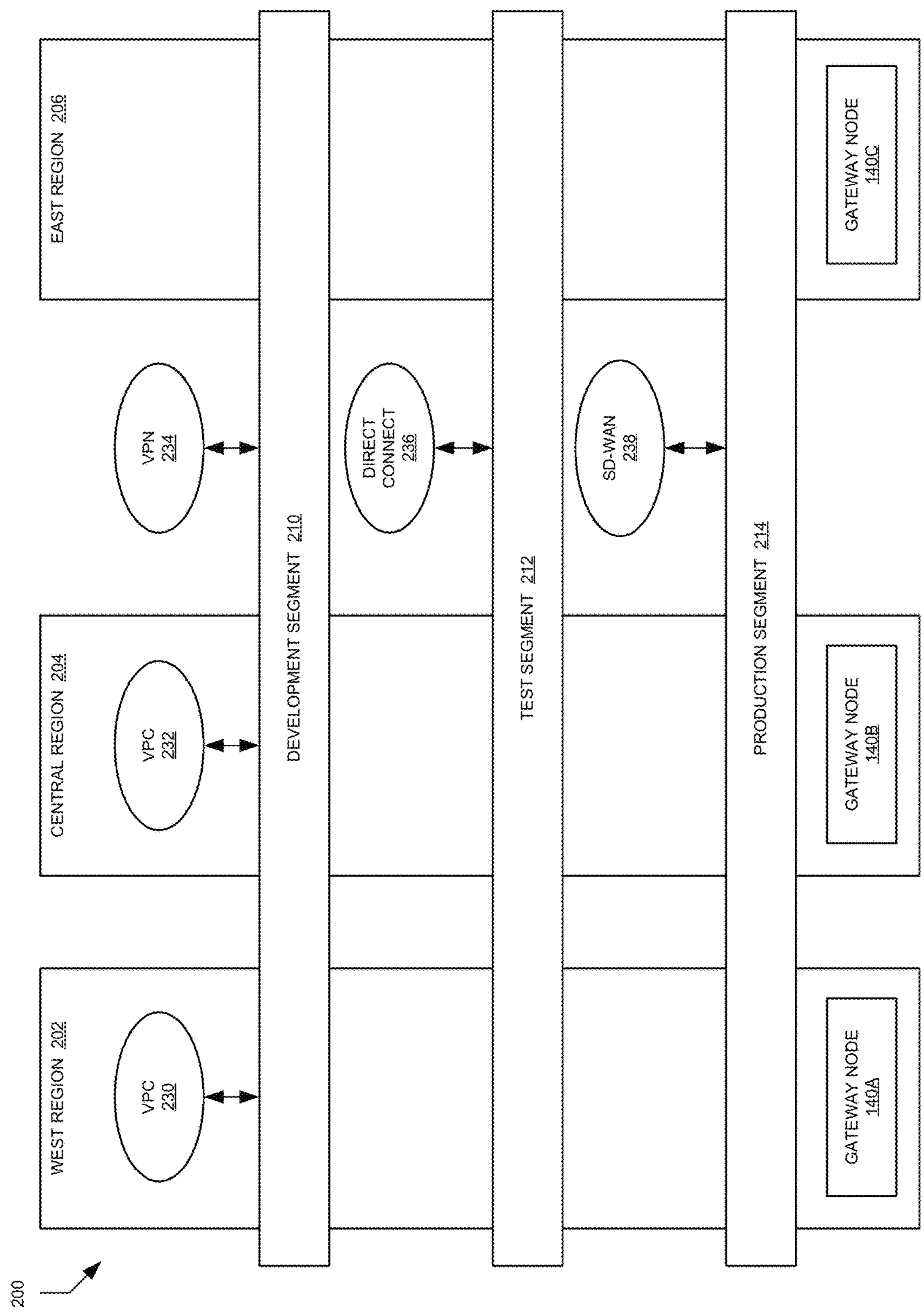
FIG. 2 is a block diagram depicting an illustrative virtual private cloud-based wide area network including multiple regions, segments, and attached isolated networks according to some embodiments.

FIG. 2 illustrates an example of a VPC-WAN 200 implemented at least in part using hardware and services of the cloud provider network 100. For example, the VPC-WAN 200 may be implemented using a cloud WAN service of the cloud provider network 100.

The example VPC-WAN 200 encompasses multiple regions of the cloud provider network 100: west region 202, central region 204, and east region 206. As described herein, each region may be implemented as an autonomous system in a different geographic location than each other region. For example, the hardware components of each region may be located in a physically separate data center in a geographically different region of the world than the hardware components of each of the other regions.

To facilitate cross-region communication, each region may include one or more gateway nodes. The gateway nodes may serve as routers to forward packet traffic originating inside the corresponding region to another region in which the packet destination may be located or which may be closer, from a networking perspective, to the destination. Gateway nodes may also serve as routers to forward packet traffic originating outside the corresponding region (e.g., traffic originating from another region) to a destination inside the region, or to another region.

In the illustrated example, west region 202 is shown having gateway node 140A, central region 204 is shown having gateway node 140B, and east region 206 is shown having gateway node 140C. However, the example is for purposes of illustration only, and is not meant to be limiting, required, or exhaustive. In some embodiments, a VPC-WAN 200 may have additional, fewer, and/or alternative regions. In some embodiments, a given region may have two or more gateway nodes (e.g., one or more gateway nodes in each availability zone of the region). In some embodiments, one region may have a different number of gateway nodes and/or AZs.

The VPC-WAN 200 has been segmented into different segments: a development segment 210, a test segment 212, and a production segment 214. The segments remain isolated from each other even though they each encompass the same regions. Conventionally, because the segments cross regional boundaries and encompass the same regions, it would be difficult or impossible to maintain isolation of the segment traffic without also using separate routers or other gateways for each segment. Advantageously, by tagging packets with segment identifiers and using separate routing data for each segment as described in greater detail below, a single gateway node may maintain isolation of segment-specific traffic for multiple segments within a region, and segment traffic may remain isolated from other traffic of other segments even when crossing regions.

Segments may be used to isolate various portions of the VPC-WAN 200 from each other, and/or to facilitate ease of communication between different portions of the VPC-WAN 200 even across regions. The segment construct may be particularly useful when incorporating isolated networks into the VPC-WAN. The process of incorporating an isolated network into a VPC-WAN may be referred to as "attaching" the isolated network, and the attached isolated network may be referred to as an "attachment."

Isolated networks may be implemented within the cloud provider network 100 (e.g., within one or more regions), or may be implemented external from the cloud provider network 100 (e.g., at an on-premise client network 150 or a third-party network 160). For example, the client managing the VPC-WAN 200 may implement a VPC 230 within west region 202. As another example, a second client may implement VPC 232 within central region 204, and may be permitted to attach the VPC 232 to a segment of the first client's VPC-WAN 200 (e.g., the development segment 210). As another example, the client may attach an on-premise network 150 via a VPN 234 (shown attached to development segment 210), direct connect 236 (shown attached to test segment 212), and/or SD-WAN 238 (shown attached to production segment 214). As a further example, a second client may attach a third-party network 150 via a VPN 234, direct connect 236, or SD-WAN 238.

Figure 3:
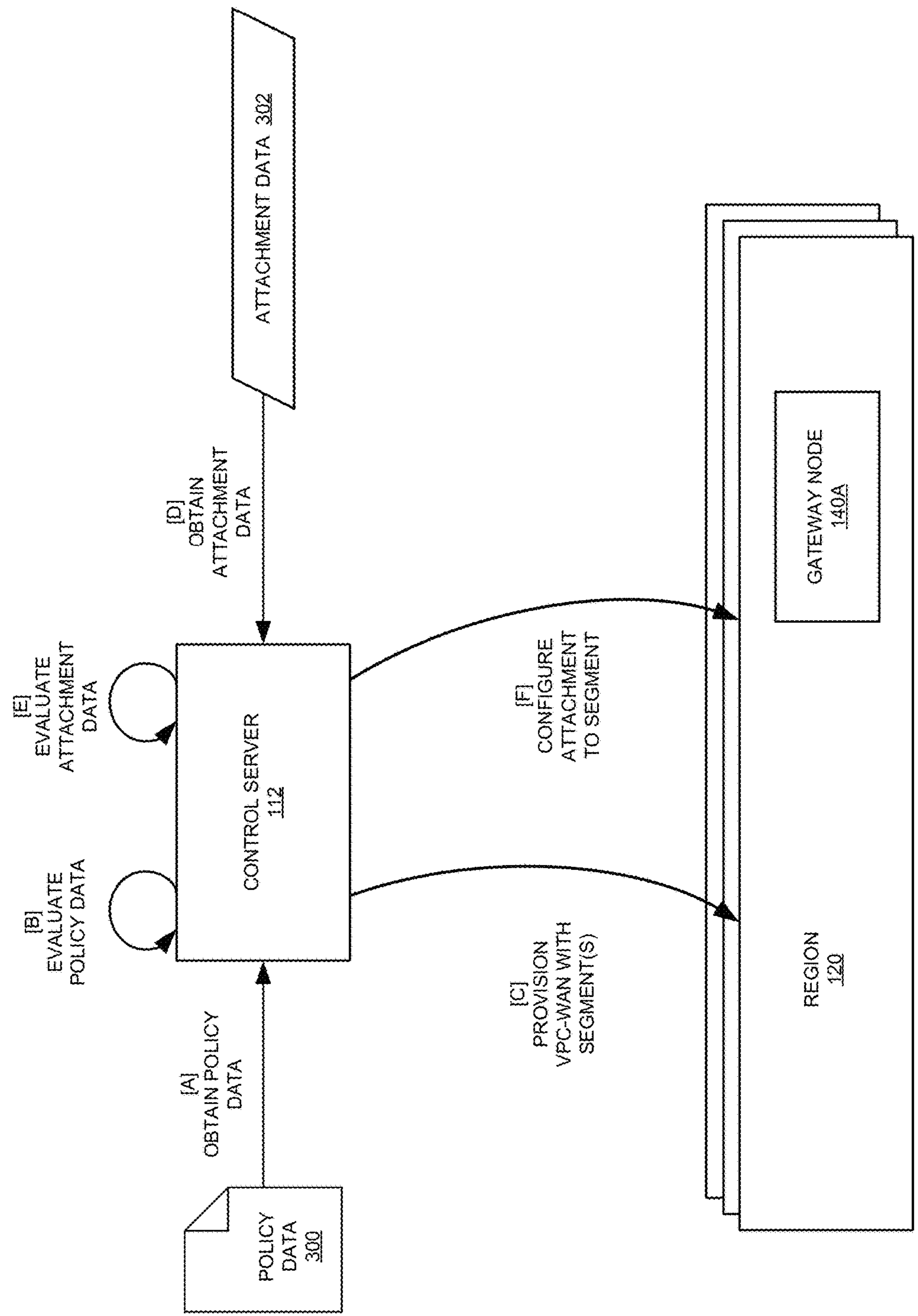
FIG. 3 is a block diagram of illustrative data flows and interactions to provision and manage a segment according to some embodiments.

FIG. 3 illustrates example data flows and interactions between a control server 112 and other components of a cloud provider network 100 to provision a VPC-WAN, define segments of the VPC-WAN, and attach isolated networks to the VPC-WAN.

At [A], the control serer 112 may receive or otherwise obtain policy data 300 for configuring a VPC-WAN. The policy data 300 may include metadata describing attributes of the VPC-WAN to be configured. For example, the policy data 300 may include details regarding the regions of the cloud provider network to be encompassed by the VPC-WAN, gateway node configuration information, segments to be defined within the VPC-WAN, routing behavior for the segments, and/or an attachment policy defining how attachments are to be mapped to segments. In some embodiments, the policy data 300 may be obtained in a standardized format, such as a JavaScript Object Notation ("JSON") document, an Extensible Markup Language ("XML") document, YAML Ain't Markup Language ("YAML") data, or the like.

Table 1 below provides an example of policy data 300 represented as a JSON document. Some portions of the example document use the placeholder "<data>" for entire sections or for values of individual keys within a section.

TABLE 1

```
{
  "version": <data>,
  "core-network-configuration" : {
    <data>
    }
    "edge-locations" : [
      <data>
    ]
  },
  "segments": [
    {
      "name" : "dev",
      "require-attachment-acceptance" : false
    },
    {
      "name": "test",
      "edge-locations": ["central"]
    },
    {
      "name": "prod",
      "isolate-attachments": true
    },
  ],
  "segment-actions" : [
    {
      "action": "create-route",
      "destination-cidr-blocks" : ["0. 0. 0. 0/0"],
      "segment": "prod",
      "destinations": <data>
    }
  ],
  "attachment-policies" : [
      {
        "rule-number": 1000,
        "conditions": [{
```

TABLE 1-continued

```
            "type": "tag-exists",
            "key": "dev"
        }],
        "action": {
          "association-method": "tag",
          "tag-value-of-key": "dev"
        }
      },
    ]
}
```

At [B] the control server 112 can evaluate the policy data 300 to determine the actions needed to provision the VPC-WAN. Using the example policy data 300 in Table 1, the control server 112 may evaluate the "core-network-configuration" section, the "segments' section, the "segment-actions" section, the "attachment-policies" section, or some subset thereof as defined within the policy data 300 and as needed to provision the VPC-WAN.

The "core-network-configuration" section may define the high-level definition of a core network (e.g., the portion of the VPC-WAN that is within the cloud provider network). For example, it may specify one or more regions in which to operate, and regional routing settings.

The "segments" section may define the segments to be implemented. Each segment may be implemented as a completely separated routing domain. This section may be used to provide descriptions, change defaults, provide explicit regional operational and route filters, and the like for each segment of the VPC-WAN. The names defined for each segment may be used in other sections, such as the "segment-actions" and "attachment-policies" sections. In some embodiments, defaults that may be overridden and other configuration settings that may be set for a given segment include: an optional definition of "edge-locations" for the segment, when the segment is restricted to fewer than all available edge locations (e.g., regions) defined in the "core-network-configuration" section; an optional "isolate-attachments" setting that specifies whether attachments on the same segment can communicate with each other (e.g., a sandbox segment, such as a development segment in which VPCs should be prohibited from communicating with each other); a "require-attachment-acceptance" setting that specifies whether isolated networks are automatically approved or require acceptance in order to be attached to the segment; a "deny-filter" setting that will prune routes from listed segments after routes have been shared, resulting in prohibition of the two segments from sharing routes with each other; and/or an "allow-filter" setting that will only allow routes from listed segments.

The "segment-actions" section may define routing behavior between segments. In some embodiments, attachments may only communicate with other attachments in the same segment by default, thus ensuring complete isolation of segments. The "segment-actions" section may be used to create connectivity. In some embodiments, segment actions may include a "share" action that enables attachments from two different segments to reach each other. For example, if a segment is set to "isolate-attachments" (e.g., in the "segments" section described above), attachments may not be able to communicate via the segment with any other attachment on the same segment, nor with any other segment (when by default segments are isolated from each other). The "share" action creates routes between attachments in the segments listed for the action. This may be useful to, e.g., set up a shared resources segment that may be reached from one or more other segments. In some embodiments, segment actions may include a "create-route" action to create static routes in the segment.

The "attachment-policies" section may be used to define how attachments are mapped to a segment. For example, an isolated network may be attached to a segment by specifying particular of the isolated network such as identifier. This process may be used to manually manage attachments. In some embodiments, instead of manually associating a segment to each attachment, attachments may be tagged with a defined tag to associate the attachment with the corresponding segment. The "attachment-policies" section may include one or more rules, each of which may include one or conditions to automatically determine when an action is to be taken related to attaching a particular isolated network to a particular segment. Some types of conditions may include a "type," "operator," "value," and/or "key" for use in evaluating the rules. For example, a rule may be a string-matching rule that specifies any attachment with a tag of a particular key (e.g., "environment") that satisfies a conditional operator with respect to a value (e.g., "equals" and "production") is to be automatically attached to a corresponding segment (e.g., the "production" segment). Additional examples of actions may include whether acceptance from a designated entity (e.g., an administrator of the VPC-WAN) is required for attachment.

The example policies, rules, and actions shown in Table 1 and described herein are illustrative only, and are not intended to be limiting, required, or exhaustive. In some embodiments, additional and/or alternative policies, rules, and actions may be implemented.

At [C] the control server 112 may provision the VPC-WAN based on evaluation of the policy data 300. To provision the VPC-WAN, the control server 112 may assign one or more gateway nodes in each region encompassed by the VPC-WAN. Within individual regions, the control server 112 may generate region-specific segment identifiers for use by the gateway nodes to differentiate packets in the various segments that may encompass the respective regions. For example, within region 202, there are three segments 210, 212, and 214. A separate segment identifier may be generated for each of the segments, and the gateway node 140A may be configured with separate routing data (e.g., separate route tables) for each of the segment identifiers. In some embodiments, multiple gateway nodes 140 may configured in this way, such as when the region is composed of multiple AZs as described herein.

Across regions, the control server 112 may implement policies within the gateway nodes so that they can determine appropriate routing data to use and route packets for specific segments accordingly. The policy-based routing may rely on metadata within packet headers indicating the segment identifier of the segment from which that packet was sent, as described in greater detail below. Additional polies may be implemented based on the policy data 300, such as application of route filters (e.g., based on deny-filter and/or allow-filter data), static route sharing, and the like.

In some embodiments, the policy data 300 may specify specific isolated networks to be attached to specific segments instead of—or in addition to—dynamic tag-based attachments that will be evaluated at a later time. Based on such assignments, the control server 112 may configure the attachments (e.g., by adding routes to segment route tables, configuring security settings, or the like).

Once the VPC-WAN has been configured using policy data 300, the client may begin attaching isolated networks to segments and transmitting data across the network. Illustratively, the data may originate from within or outside of the cloud provider network, and/or may be directed to a destination that is within or outside of the cloud provider network. For example, an on-premise network 150 may transmit data to a different on-premise network 150, or to an in-cloud VPC 230, or vice versa, via the VPC-WAN.

At [D], the control server 112 may receive attachment data 302 regarding an attachment operation to be performed. In some embodiments, a user (e.g., administrator) affiliated with the client or a third-party entity may initiate attachment of an isolated network to the VPC-WAN via an application programming interface ("API"), a graphical user interface ("GUI"), or by some other interface. For example, the client may configure a VPC 232 and add a tag to the VPC 232 such that an attachment policy of the policy data 300 is triggered.

At [E], the control server 112 may evaluate the data regarding the attachment operation to be performed (e.g., data identifying the isolated network, a tag associated therewith, etc.) with respect to the policy data 300 in order to determine how the attachment is to be configured. The control server 112 may then configure the attachment at [F]. For example, routing data for the attachment may be added to a segment-specific route table of the gateway node 140A.

Figure 4:
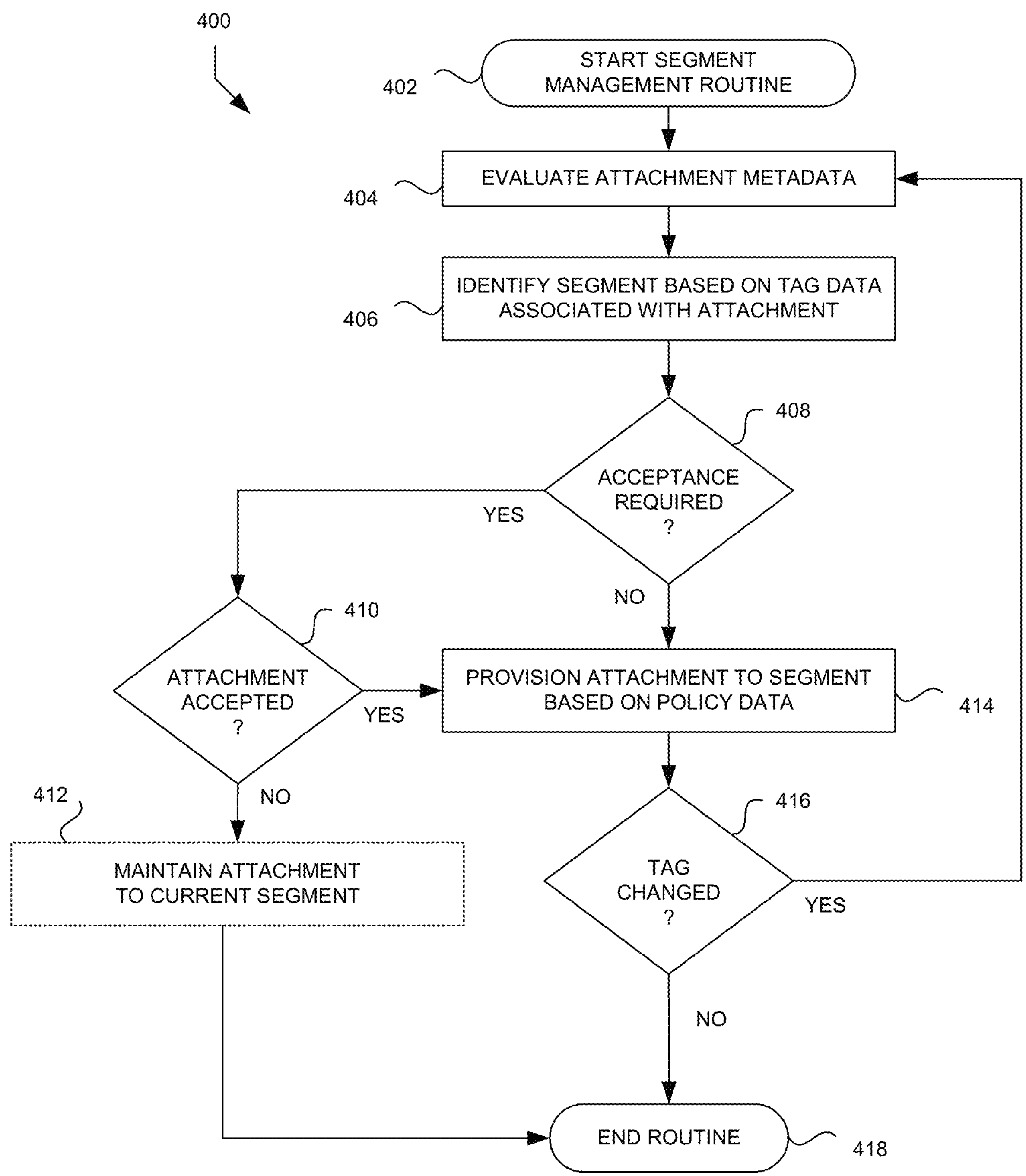
FIG. 4 is a flow diagram of an illustrative routine that may be executed to provision and manage a network and segments according to some embodiments.

FIG. 4 is a flow diagram of an example routine 400 that a control server 112 may execute to manage attachment of isolated networks to segments of VPC-WANs according to some embodiments. Advantageously, the routine 400 makes use of tags associated with isolated networks and segments in order to provide dynamic attachments that may be changed when the underlying attachment policy changes (e.g., when there is a change in an attachment rule) and/or when a tag associated with an isolated network is changed.

The routine 400 beings at block 402. In some embodiments, routine 400 may begin in response to an event, such as startup of operation of a control server 112, receipt of data regarding initiation of an attachment, or in response to some other event.

At block 404, the control server 112 or some other module or component may evaluate attachment metadata associated with the attachment operation. The attachment metadata may be associated with the isolated network to be attached to the VPC-WAN. For example, the attachment metadata may include a unique identifier of the isolated network, a tag, other data, or some combination thereof.

At block 406, the control server 112 or some other module or component may identify a segment to which the isolated network is to be attached based on tag data associated with the isolated network. For example, the control server 112 may evaluate policy data 300 and identify an attachment rule that the tag data and/or other attachment metadata satisfies.

At decision block 408, the control server 112 or some other module or component may determine whether acceptance of the attachment is required before it may be completed. In some embodiments, the determination may be based on segment metadata specified in the policy data 300. For example, in the policy data shown in Table 1, a segment named "dev" is associated with the attribute "'require-attachment-acceptance': false." In this case, if the attachment that is the subject of the current iteration of routine 400 is to be made with respect to the development segment 210, then no acceptance may be required, and the routine 400 may proceed to block 414. Otherwise, if acceptance is required, the routine 400 may proceed to decision block 410 where an entity of the client managing the VPC-WAN (e.g., an administrator) is prompted to accept the attachment.

At block 414, the control server 112 or some other module or component may provision the attachment to the associated segment based on the policy data 300. Provisioning the attachment may involve incorporating, into routing data associated with the segment, routes to destinations within the isolated network.

At decision block 416, the control server 112 or some other module or component may determine whether a tag association of the isolated network has changed. For example, a user may reconfigure the isolated network or otherwise change the tag with which the isolated network is associated. Such a configuration change may affect the attachment of the isolated network, such as by changing the segment to which the isolated network is attached, or changing the attributes of the connection itself. If the tag has changed, the routine 400 may return to block 404. Otherwise, if the tag is not changed, the routine 400 may terminate.

Returning to block 404, the control server 112 may evaluate attachment metadata, and at block 406 the control server may identify a segment based on tag data associated with the attachment. At decision block 408 the control server 112 may determine whether acceptance is required for the changed attachment configuration, and at decision block 410 the control server may determine whether acceptance data has been received indicating the attachment has been accepted. In some embodiments, if the attachment has not been accepted, the routine 400 may proceed to block 412 where the isolated network remains attached to its current segment, rather than being detached and effectively removed from the VPC-WAN.

Figure 5:
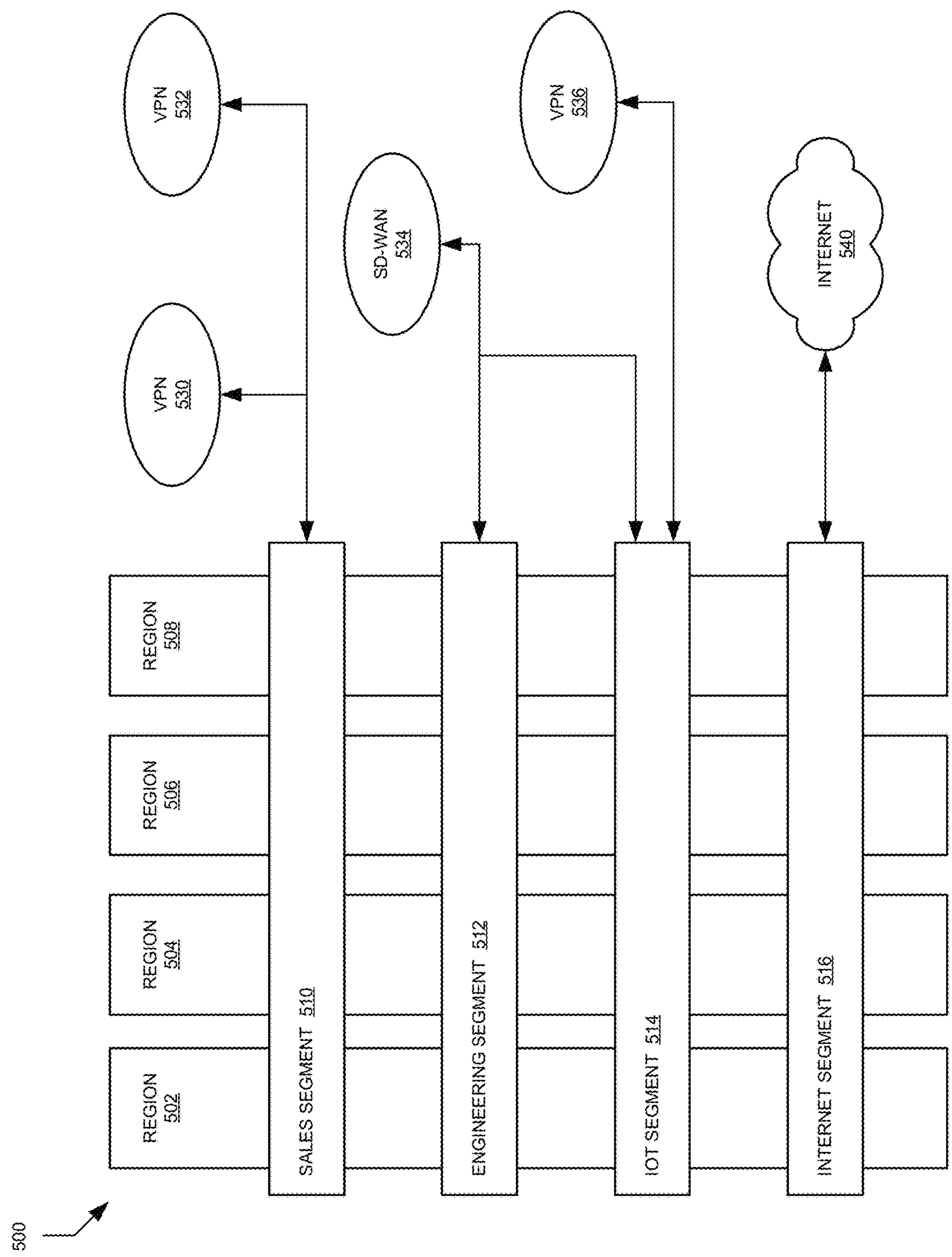
FIG. 5 is a block diagram of an illustrative virtual private cloud-based wide area network in which multiple segments have been provisioned according to some embodiments.

FIG. 5 illustrates another example VPC-WAN 500 implemented at least in part using hardware and services of the cloud provider network 100. For example, the VPC-WAN 500 may be implemented using a cloud WAN service of the cloud provider network 100.

The VPC-WAN 500 is implemented as "global" WAN that encompasses multiple regions of the cloud provider network 100 and uses the cloud provider network 100 infrastructure to transport data between client on-premise networks 150 and/or third-party networks 160, without necessarily using other compute or storage resources of the cloud provider network 100. For example, this VPC-WAN may have no connectivity to any VPC hosted within the cloud provider network 100. Rather, it uses the cloud provider network 100 as transport between client on-premise networks 150 and for internet access.

The example VPC-WAN 500 encompasses multiple regions of the cloud provider network 100: a first region 502, a second region 504, a third region 506, and a fourth region 508. The regions may correspond to different geographic regions, such as different neighborhoods, cities, counties, states, provinces, countries, and/or continents. In addition, the VPC-WAN 500 includes four segments: a sales segment 510, an engineering segment 512, an internet-of-thing ("IoT") segment 514, an internet segment 516.

There are several isolated networks attached to the segments of the VPC-WAN 500, including: VPN 530 and VPN 532 attached to sales segment 510 and providing tunnels to/from different client on-premise networks; SD-WAN 534 attached to engineering segment 512 and IoT segment 514 and providing access for one or more client on-premise networks; and VPN 536 attached to IoT segment 514 and providing access for one or more client on-premise networks. Table 2 below includes an example of policy data that may be used to define and implement a VPC-WAN such as VPC-WAN 500.

TABLE 2

```
{
   <core network configuration data>
   "segments": [
     {"name": "sales"},
     {"name": "testing"},
     {
       "name": "iot",
       "isolate-attachments": true
     },
     {"name": "internet"},
     {"name": "engineering"}
   ],
   "segment-actions" : [
     {
       "action": "share",
       "mode": "attachment-route",
       "segment": "internet",
       "share-with": ["sales" ]
     },
     {
       "action": "share",
       "mode": "attachment-route",
       "segment": "iot",
       "share-with": ["engineering"]
     },
   ],
   "attachment-policies": [
     {
       "rule-number": 1000,
       "conditions": [
         {
           "type": "tag-exists",
           "key": "Assign-to"
         }
       ] ,
       "action": {
         "association-method": "tag",
         "tag-value-of-key": "Assign-to"
       }
     }
   ]
 }
```

In this example, computing resources in an on-premise network mapped to VPN 530 or 532, attached to sales segment 510, are permitted to access the internet due to the first "share" action which results in a sharing of routes between the segments. IoT segment 514 is under security scrutiny, so attachments within IOT segment 514 cannot reach each other (e.g., SD-WAN 534 cannot communicate with VPN 536 via IoT segment 514). However, SD-WAN 534 may have been deployed to the on-premise engineering networks and parts of the on-premise IoT network. Engineers may require direct access to the on-premise IoT network, which in this example is implemented using a mixture of VPN 536 and SD-WAN 534. In some cases, the SD-WAN 534 will take a direct route between on-premise sites. In other cases, such as when traffic is to cross the on-premise engineering network and on-premise IoT network, the SD-WAN 534 may use the VPC-WAN 500 as transport.

To reduce effort, the policy data uses the "Assign-to" tag to define which segment new attachments should be mapped to. For example, any time an attachment includes a tag "Assign-to: sales" the attachment will be automatically mapped to the sales segment 510. Because no value is provided for a "require-attachment-acceptance" attribute, the default value will be used thereby requiring all attachments to be approved.

Figure 6:
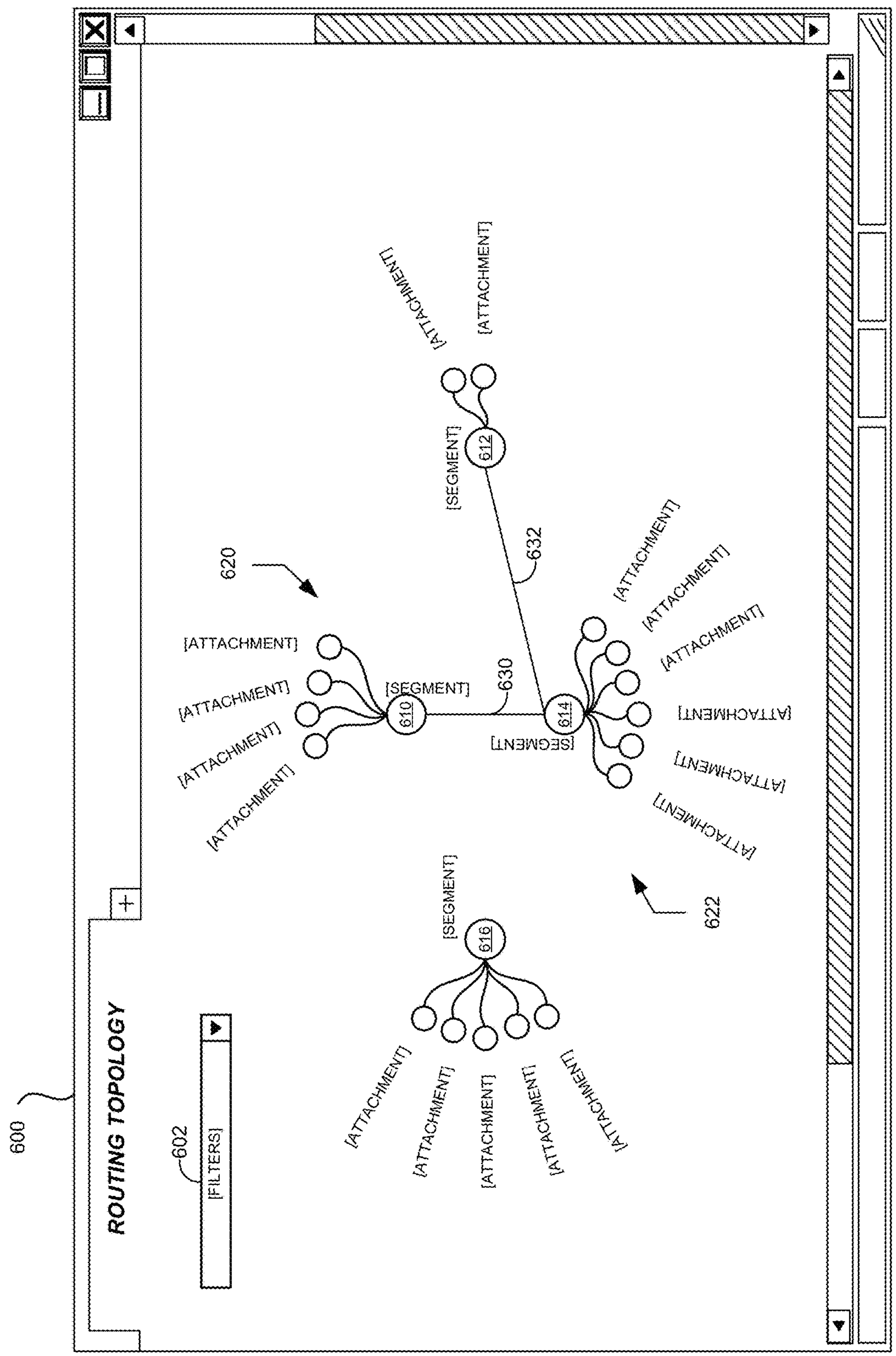
FIG. 6 is a diagram of an illustrative user interface to view and interact with a representation of a virtual private cloud-based wide area network with segments, attachments, and shared routes according to some embodiments.

FIG. 6 illustrates an example user interface 600 that may be used to present a graphical view of a VPC-WAN. In some embodiments, the user interface 600 may be generated as markup language instructions or graphics for a network resource, such as hypertext markup language ("HTML") for a web page.

As shown, a VPC-WAN may be presented as a graph in which display objects, such as nodes 610, 612, 614, and 616, represent respective segments of the VPC-WAN. Attachments are illustrated using display objects, such as node groups 620 and 622 for segment nodes 610 and 614 respectively.

Paths between segments are illustrated by edges 630 and 632, which indicate that the segment represented by node 614 has an available path to and/or from the segments represented by node 610 and/or 612. For example, the segment represented by node 614 may be used to provide shared services to other segments. Node 616 does not have an edge to another node that represents another segment, thus indicating that there is no shared path between the segment represented by node 616 and any other segment.

In some embodiments, a user may apply one or more filters to the user interface 600. For example, filters control 602 may allow selection of various filters, such as filtering the view to a particular on a source and/or destination attachment, segment, etc.

Cross-Region Segment-Based Routing

Figure 7:
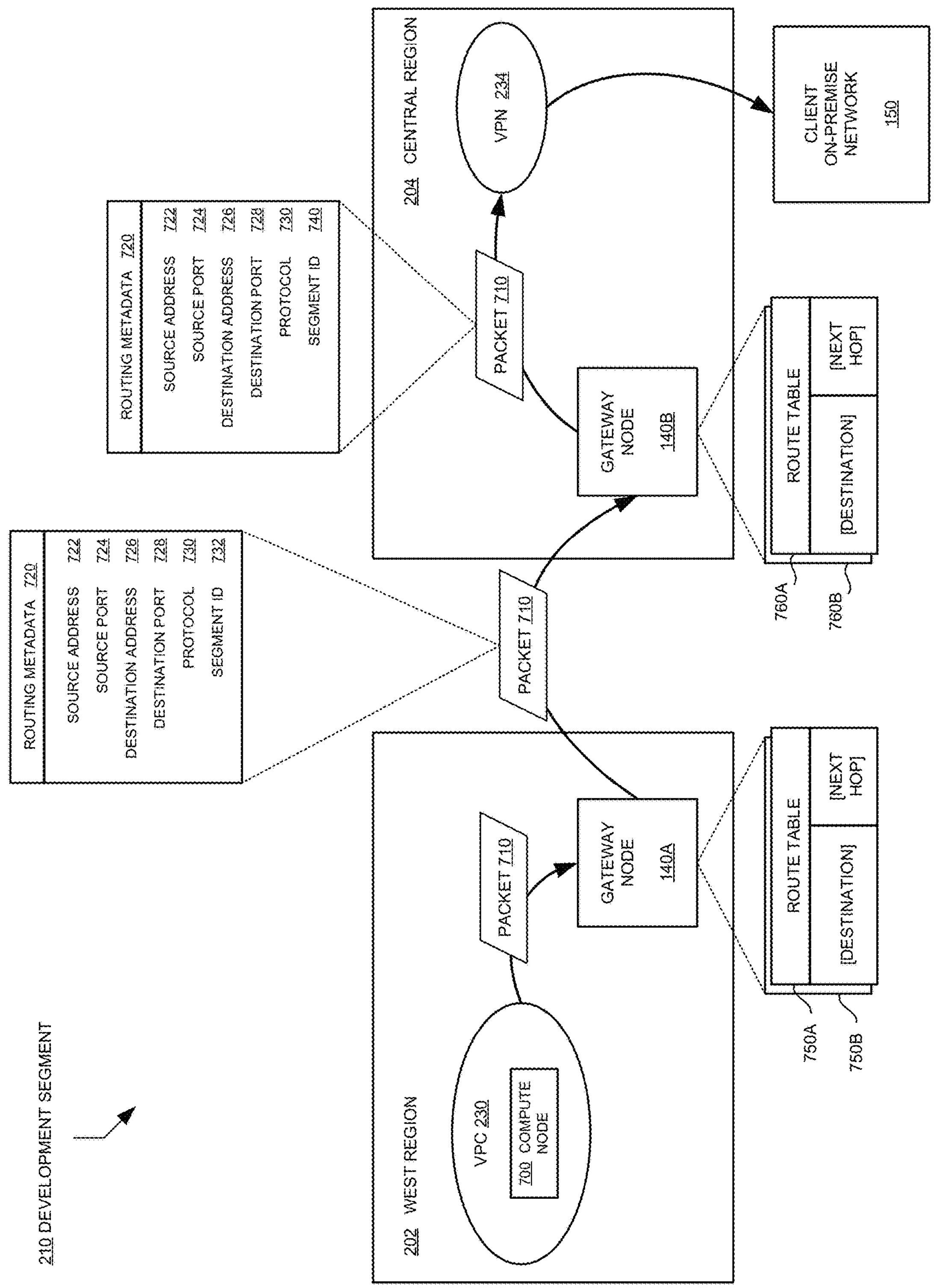
FIG. 7 is a block diagram of illustrative data flows and interactions between gateway nodes and endpoints during policy-based routing of traffic within a virtual cross region segment according to some embodiments.

FIG. 7 illustrates example data flows and interactions between gateway nodes to route a packet within a segment and across regions according to some embodiments.

As shown, a compute node 700 may be located within an isolated network, such as VPC 230, that is within a region, such as west region 202, and is attached to a segment, such as development segment 210. The compute node 700 may initiate transmission of a packet 710 to a destination within the development segment 210, but outside the west region 202.

In some embodiments, the packet 710 transmitted by a compute node 700 to a gateway node 140A within the region 202 may include metadata representing the segment within which the packet is being communicated, or metadata from which the segment can be determined. For example, to facilitate intra-segment cross-region routing of the packet 710, the compute node 700 or a component thereof (e.g., a VM or hypervisor) may include, in routing metadata 720 of the packet 710, a segment identifier 732. As another example, the packet 710 may include a metadata item other than a segment identifier, and a policy may be implemented in the gateway node 140A that maps the metadata item to a particular segment and/or route table for routing the packet 710.

In some embodiments, the routing metadata 720 may be, or be included in, a packet header. For example, some conventional layer 3 networks use a packet header that includes a 5-tuple of routing metadata: source address, source port, destination address, destination port, and protocol. The routing metadata 720 may be augmented with an additional metadata item: a segment identifier. Thus, the packet header of packet 710 may include a 6-tuple of routing metadata 720: source address 722, source port 724, destination address 726, destination portion 728, protocol 730, and segment identifier 732.

Packet 710 may be received by the gateway node 140A for the region in which the packet originates (or in which the packet originally enters the cloud provider network 100). The gateway node 140A may maintain a plurality of route tables such that routing data for certain segments may be maintained and used separately from routing data for other segments. For example, if the gateway node 140A is configured to route packets for two segments, the gateway node

140A may maintain at least a first route table 750A for a first segment and at least a second route table 750B for a second segment. The different route tables for different segments may include different segment-specific routing data, and may therefore be different from each other. For example, routes specific to the first segment may not be included route table 750B for the second segment (unless the segment is configured to share routes across segments as described elsewhere herein).

Gateway node 140A may be configured to evaluate the routing metadata 720 in the packet 710, and determine the route table to use to route the packet. For example, a policy may specify that the gateway node 140A is to determine which route table to use based on a source and/or destination of a packet, and obtain routing data from the determined route table. In the illustrated example, gateway node 140A may select, from route table 750A, a route to the gateway node 140B in a different region (central region 204). In some embodiments, the route table 750A may include or be associated with a segment identifier for the segment. The gateway node 140A may include the segment identifier in routing metadata 720, shown as segment identifier 732 in the illustrated example.

In some embodiments, a packet 710 may already include metadata representing a segment identifier 732 when received by the gateway node 140A, even when received from a source within or attached to the region in which the gateway node 140A is operating. The gateway node 140A may be configured to evaluate the routing metadata 720 in the packet 710, determine the segment identifier 732 included therein, and select a route table 750A or other set of routing data to be used to route packets in the segment with which the segment identifier 732 is associated. In the illustrated example, gateway node 140A may select a route to the gateway node 140B in a different region, the central region 204.

Gateway node 140B may be configured to evaluate the routing metadata 720 in the packet 710, determine the segment identifier 732 included therein. Based on a routing policy that the gateway node 140B is configured to apply, the gateway node 140B may select route table 760A to be used based on the segment identifier 732. In the illustrated example, gateway node 140B may select a route to a node in a client on-premise network accessible via a VPN 234.

In some embodiments, the segment identifier 732 that is included in packet header routing metadata 720 may be a region-specific segment identifier. For example, the cross-region segment 210 may be composed of a set of region-specific segments. Each region-specific segment may have its own segment identifier. Through application of routing polices at gateway nodes 140A and 140B, the individual region-specific segments may form the basis of a cross-region segment and may, in some cases, be completely transparent to users. In these embodiments, the gateway node in receipt of a packet from a different region may modify the routing metadata to include a segment identifier for the corresponding region-specific segment in the region of the gateway node. For example, gateway node 140B may replace the routing metadata in the original header of the packet 710, by including its own region-specific segment identifier as segment identifier 740.

Although the illustrated example includes different route tables for different segments, the example is illustrative only and is not intended to be limiting. In some embodiments, all routing data used by a given gateway node 140 may be maintained in a single route table, and routes may be tagged with a segment identifier of the segment for which they may be used. In some embodiments, a VPC-WAN may include only a single segment. In such cases, each of the one or more route tables maintained by a gateway node 140 may be used for the single segment. Optionally, a segment identifier of the single segment may still be included in routing metadata 720. In this way, the infrastructure and processing for multiple segments can be extended for use in cases where only a single segment is being used.

Dynamic Segment-Based Routing Data Exchange

Routing data may be exchanged among gateway nodes in different regions. For example, paths that include more than one gateway node may be required for transferring traffic between isolated networks, such as in scenarios in which the traffic has to be transmitted across continental, national, state or regional boundaries. Pairs of gateway nodes may be programmatically associated with each other for such traffic. Such association may be referred to as a "peering attachment" or more simply as "peering," and the associated gateway nodes may be said to be "peered" with one another. To enable cross-region routing of traffic associated with a particular segment, routing data may be associated with an identifier of the segment from the source region so that other regions may be configured to associate traffic from that source region with a correct routing table.

Figure 8:
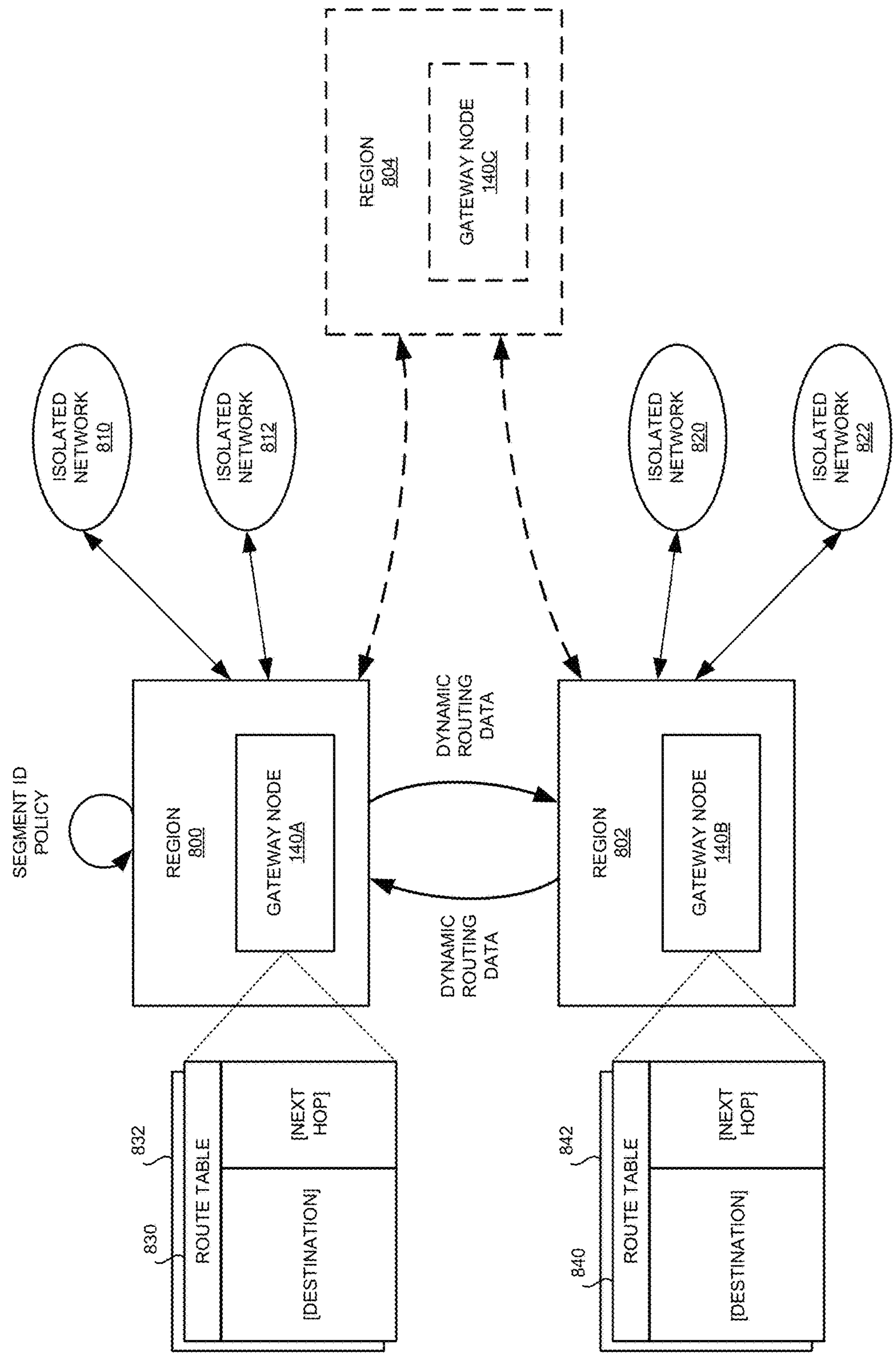
FIG. 8 is a block diagram of illustrative data flows and interactions between gateway nodes during signaling of segment-specific routing data according to some embodiments.

FIG. 8 illustrates an example in which dynamic routing involving the exchange of routing data using an exchange protocol, such as Border Gateway Protocol ("BGP"), may be enabled for a peered pair of gateway nodes. A pair of gateway nodes 140A and 140B may be configured or established, e.g., in response to programmatic requests of one or more clients of the cloud provider network. Illustratively, gateway node 140A may be established in a first geographic region 800 of the cloud provider network 100, and gateway node 140B may be established in a different geographic region 802 of the cloud provider network 100.

The gateway nodes 140A and 140B may be programmatically peered to one another, and to one or more isolated networks, in response to programmatic attachment requests (e.g., submitted by the clients on whose behalf the gateway nodes and the isolated networks are configured). A given attachment with a gateway node may be a peering attachment which associates two gateway nodes, or may belong to one of several isolated network attachment categories, such as: a direct connect attachment in which an isolated network at a client premise connected via a dedicated physical link to the cloud provider network and associated with a gateway node; a VPN attachment in which an isolated network at a client premise is connected via one or more VPN tunnels to the cloud provider network and is associated with a gateway node; an SD-WAN attachment in which a client's on-premise SD-WAN appliance is connected with the cloud provider network and associated with a gateway node; an isolated virtual network attachment which associates an isolated virtual network of a virtualized computing service (e.g., a VPC) with a gateway node; etc.

In the example illustrated in FIG. 8, isolated network 810 (e.g., a VPC hosted within region 800 of the cloud provider network 100) and isolated network 812 (e.g., a client on-premise network accessed using VPN tunnels) may both be programmatically attached to gateway node 140A. In addition, isolated network 820 (e.g., a separate VPC hosted within region 802 of the cloud provider network 100) and isolated network 822 (a direct connection to a client on-premise network) may both be programmatically attached to gateway node 140B. A peering attachment may be set up between gateway nodes 140A and 140B. Illustratively, each of these five attachments may be set up in response to one or more programmatic requests from a client.

Dynamic routing data may be exchanged between gateways 140A and 140B (e.g., in accordance with a version or variant of BGP). In scenarios in which multiple paths are available for transmitting data packets between isolated networks, the routing data may enable more optimal paths to be chosen dynamically at the virtual routers for the application data packets. This type of routing may be referred to as dynamic routing. In some embodiments, any of several different factors such as bandwidth availability, latency, historical congestion patterns, and/or agreements with intermediary or transit network providers may be taken into account at the virtual routers when choosing the next hops or paths for data packets when dynamic routing is enabled.

In addition to enabling the transfer of dynamic routing data, in at least some embodiments a client may provide (e.g., via an API, GUI, policy data document, etc.) a group of one or more dynamic routing protocol configuration settings to be used for the transfers. Such settings may indicate various preferences of the client with respect to aspects of the routing data transfers. One such setting may, for example, include a filter rule to be used to determine whether a route to a particular destination is to be transferred from one gateway node to the other. Another setting may indicate a respective priority to be assigned to individual ones of a plurality of routing-related attributes to select a next hop to a destination, such as: (a) a local preference attribute, (b) a local prefix origin attribute, (c) an autonomous system path length attribute, (d) a multi-exit discriminator attribute, or (e) a router identifier attribute. A local preference may indicate the respective preference to be used by a gateway node for different available paths using a numerical value propagated, for example, in route updates from BGP neighbors of the gateway node in the same autonomous region. Clients may use local preference to influence preferred exit points among multiple exit points of an autonomous system. In one embodiment, routes with the highest local preference values (among the available alternate routes) may be selected for packets by a gateway node. A local prefix origin attribute may be used at a gateway node to prefer paths that are in an isolated virtual network that is directly attached to the gateway node, when alternative paths that involve other gateway nodes are also available in some embodiments. A gateway node may choose the path with the shortest AS path length (among the available alternate paths) in embodiments in which the AS path length attribute is used. Multi-exit discriminators ("MEDs") may be obtained at a gateway node from BGP neighbors in a different AS in some embodiments, and the gateway mode may choose the path with the lowest MED when alternative paths with different MEDs are available. Numeric router identifiers may be assigned to each gateway node as well as to client-owned hardware routers, SD-WAN appliances and the like in some embodiments; among alternative paths which involve transfers to respective routers, the path of the router with the lowest router identifier may be selected if none of the other attributes being considered leads to a preference in one embodiment. In some embodiments, the client-specified settings may indicate a specific variant and/or version of BGP to be used (e.g., iBGP, eBGP, MP-BGP, and the like) and/or a classless inter-domain routing ("CIDR") block from which an address is to be assigned to a BGP processing engine associated with a gateway node. Other parameters governing the transfer of routing data may be specified by a client in some embodiments (e.g., via an API, GUI, policy data document, etc.).

In some embodiments, to enable dynamic routing data transfer, a BGP processing engine may be established or instantiated for each of the respective gateway nodes. One or more BGP sessions may be initiated between the two processing engines to exchange dynamic routing data that enable network packets to be forwarded by each of the gateway nodes to isolated networks via the other gateway node, in accordance with the configuration settings indicated by the client in the depicted embodiment. Transfers of routing data from one BGP processing engine to the other with respect to various sets of destination endpoints may be referred to as "advertising" the routing data.

Gateway nodes 140A and 140B may each maintain at least one route table associated with the peering attachment between the gateway nodes. In some embodiments, each gateway node may maintain at least one route table for each segment spans the peering attachment (e.g., a segment that spans both geographic regions 800 and 802). For example, a first segment may span region 800 and region 802, and may include the four isolated network attachments: isolated networks 810 and 812 in region 800, and isolated networks 820 and 822 in region 802. A second segment may also span regions 800 and 802, and may include different isolated network attachments (not shown).

To facilitate the policy-based routing that maintains a desired degree of isolation between the segments, gateway node 140A may maintain at least one route table for the first segment—route table 830—and at least one separate route table for the second segment—route table 832 (shown in dotted line). Similarly, gateway node 140B may maintain at least one route table for the first segment—route table 840—and at least one separate route table for the second segment—route table 842 (shown in dotted line). Entries in a given route table may indicate the next hops for various groups of destination endpoints, referred to as destination prefixes. In some embodiments, the individual routing data items may be specified in CIDR format.

With reference to one specific illustrative example, isolated network 810 includes a first set of network endpoints with IP version 4 ("IPv4") addresses in the range A.B.C.D/16 (expressed in CIDR notation). Isolated network 812 includes a second network endpoints with IPv4 addresses in the range A.F.C.D/16. Isolated network 820 includes a third set of network endpoints with IPv4 addresses in the range A.G.C.D/16. Isolated network 822 includes a fourth set of network endpoints with IPv4 addresses in the range K.L.M.N/16. To enable traffic to flow via the peering attachment between the gateway nodes, gateway node 140A (or a component thereof, such as a BGP processing engine) transmits advertisements for A.D.C.D/16 and A.F.C.D/16 to gateway node 140B (or a component thereof, such as a BGP processing engine). Gateway node 140B transmits advertisements for A.G.C.D/16 and K.L.M.N/16 to gateway node 140A in the depicted embodiment. As a result, route table 830 is populated with one entry showing gateway node 140B as the next hop for destinations in the A.G.C.D/16 range or destination prefix, and another entry showing gateway node 140B as the next hop for destinations in the K.L.M.N/16 range. Route table 840 is populated with entries indicating gateway node 140A as the next hop based on advertisements for A.B.C.D/16 and A.F.C.D/16, received from gateway node 140A.

As shown, route tables 830 and 840 also include next-hop entries for the isolated networks attached directly to the corresponding gateway node. In some embodiments, some or all of the isolated networks 810, 812, 820, 822 may include their own gateway nodes and/or BGP processing engines. For example, advertisements for endpoints in isolated network 822 may be transmitted from another BGP processing engine configured within isolated network 822 to gateway node 140B.

With reference to one specific non-limiting example, route table 830 may be established in gateway node 140A when the first segment is provisioned (e.g., based on policy data as described in greater detail above). Route table 830 may be tagged with a region-specific segment identifier for the first segment in region 800. Routes for any isolated networks 810 and 812 attached to the first segment in region 800 may be added to route table 830, and route table 830 may be announced. The announcement of the route table 830 tagged with the region-specific segment identifier of the first segment in region 800 may trigger establishment of a policy within gateway node 140A to use route table 830 for routing any packets that include, in routing metadata, the region-specific identifier for the first segment in region 800. Similarly, route table 840 may be established in gateway node 140B, tagged with a region-specific segment identifier for the first segment in region 802. Routes for isolated networks 820 and 822 attached to the segment in region 802 may be added, route table 840 may be announced, and a policy may be established within gateway 140B to use route table 840 for routing packets that include, in routing metadata, the region-specific identifier for the first segment in region 802.

When routes from route table 830 are advertised to other gateway nodes of the segment, including gateway node 140B, the other gateway nodes may determine the route table that corresponds the segment with which the advertised routing data is tagged, and add those routes as appropriate to the route table. For example, gateway node 140B may determine that the segment with which the advertised routing data is tagged is the first segment for which route table 840 is maintained. Gateway node 140B may add the advertised routes to route table 840 as appropriate (e.g., based on a selection algorithm), and may also establish a policy within gateway node 140B to use route table 840 for routing any packets received from gateway 140A that include, in routing metadata, the region-specific identifier for the first segment in region 800.

The dynamic routing data (e.g., BGP advertisements) transferred among the gateway nodes may be used to transfer network packets from one isolated network to another. For example, if a packet originating in isolated network 810 is directed to an address in the range for isolated network 822, the packet may include routing metadata indicating a segment identifier of the first segment that includes isolated network 810. Gateway node 140A may determine, based on the segment identifier, to use route table 830 instead of route table 832 to route the packet, and may transmit the packet to gateway node 140B. Gateway node 140B may determine, based on the segment identifier, to use route table 840 instead of route table 842 to route the packet, and may forward the packet to isolated network 822.

In the illustrated example, a third region—region 804 with gateway node 140C—is also part of the first segment. Accordingly, gateway nodes 140A and 140B may advertise routes for the first segment to gateway node 140C, and gateway node 140C may advertise routs for the first segment to gateway nodes 140A and 140B. This implementation may be referred to as a "full mesh."

In some embodiments, a gateway node in one region may not necessarily advertise, to gateway nodes on other regions, every route in its route table for the region. Rather, some routes may be maintained as "local only" or "community" routes. For example, some routes may be tagged with metadata or otherwise indicated as local routes based on requests from an administrator of the network (e.g., via an API), based on rules in policy data used to configure the segment, or based on some other data. When a gateway node is preparing routing data to be advertised, local routes may be filtered out. However, the routes may be used within the region to route data to/from various endpoints. In some embodiments, an entire isolated network (e.g., VPN, VPC, etc.) may be treated as a "local only" or "community" attachment to the segment. For example, an administrator of the network may, via an API and/or rules in policy data, define the segment as a local segment. As a result, all routes to endpoints in the attachment may be tagged with metadata indicating them as local routes.

Although only four isolated networks and three regions are shown, and each region is shown with one gateway node, the example is illustrative only and is not intended to be limiting, required, or exhaustive. In some embodiments, additional or fewer isolated networks, regions, segments, and/or gateway nodes may be used.

Route Selection Using Optimization Data

Figure 9:
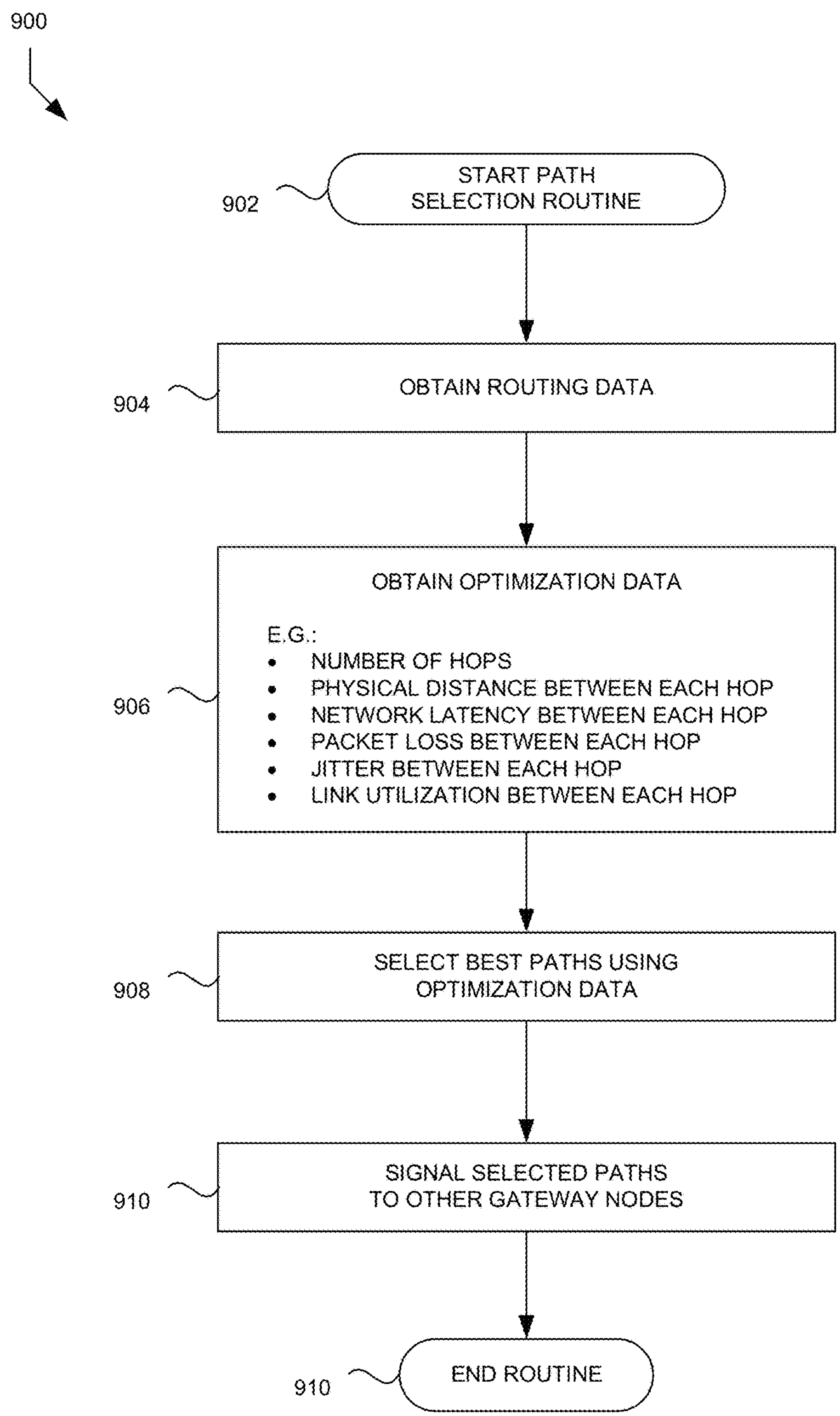
FIG. 9 is a flow diagram of an illustrative routine that a gateway node may execute to select a best path from among multiple paths to a destination according to some embodiments.

FIG. 9 is a flow diagram of an example routine 900 that a gateway node 140 may execute to manage selection of paths and generation of routing data according to some embodiments. Advantageously, the routine 900 makes use of optimization data, including dynamic metrics, to select the best path to a destination in a more dynamic and optimized way then done using conventional methods alone, such as the BGP best path selection algorithm. For example, because the cloud network provider provides a cross-region network using multiple paths between regions (up to and including a full mesh between regions), there are multiple possible paths between any two regions and conventional metrics may not necessarily choose the best path from a latency and/or cost standpoint. By incorporating metrics such as number of hops, physical distance between each hop, network latency between each hop, packet loss between each hop, jitter between each hop, link utilization between each hop, or the like, the selected path may perform better than would otherwise be the case.

The routine 900 beings at block 902. In some embodiments, routine 900 may begin in response to an event, such establishing a dynamic routing data exchange session at a gateway node 140.

At block 904, the gateway node 140 (or some other module or component) may obtain routing data. The routing data may be provided by one or more sources, such as a client (e.g., a client managing a VPC-WAN and/or a segment thereof), one or more other gateway nodes, some other source of routing data, or any combination thereof. Illustratively, at least a portion of routing data may be received in connection with an advertisement of another gateway node 140 (e.g., a gateway node in different region than the region in which the gateway node executing the current iteration of route 900 is located).

At block 906, the gateway node 140 (or some other module or component) may obtain optimization data. In some embodiments, the optimization data may include: a number of hops associated with a path, a physical distance between each hop associated with a path, a network latency between each hop associated with a path, a degree of packet loss between each hop associated with a path, a degree of jitter between each hop associated with a path, a degree of link utilization between each hop associated with a path, other optimization data, or any combination thereof. The optimization data may be obtained from one or more sources, any, all, or none of which may be external to the gateway node 140 executing the current iteration of the routine 900. For example, the physical distance between each hop may be determined and maintained by a separate management system, and provided to gateway nodes as optimization data for path selection. As another example, the degree of latency, packet loss, or jitter between two hops may be determined by devices (e.g., including the gateway node 140) participating in the hop, and may be reported to sources, destinations, routers, or a management system.

At block 908, the gateway node 140 (or some other module or component) may select the best path to each destination from among multiple available paths to each destination using the optimization data. In some embodiments, selection of the best path using the optimization data may be performed using a modified version of the BGP best path selection algorithm, or may be performed using a custom algorithm. For example, certain attributes evaluated during the BGP best path selection algorithm (e.g., weight, local preference, local prefix origin, AS path length, MED, router identifier) may be preceded by, followed by, or replaced by one or more metrics or other attributes of optimization data (e.g., number of hops, physical distance between each hop, network latency between each hop, packet loss between each hop, jitter between each hop, link utilization between each hop, or the like).

At block 910, the gateway node 140 (or some other module or component) may signal the selected paths to other gateway nodes 140 or otherwise exchange routing data with other gateway nodes 140 (e.g., as part of the dynamic routing data exchange session). By signaling the selected paths to other gateway nodes 140, best path selection process is done in a distributed manner. For example, each gateway node may obtain optimization data, perform best path selection locally, and inform all other peers. The overall VPC-WAN is able to find the best path using this distributed routing system. Due to the distributed nature of this system, it may be highly available without any single point of failure.

In some conventional systems, cross-region traffic may be routed point-to-point through a specific pair of gateway nodes of a client's choice. However, traffic can traverse through multiple regions before reaching destinations. Moreover, although some conventional systems require traffic to have at least one endpoint within a cloud provider network, a VPC-WAN 200 as described herein may have both endpoints external to the cloud provider network 100 (e.g., in different client on-premise networks 150, third party networks 160, some combination thereof, etc.). In such implementations, the distributed system of gateway nodes implementing optimized best path selection may influence how client on-premise traffic is sent to the cloud provider network 100 and which is the best entry point for the traffic. For example, in the case of a direct connect attachment to a client on-premise network, traffic may be sent via the direct connect by default. However, if there are multiple attachments to the client on-premise network, the optimized best path selection may result in a best path from a different attachment, different client on-premise network, etc.

With reference to an illustrative example, there may be traffic going between two different regions of a VPC-WAN, and it may be roughly the same distance, from a networking and/or geographic standpoint, to route traffic through either region to a particular destination in a third region. The optimized best path selection performed using the distributed system and optimization data may choose the best path under observed network conditions. As another illustrative example, if something breaks the connection between two regions of an otherwise full mesh configuration, one region may no longer have routes to/through the other region but may still have routes for each other region. The optimized best path selection performed using the distributed system and optimization data may choose the best path to the best other region to serve as an intermediary. As a further illustrative example, there may be a heavily-used segment of physical network infrastructure between two regions that is causing congestion. The optimized best path selection performed using the distributed system and optimization data may choose the best path from one of the two regions to the other of the two regions via an intermediary rather than using a direct path.

The routine 900 may terminate at block 910.

Figure 10:
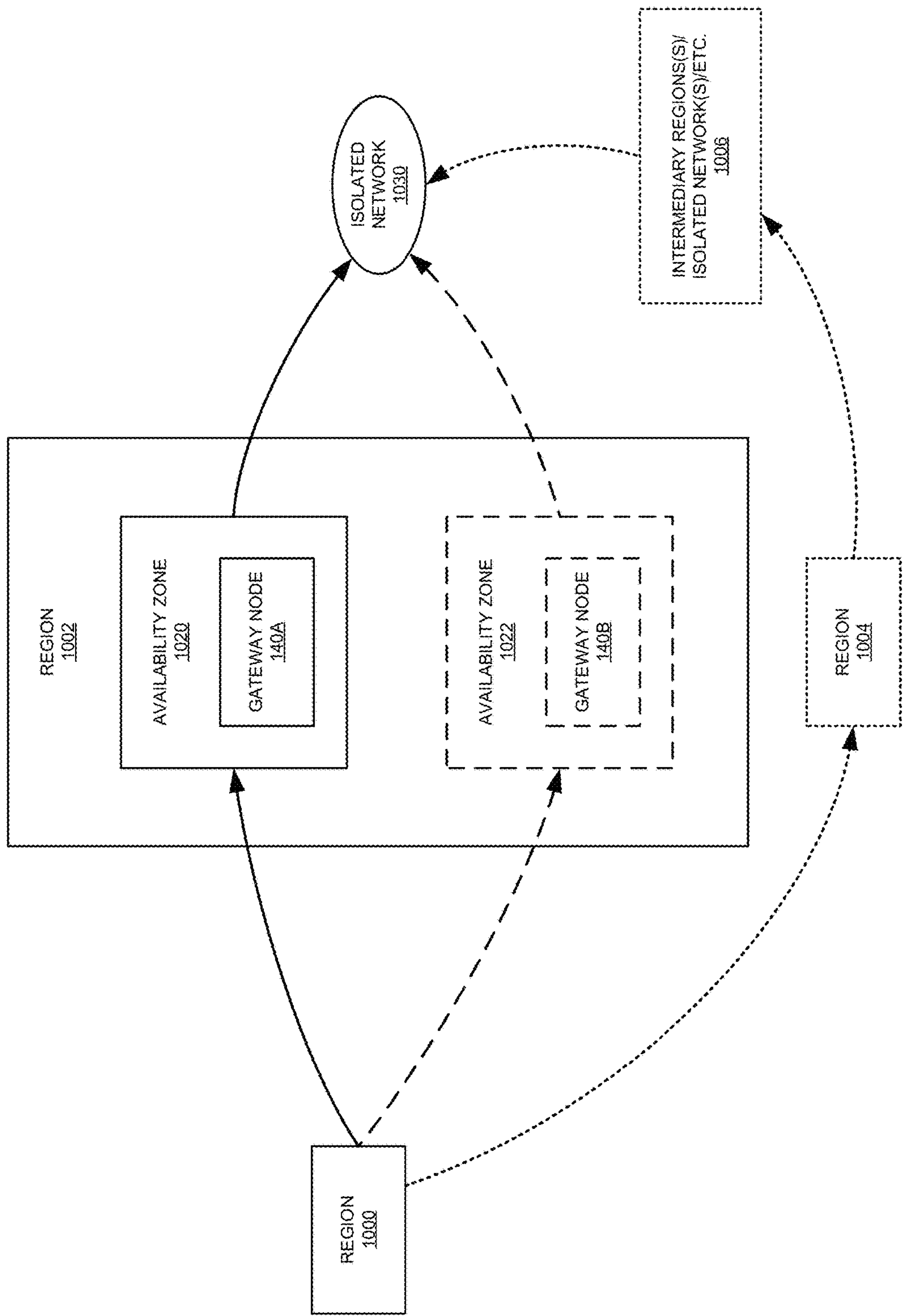
FIG. 10 is a block diagram of illustrative data flows and interactions during routing of traffic within, to, or through a region having multiple availability zones according to some embodiments.

FIG. 10 illustrates a region 1002 with two availability zones 1020, 1022. Each availability zone may have one or more gateway nodes. For example, availability zone 1020 may include gateway node 140A, and availability zone 1022 may include gateway node 140B. The gateway nodes in each availability zone of a region may include the same routing data for redundancy.

When traffic from another region, such as region 1000, is to pass through region 1002 on the way to an endpoint in an attachment to region 1002, such as isolated network 1030, multiple communication sessions may be established: one to each of the availability zones 1020, 1022. The source region 1000 may use equal cost multipath ("ECMP") routing to balance the load across both availability ones to the isolated network 1030. In addition, and separate from the load balancing aspect, the multiple redundant availability zones serve to ensure availability of the computing resources of the region 1002. If one of the availability zones, such as availability zone 1020 becomes unviable, traffic may still be able to reach the isolated network 1030 through the other availability zone 1022, as indicated using dashed line.

Similarly, because gateway nodes in regions of a particular segment exchange routing data (e.g., using the protocol described above), a complete outage of one region may not prevent traffic from being routed to a destination in an isolated network. For example, all availability zones of region 1002 are inaccessible, traffic may be routed to a different region, such as region 1004, and/or through any other intermediary region(s), isolated networks, etc. 1006 as need to reach isolated network 1030.

Example Gateway Node

Figure 11:
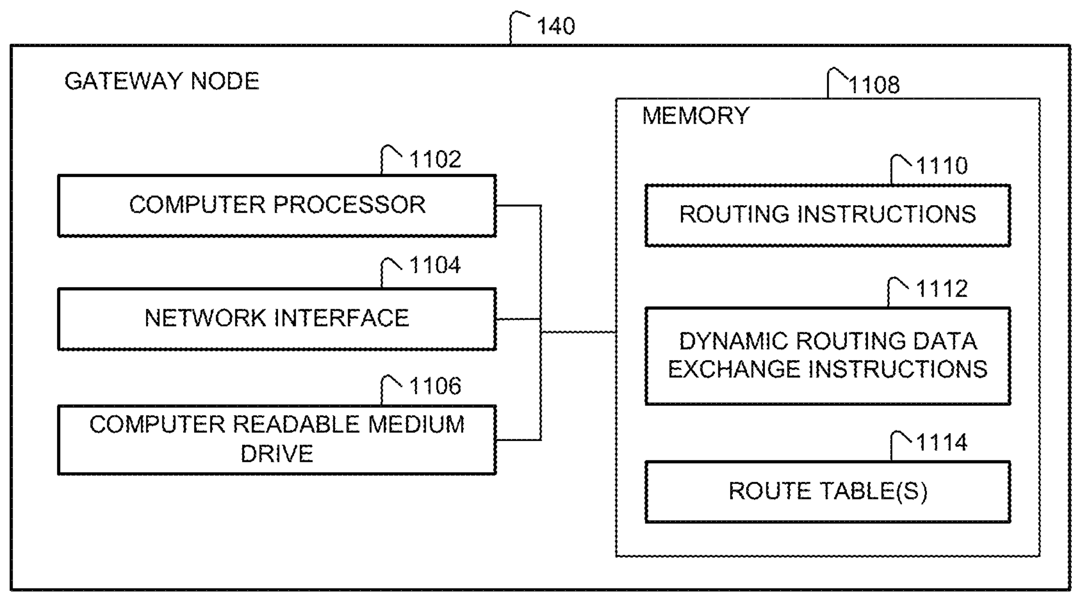
FIG. 11 is a block diagram of an illustrative gateway node configured to implement features of some embodiments.

FIG. 11 illustrates various components of an example gateway node 140 configured to implement various functionality described herein. The gateway node 140 may be a physical host computing device on which a gateway is implemented, such as a compute server 122.

In some embodiments, as shown, a gateway node 140 may include: one or more computer processors 1102, such as physical central processing units ("CPUs"); one or more network interfaces 1104, such as a network interface cards ("NICs"); one or more computer readable medium drives 1106, such as a high density disk ("HDDs"), solid state drives ("SSDs"), flash drives, and/or other persistent non-transitory computer-readable media; and one or more computer readable memories 1108, such as random access memory ("RAM") and/or other volatile non-transitory computer-readable media.

The computer readable memory 1108 may include computer program instructions that one or more computer processors 1102 execute and/or data that the one or more computer processors 1102 use in order to implement one or more embodiments. For example, the computer readable memory 1108 can store routing instructions 1110 for routing packets based on routing metadata and data in one or more route tables 1114. As another example, the computer readable memory 1108 includes dynamic routing data exchange instructions 1112 for exchanging routing data with other gateway nodes.

Evaluation and Optimization of Network Policy Implementation

Figure 12:
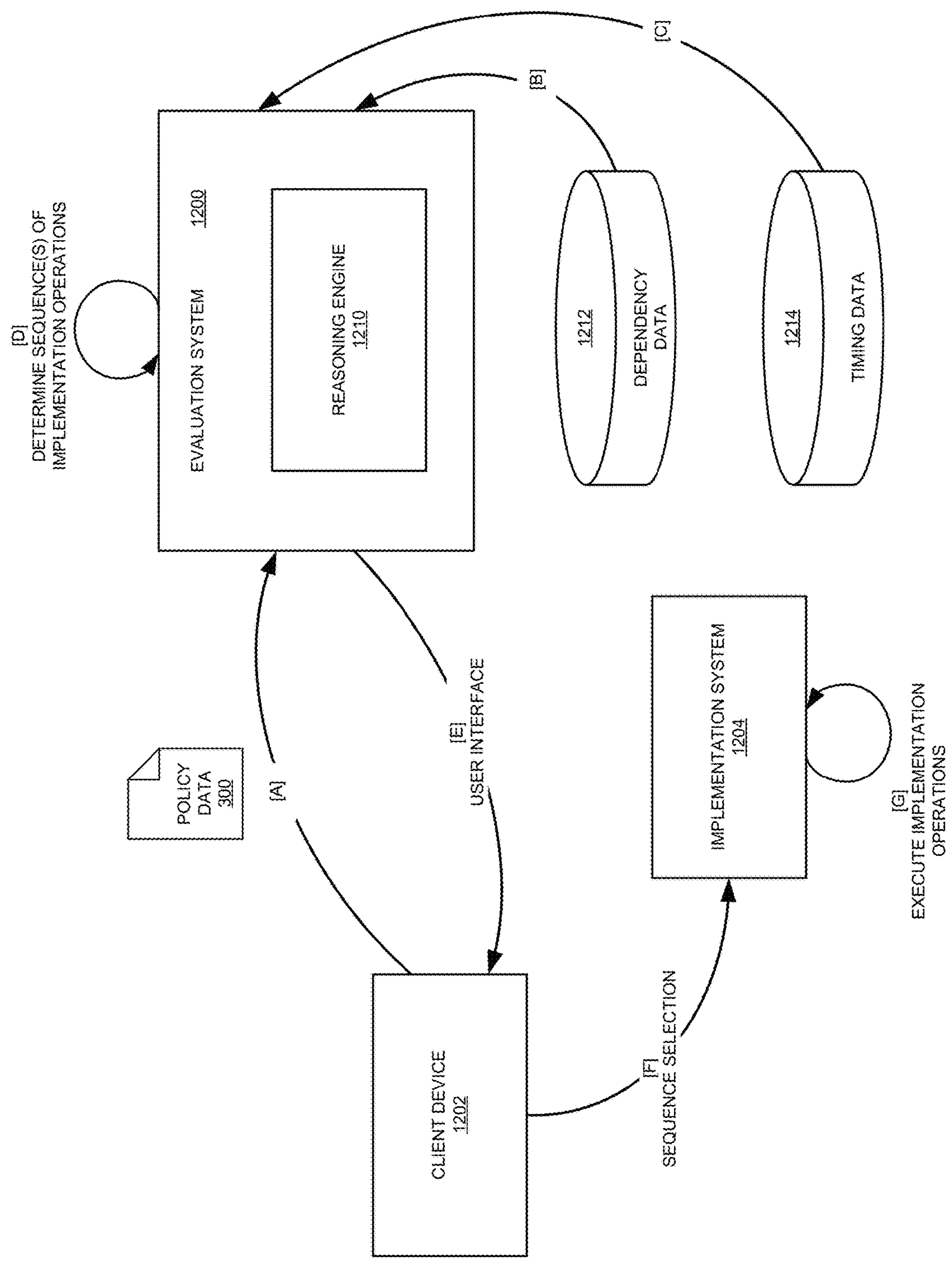
FIG. 12 is a block diagram of illustrative data flows and interactions between a client computing device and an evaluation system according to some embodiments.

FIG. 12 illustrates example data flows and interactions between a client computing device 1202 (e.g., a computing device of a network administrator managing a VPC-WAN, a network administrator of the cloud provider network, etc.) and an evaluation system 1200 to evaluate implementations of network polices and/or policy changes, and identify an optimal or otherwise desirable sequence of implementation operations.

The evaluation system 1200 may include a reasoning engine 1210 to evaluate network models, determine whether constraints are satisfied, and the like. In some embodiments, the reasoning engine 1210 may be or include a datalog solver, an SMT solver, a first-order theorem prover, or some other reasoning engine. The evaluation system 1200 may further include or have access to various data stores, such as a dependency data store 1212 of dependency data regarding the implementation operations needed to implement various network policies and/or changes thereto, how those implementation operations may depend from other implementation operations, and the like. The evaluation system may also include or have access to a timing data store 1214 of timing data regarding the timing likely to be required to perform the implementation operations.

In some embodiments, the evaluation system 1200 may be implemented using one or more host computing devices, such as one or more control severs 112 and/or compute servers 122 of the cloud provider network 100. For example, the reasoning engine 1210 may be implemented using a VM instance executing on a control server 112. As another example, the evaluation system 1200 may include or be in communication with various data storage servers, such as object store servers 126 that store the data of the dependency data store 1212 and/or the timing data store 1214.

In some embodiments, the client computing device 1202 (also referred to as a "client device" for brevity) may be implemented using one or more host computing devices, such as one or more control severs 112 and/or compute servers 122 of the cloud provider network 100, or as one or more personal computing devices or server computing devices external to the cloud provider network 100 (e.g., within a client on-premise network 150).

In some embodiments, an implementation system 1204 may be used to implemented selected network polices as specified by the client computing device 1202 and evaluated by the evaluation system 1200. The implementation system 1204 may itself be implemented on one or more host computing devices, such as one or more control severs 112 and/or compute servers 122 of the cloud provider network 100. For example, the implementation system 1204 may be one or more VM instances executing on one or more control servers 112.

Figure 13:
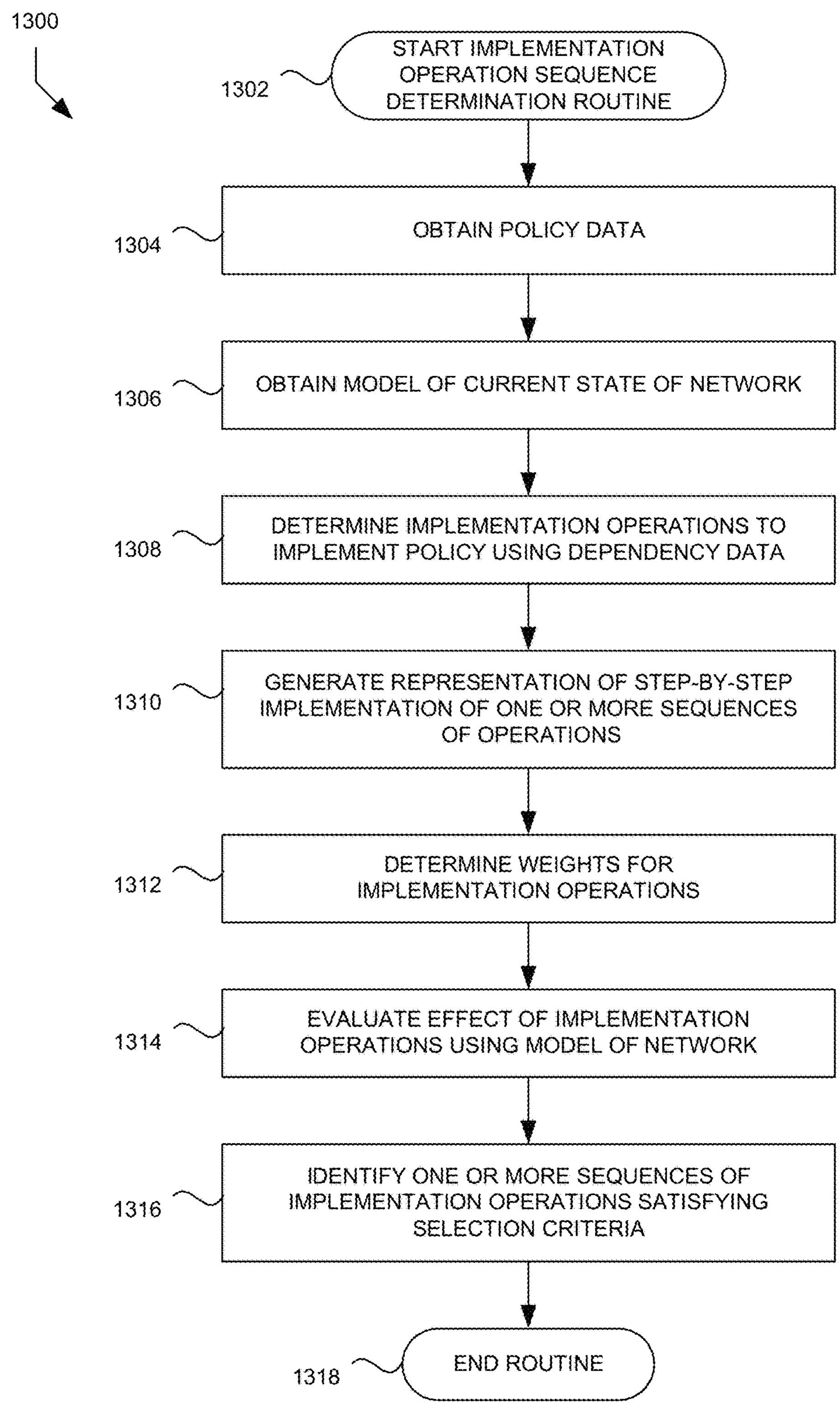
FIG. 13 is a flow diagram of an illustrative routine for automated analysis of a change to a network and selection of a sequence of implementation operations according to some embodiments.

The operations of the evaluation system 1200 to evaluate policy data 1230 received from the client device 1202 and select a sequence of implementation operations to perform in order to deploy the network policy represented by the policy data 1230 will be described with further reference to the illustrative routine 1300 shown in FIG. 13.

The routine 1300 beings at block 1302. In some embodiments, routine 1300 may begin in response to an event, such as startup of the evaluation system 1200.

At block 1304, the evaluation system 1200 can receive policy data 1230 regarding one or more network polices or changes thereto to be implemented with respect to a particular network, such as a VPC-WAN or other private network. The network that is the subject of the current instance of the routine 1300 and with which the policy data 1230 is associated will be referred to as the "subject network" in the description that follows.

The policy data 1230 may be received from a data store or a computing system, such as a client computing device 1202 as shown in FIG. 12 at [A]. In some embodiments, a user such as a network administrator managing a private network, such as a VPC-WAN implemented using a cloud WAN service of the cloud provider network 100, may use the client computing device 1202 to submit, to the evaluation system 1200, policy data 1230 representing a network policy to be implemented or changed. For example, the policy data 1230 may be in the form of one or more declarative statements provided in a standardized format, such as using JSON, XML, YAML, or the like as described above. The policy data 1230 may be a complete network policy for a private network to be deployed (e.g., policy data 300 as described above), or policy data regarding a change to network policy of a private network that has already been deployed. Changes to network polices may include changes affecting objects that are part of the private network, properties of those objects, actions affecting the objects, or the like. For example, a change may be or include: addition of a segment, removal of a segment, modification to a segment property, addition of a route filter, or removal of a route filter.

With reference to an illustrative example, the policy data 1230 may represent addition of a segment to an existing VPC-WAN, and the addition of one or more filters associated with the segment (e.g., explicit allow/deny route statements to allow the new segment to communicate with certain other segments, such as shared services segments, and/or to prevent the new segment from computing with certain other segments, such as production services segments).

At block 1306, the evaluation system 1200 can obtain a model of the subject network. In some embodiments, if the policy data 1230 represents a change to an existing network, the model may already exist. In such cases, the evaluation system 1200 may obtain the model of the current state of the subject network. In some embodiments, if the policy data 1230 represents a new network to be deployed, or a change to an existing network for which a model does not already exist, the evaluation system 1200 may generate the model.

The model may be generated from a formal specification and a snapshot of the network architecture. The formal specification may formalize the semantics of the current configuration and the network architecture. For example, the formal specification details how a route table directs traffic, how a firewall applies rules, or how a load balancer balances a given load. Further, the snapshot may describe the topology and details of the network. For example, the snapshot details the routing devices, the environments, the route tables, the routing rules, etc. associated with a serviced environment. The reasoning engine 1210 or some other subsystem or component may combine the formal specification and the snapshot in order to generate a model that represents the set of paths associated with the subject network, or from which the set of paths associated with the subject network can be derived.

At block 1308, the evaluation system 1200 can determine the specific implementation operations to be performed in order to implement the network policy represented by the policy data 1230. In some embodiments, the evaluation system 1200 may obtain data from the dependency data store 1212 regarding the individual implementation operations to be performed to deploy the new segment and add the route filters, as shown at [B]. Any or all of those implementation operations may themselves have dependencies to other implementation operations, and so on. The evaluation system 1200 may determine the complete set of implementation operations required to transition the subject network from its current state to the desired state.

At block 1310, the evaluation system 1200 may generate a representation of one or more possible sequences of implementation operations that may be performed to produce the desired state of the subject network. The sequences may be different sequences of the same set of implementation operations. In some embodiments, if implementation operations are performed in a particular sequence, the set of implementation operations may be different than when performed in a different sequence. For example, one or more operations may be added, omitted, or substituted in one sequence compared to a different sequence. In some embodiments, a sequence of operations may permit performance of one or more operations in parallel or asynchronously, such as multiple implementation operations being performed after completion of a single implementation operation or in response to some other event. In some embodiments, the representation of one or more possible sequences of implementation operations may be a graph-based representation.

Figure 14:
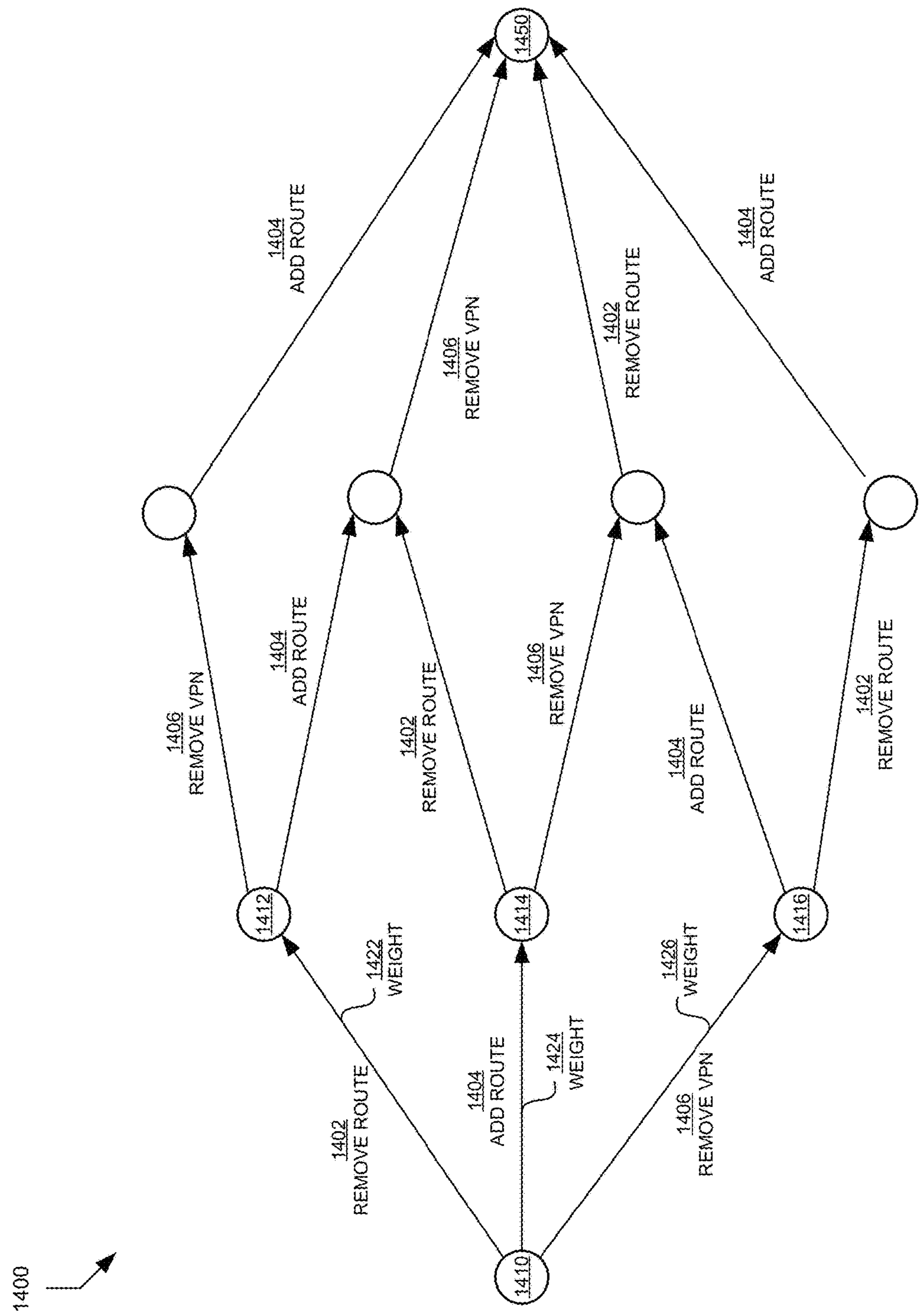
FIG. 14 is a diagram of an illustrative graph-based representation of various sequences of implementation operations according to some embodiments.

FIG. 14 illustrates an example implementation graph 1400 of multiple sequences of implementation operations that may be performed to implement a particular network policy. In the illustrated example, the implementation graph 1400 includes sequences of implementation operations for deploying a particular change to a subject network: removing a VPN from a segment of a VPC-WAN. The implementation operations include three implementation operations: operation 1402, which may be removing, from all routing tables for the segment, any route to the VPN; operation 1404, which may be adding one or more routes to take the place of the prior route(s) to the VPN; and/or operation 1406, which may be deleting the VPN from the subject network or cloud provider network altogether. In the implementation graph 1400, the implementation operations are represented as edges and the states of the network are represented as nodes. In this embodiment, the implementation operations cause the subject network to transition from one state to another state. For example, the initial state 1410 corresponds to the state of the subject network prior to performance of any implementation operation. If implementation operation 1402 is performed from initial state 1410, the subject network transitions to state 1412 (e.g., in which routes to the VPN have been removed from route tables of the segment). In contrast, if implementation operation 1404 is performed from initial state 1410, the subject network transitions to state 1414 (e.g., in which a new route is added to the route tables for the segment, while routes to the VPN remain in the route tables). Finally, if implementation operation 1406 is performed from initial state 1410, the subject network transitions to state 1416 (e.g., in which the VPN is deleted but routes to the VPN remain in the route tables and no new routes have been added to take their place).

Although the illustrated implementation graph 1400 includes paths representing different sequences of the same set of implementation operations, the example is illustrative only and is not intended to be limiting, required, or exhaustive. In some embodiments, a private network may be deployed—or a change may be implemented to a previously-deployed private network—using different sets of implementation operations, where some sets of implementation operations include implementations that are not present in other sets of implementation operations, and vice versa. An implementation graph may be constructed to represent these varying sets of implementation operations intended to produce the same end state: deployment of a private network according to a network policy, or implementing a change to a deployed network.

At block 1312, the evaluation system 1200 may determine weights to the implementation operations for use in determining an optimal or desired sequence of implementation operations. In some embodiments, the weights may be based on an expected amount of time for each of the implementation operations to complete. For example, the evaluation system 1200 may obtain timing data from the timing data store 1214 at [C]. The timing data may represent a prediction of the amount of time each implementation operation is expected to take, an observation of the amount of time each implementation operation has taken in the past, or the like. Illustratively, the timing data may be in the form of percentile-based latencies, such as P50 (e.g., the median observed latency over some set of prior executions of the implementation operation), P99 (e.g., the latency below which was observed in 99% of prior executions of the implementation operation), or the like. The weight that is associated with each of the implementation operations may be one of the percentile-based latencies (e.g., the P50), or may be derived therefrom (e.g., normalized within a range of [0.0]-[1.0] with respect to latencies of all other implementation operations).

To use the weights in selecting a sequence of implementation operations, the evaluation system 1200 may add the weights to the corresponding edges in the implementation graph 1400. For example, as shown a first weight 1422 may be assigned to implementation operation 1402, a second weight 1424 may be assigned to implementation operation 1424, and a third weight 1426 may be assigned to implementation operation 1406. A topological sort of the graph to identify the path with the lowest total weight may thus be used to identify the sequence of implementation operations that is expected to take the shortest amount of time to complete.

In some embodiments, the same weight may not be applied to each instance of a given implementation operation. For example, implementation operation 1406 may take a different amount of time depending upon whether it is performed at the beginning of sequence, at the end of a sequence, before and/or after a specific operation, in parallel with a particular operation, etc. These differences may result in different weights being applied to the same implementation operation 1406 depending upon the context of the different instances of the implementation operation in the implementation graph 1400: a first weight for an instance of a implementation operation 1406 in a first context (e.g., before/after/in parallel with implementation operation 1402), a second weight of an instance of implementation operation 1406 in a second context (e.g., before/after/in parallel with a different implementation operation 1404), and so on.

In some embodiments, additional and/or alternative data may be used to generate or supplement weights. For example, there may be certain effects from a network security or availability standpoint caused by particular implementation operations. Such effects may relate to violation of security constraints, routing criteria, or the like. A user may desire to avoid such effects, in which case an implementation operation associated with a higher incidence of such effects may be given a greater weight than other implementation operations. In this way, a topological sort of the graph to identify the path with the lowest total weight may thus be used to identify the sequence of implementation operations that is expected to cause the least number of undesirable effects.

At block 1314, the evaluation system 1200 may evaluate the effects of individual implementation operations and sequences thereof on the subject network to determine whether any policies or constraints are violated. The evaluation may be performed to identify which sequences are acceptable, which sequences are not acceptable, and/or to provide different options to a user (e.g., a faster sequence in which one or more constraints are violated in a transient intermediate state vs. a slower sequence in which no state of the network violates a constraint).

In some embodiments, the evaluation may be performed using the reasoning engine 1210, the model of the subject network, and the implementation graph 1400 of implementation operation sequences. For example, the reasoning engine 1210 may start with a model of the subject network at initial state 1410. The model may be updated to reflect the change caused by performance of implementation operation 1402, at which point the model represents the state of the network at state 1412. The reasoning engine 1210 may then evaluate the model to determine whether the network satisfies certain constraints, such as routing criteria. The routing criteria may include permitting particular pairs of endpoints to communicate (e.g., permitting a first instance or compute node to communicate with a second instance or compute node), prohibiting other pairs of endpoints from communicating, requiring certain traffic to pass through a particular firewall or other network device, etc. The process of evaluating the subject network may be repeated for each state in the implementation graph 1400, or for some subset thereof, by applying the appropriate implementation operations to the appropriate state-specific version of the network model and evaluating the resulting model using the reasoning engine 1210 and desired criteria.

Although the illustrated implementation graph 1400 has a single common end state 1450 for all paths, and therefore for all sequences of implementation operations, the example is illustrative only and is not intended to be limiting, required, or exhaustive. In some embodiments, different sequences of implementation operations, or different sets of implementation operations, may produce different end states of the subject network. Moreover, some of the end states may correspond to different implementations that each satisfy the network policy for the network or correspond to different implementations of a requested change to the network, while other end states do not satisfy the network policy or do not correspond to an acceptable implementation of a change to the network (e.g., the resulting end state violates one or more routing criteria). An analysis of the different end states may be performed to filter out those sequences of implementation operations that do not satisfy network polices, routing criteria, or the like.

At block 1316, the evaluation system 1200 may identify one or more sequences of implementation operations as candidates to be implemented, as shown in FIG. 12 at [D]. For example, the evaluation system 1200 may identify a single "best" sequence based on a topological sort of the implementation graph 1400 by selecting the lowest-latency or otherwise optimal sequence (e.g., depending upon the optimization being performed). A topological sort of this kind, that uses weights associated with individual edges of the graph, may be referred to as a weighted topological sort.

The set of sequences from which the "best" sequence is selected may in some cases be reduced from the set of all possible sequences by excluding one or more sequences that are associated with undesirable intermediate transient states (e.g., depending upon the constraints tested by the reasoning engine 1210). The selected sequence may then be executed to implement the network policy represented by the policy data 1230.

In some embodiments, the evaluation system 1200 may identify multiple sequences of implementation operations as candidates for presentation to a user. For example, the evaluation system 1200 may identify the n best list of sequences of implementation operations based on the topological sort, where n is an integer >1. The set of candidate sequences from which the n-best list is selected may in some cases be reduced by excluding one or more sequences that are associated with undesirable intermediate transient states (e.g., depending upon the constraints tested by the reasoning engine 1210). The n-best list of sequences may be presented to a user via a user interface, as shown in FIG. 12 at [E].

Figure 15:
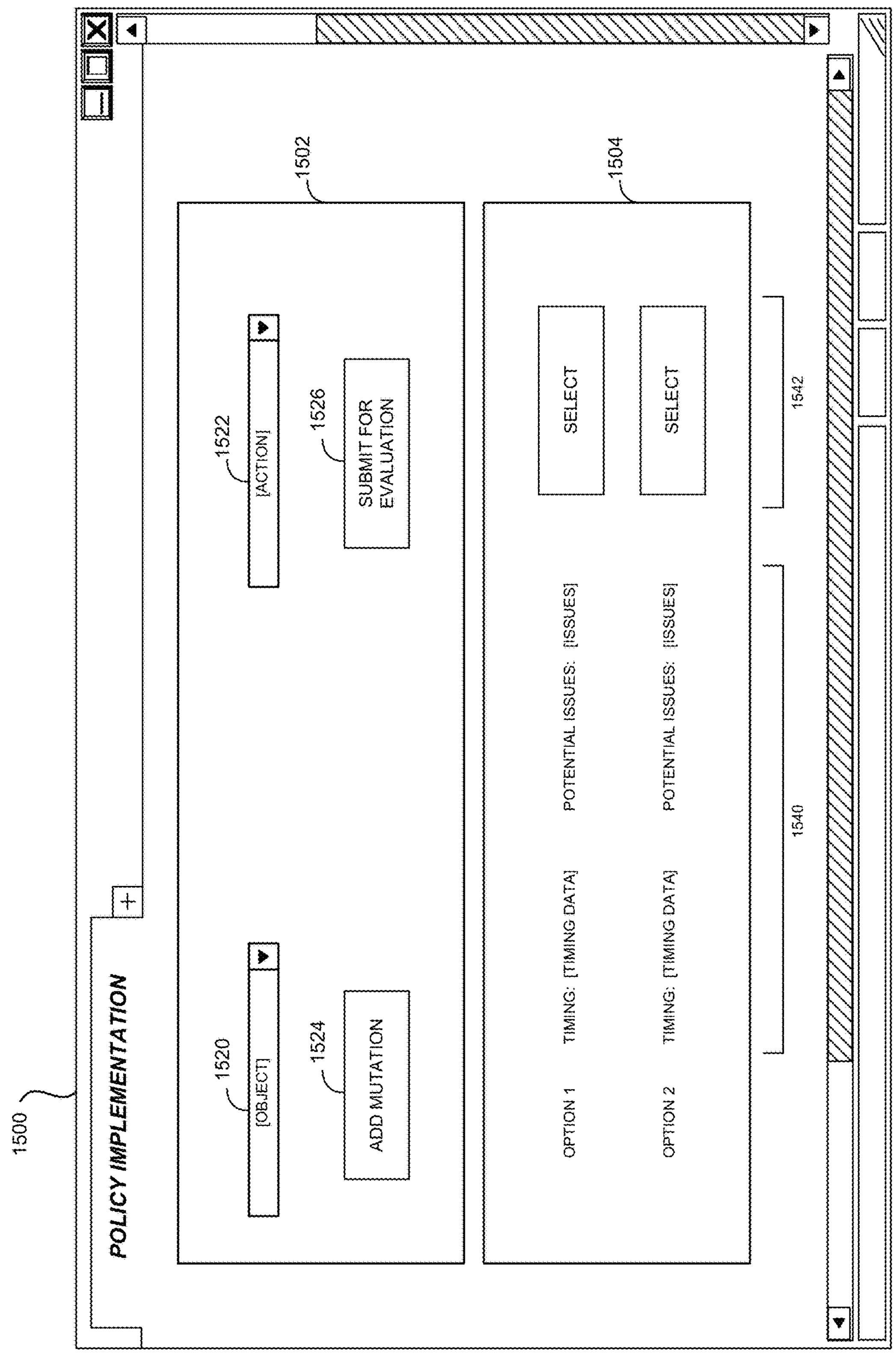
FIG. 15 is a diagram of an illustrative user interface to submit network changes and interact with sequences of implementation operations according to some embodiments.

FIG. 15 illustrates an example user interface 1500 that may be generated to present sequences of implementation operations for selection by a user. In some embodiments, as shown, the user interface 1500 may include a network policy portion 1502 and a sequence selection portion 1504.

The network policy portion 1502 may provide interactive controls to select, enter, or otherwise provide network policy input that forms the basis of policy data 1230. For example, the network policy portion 1502 may include an object selection control 1520 that allows a user to select a particular network object, such as a segment, attachment, or the like. The network policy portion 1502 may further include an action selection control 1522 that allows a user to select a particular action to be performed with respect to the selected network object in the object selection control 1520. The combination of the selected object and action may be understood as a particular mutation to the subject network, and policy data 1230 may be generated representing the mutation. The network policy portion 1502 may include other controls, such as an add mutation control 1524 to add another network mutation, and a submit control 1526 to submit policy data 1230 regarding the entered mutation(s) for evaluation by the evaluation system 1200.

The sequence selection portion 1504 may provide interactive controls to select or otherwise initiate a sequence of implementation operations to deploy a network policy or change thereto. In some embodiments, the sequence selection portion 1504 may list one or more candidate sequences of implementation operations that may be performed. The list may include a properties display 1540 to show various properties of the sequences that users may consider when selecting a sequence. For example, the properties may include a total estimated time to complete execution of the sequence, information about expected or possible issues or constraint violations that may occur in transient states during performance of the sequences, or the like. The sequence selection portion 1504 may further include sequence selection controls 1542 that allow a user to select a particular sequence to be performed. Selection of one of the sequence selection controls 1542 may cause interaction data to be sent to the evaluation system 1200 or some other system, such as an implementation system 1204 as shown in FIG. 12 at [F]. At [G] the implementation system 1204 may then initiate execution of the selected sequence.

Reachability Analysis

Figure 16:
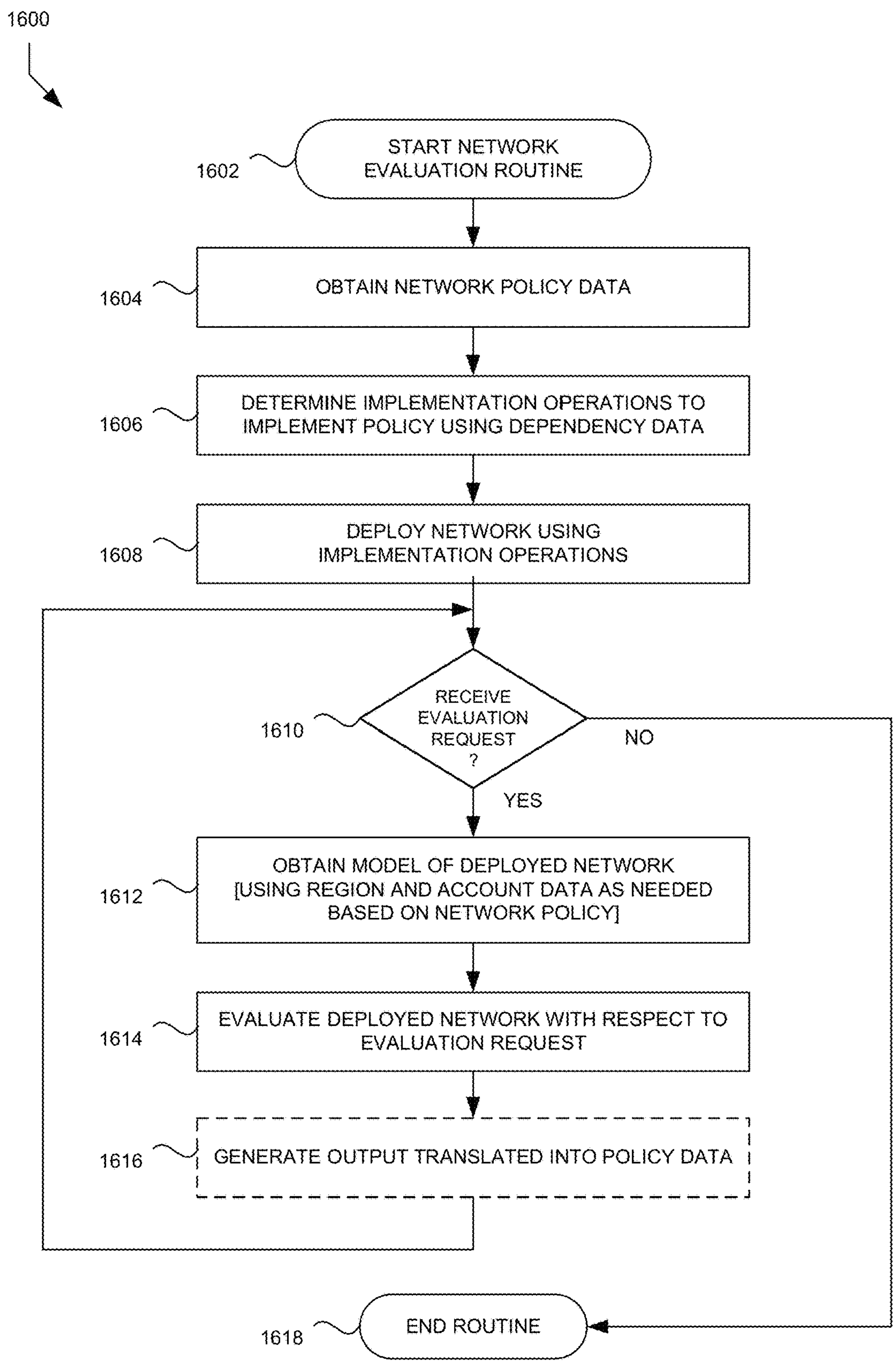
FIG. 16 is a flow diagram of an illustrative routine for deploying a network based on network policy data, and evaluating the deployed network according to some embodiments.

FIG. 16 is a flow diagram of an illustrative routine 1600 for deploying a network using policy data, and evaluating the network using one or more reasoning engines to determine reachability of endpoints and/or conformance with the network policy data.

The routine 1600 begins at block 1602. The routine 1600 may begin in response to an event, such as startup of an implementation system 1204.

At block 1604, the implementation system 1204 may obtain policy data representing a network to be deployed and/or a change to be implemented.

At block 1606, an evaluation system 1200 may be used to determine a sequence of implementation operations to deploy the network or change thereto, as described in greater detail above.

At block 1608, the implementation system 1204 may execute or cause execution of the implementation operations to deploy the network or change thereto, as described in greater detail above.

At decision block 1610, the evaluation system 1200 or some other system may determine whether an evaluation request associated with the deployed network has been received. If so, the routine 1600 proceeds to block 1612. Otherwise, the routine 1600 may terminate at block 1618.

Figure 17:
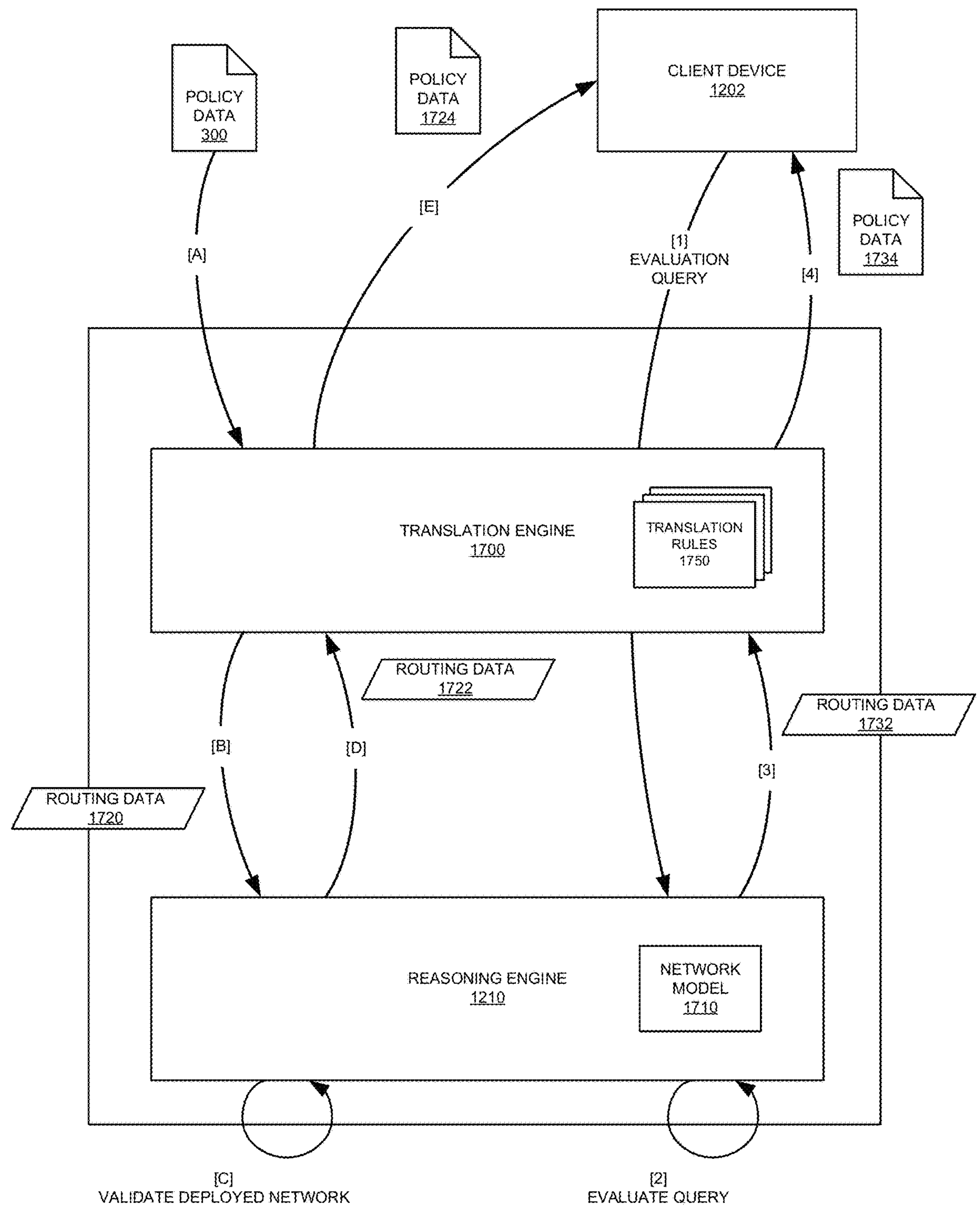
FIG. 17 is a block diagram of illustrative data flows and interactions between a client computing device and an evaluation system according to some embodiments.

FIG. 17 illustrates examples of evaluation requests, and handling of the requests by the evaluation system 1200. One type of evaluation request may be a request to evaluate the deployed network with respect to the network policy data to validate the deployment. A second type of evaluation request may be a request to evaluate the deployed network to determine whether communication is permitted between specified endpoints. Portions of the routine 1600 will be described with further reference to the examples illustrated in FIG. 17

Returning to FIG. 16, at block 1612 the evaluation system 1200 may obtain a model of the deployed network. In some embodiments, the evaluation system 1200 may obtain the model generated from a formal specification and a snapshot of the network architecture. The formal specification may formalize the semantics of the current configuration and the network architecture. For example, the formal specification details how a route table directs traffic, how a firewall applies rules, or how a load balancer balances a given load. Further, the snapshot may describe the topology and details of the network. For example, the snapshot details the routing devices, the environments, the route tables, the routing rules, etc. associated with a serviced environment. The reasoning engine 1210 or some other subsystem or component may combine the formal specification and the snapshot in order to generate a model 1710 that represents the set of paths associated with the deployed network, or from which the set of paths associated with the deployed network can be derived.

In some embodiments, rather than modelling the entire deployed network, only a portion of the deployed network may be modelled. The particular portion of the deployed network to be modelled may be determined based on the type of evaluation being performed. If the requested evaluation is to determine whether two endpoints can communicate with each other or why the two endpoints cannot communicate, then only network configuration information regarding the regions through which the traffic would travel—and accounts used to send the traffic through those regions—would be needed for analysis. In this scenario, the evaluation system 1200 may start the analysis at one endpoint, and determine the path that would be taken toward the second endpoint based on the current state of the deployed network. As the path goes to a new region and/or requires a new account to continue, the evaluation system 1200 can obtain network configuration information regarding the new region and/or account. This process may be repeated, as needed, until configuration information for the region in which the second endpoint is located and/or configuration for any accounts needed to send information into those regions and to the second endpoint is obtained. Thus, out of a set of all regions of the cloud provider network 100 or, more narrowly, out of a set of all regions that are part of the deployed network (e.g., the deployed VPC-WAN), configuration information for only a subset of those regions may be obtained by the evaluation system 1200 for analysis. Additionally, or alternatively, out of a set of all accounts of the cloud provider network or, more narrowly, out of a set of all accounts that are used to transmit traffic within the deployed network (e.g., the deployed VPC-WAN), configuration information for only a subset of those accounts may be obtained by the evaluation system 1200 for analysis. In some embodiments, the determination of regions, accounts, and the like may be based on policy data 300 for the deployed network, where that policy data defines the regions in which the private network is deployed, the regions spanned by specific segments, isolated networks attached to the segments and associated with specific accounts, etc. This selective loading of configuration information may be referred to as "lazy loading" to contrast it to other techniques that obtain configuration for all regions and/or all accounts regardless of the particular evaluation being performed. Lazy loading in this manner can conserve time and computing resources necessary to perform the requested analysis while still coming to the same result.

At block 1614, the evaluation system 1200 can evaluate the model of the deployed network with respect to the evaluation subject to determine an evaluation result. The evaluation may be performed using a reasoning engine 1210, or multiple reasoning engines 1210.

A first type of evaluation may be performed to validate a deployed network against a set of network policy data. As shown in FIG. 17 at [A], the evaluation system 1200 may obtain the policy data 300 to use in validating the deployed network. In some embodiments, the policy data 300 may be the same policy data (e.g., the same document or file) as used to originally deploy the network (e.g., in blocks 1604-1608 of routine 1600).

At [B], a translation engine 1700 or some other module or component of the evaluation system 1200 may use a set of translation rules to translate the policy data 300 into routing data 1720. In some embodiments, the routing data 1720 may represent one or more routing criteria by which traffic is to be routed in accordance with the network policies represented by the policy data. For example, one or more routing criteria may be or include a set of routes and/or route tables, a set of routing rules, a set of security access rules, a set of firewall rules, a set of accounts, a set of regions, and the like.

At [C], the reasoning engine 1210 may evaluate the network model 1710 against the routing data 1720 derived from the policy data and determine whether the deployed network corresponds to a deployment of the routing data 1720. For example, the reasoning engine 1210 may determine whether the network model 1710 permits traffic between each pair of endpoints for which there are accessible routs in the routing data 1720. If there are any pair of such endpoints unable to communicate according to the network model 1710, then the deployed network may be determined not to comply with the policy data. As another example, the reasoning engine 1210 may determine whether the network model 1710 permits traffic between any additional pairs of endpoints that are not permitted to communicate according to the routing data 1720. If there is any such pair of endpoints permitted to communicate according to the network model 1710, the deployed network may be determined not to comply with the policy data. Otherwise, if all endpoints able to communicate according the policy data are also able to communicate according to the network model 1710, and no additional endpoints are permitted to communicate according the network model 1710 that are not permitted to do so according to the routing data 1720, then the deployed network may be determined to be validated.

In some embodiments, in cases where there is a discrepancy between what is permitted/prohibited by the network model 1710 and the routing data 1720 derived from the policy data 300, the reasoning engine 1210 may be configured to provide output data 1722 at [D] indicating a reason for such discrepancy. The output data 1722 may indicate one or more routing criteria causing a discrepancy between how traffic is routed according to the network model 1710 and how traffic is routed according to the routing data 1720 derived from the policy data 300. For example, if two endpoints are not permitted to communicate according to the network mode 1710, the output data 1722 may indicate which routing criteria (e.g., route table data or lack thereof) are causing the prohibition. As another example, if two endpoints are permitted to communicate according to the network model 1710, output data 1722 may indicate a path through which such communication is permitted.

At [E], policy data 1724 may be provided to a client computing device 1202 as output of the requested evaluation. The policy data 1724 may represent a network policy that is causing a discrepancy between how the deployed network routs traffic and how traffic is to be routed according to the policy data 300 against which the deployed network was evaluated.

Returning to FIG. 16, at block 1616 the translation engine 1700 may, in some embodiments, first translate output data 1722 generated by the reasoning engine 1210 into the policy data 1724. For example, the translation engine 1700 may have a set of translation rules 1750 indicating how particular routing criteria are to be represented as network policies, such as the standardized examples of policy data described herein. An example of translation between routing criteria and network routing policies is described in greater detail below.

A second type of evaluation may be performed to determine whether two endpoints within a deployed network are able to communicate or, if not, why they are unable to communicate. As shown in FIG. 17 at [1], the evaluation system 1200 may obtain query data 1730 from a client computing device 1202. The query data 1730 may represent a set of endpoints between which the evaluation system 1200 is to determine whether communications are permitted.

At [2], the reasoning engine 1210 may evaluate the network model 1710 against the query data 1730 and determine whether communication between the indicated endpoints is permitted in the deployed network. For example, the reasoning engine 1210 may evaluate routes from a first endpoint toward the second endpoint, and continue to evaluate routes along the path—crossing regions and/or accounts as needed—until a final route to the second endpoint is found or not found.

In some embodiments, in cases where communication between the endpoints is not permitted, the reasoning engine 1210 may be configured to provide output data 1732 at [3] indicating a reason that the communication is prohibited. The output data 1732 may indicate one or more routing criteria causing traffic to be dropped or otherwise not permitting traffic between the endpoints.

In some embodiments, in cases where communication between the endpoints is permitted, output data 1722 may indicate a path through which such communication is permitted.

At [4], policy data 1734 may be provided to a client computing device 1202 as output of the requested evaluation. The policy data 1734 may represent a network policy that is causing prohibition of communication between the queried endpoints. For example, the translation engine 1700 may have a set of translation rules indicating how particular routing criteria are to be represented as network policies, such as the standardized examples of policy data described herein.

Figure 18:
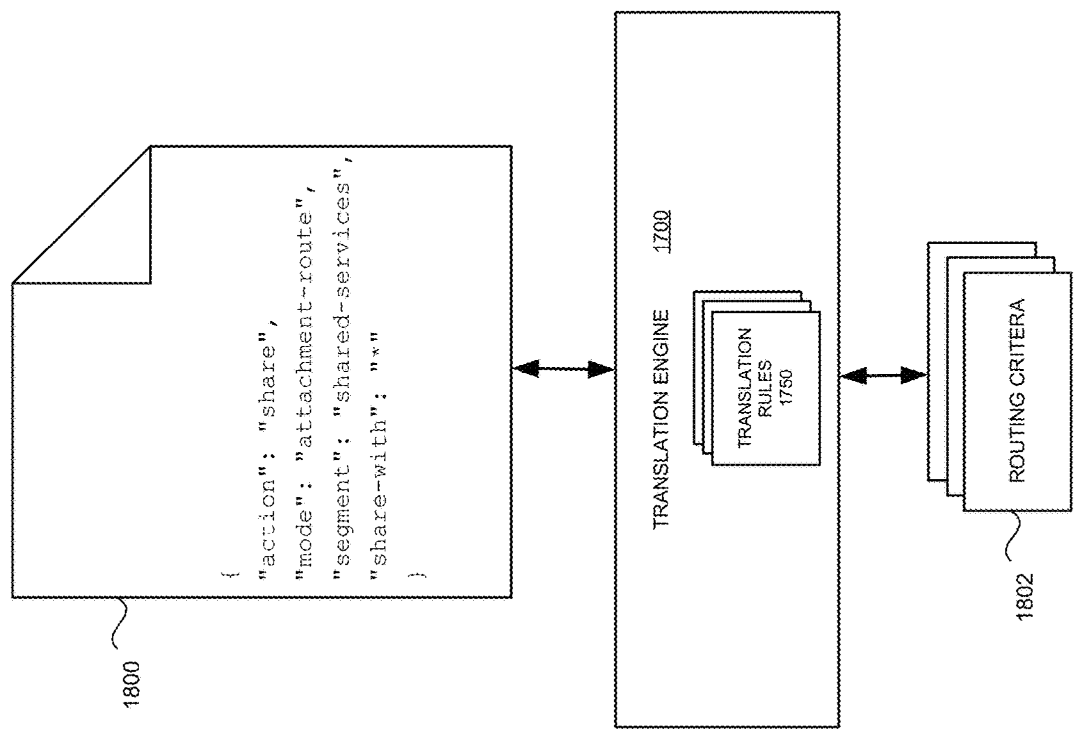
FIG. 18 is a block diagram of an illustrative policy-based network statement translated to lower-level implementation details and vice versa according to some embodiments.

FIG. 18 illustrates an example of translation of policy data to routing criteria, and of reasoning engine output data to policy data. The illustrated operations may be performed when, for example, policy data is to be evaluated by a reasoning engine 1210 against a network model 1710, when the reasoning engine 1210 produces output indicating one or more routing criteria that are causing a prohibition or permission of communication between endpoints, or in any other scenario in which network polices are to be translated to or from lower-level routing data.

Table 3 below includes an example of policy data that may be used to define a shared segment within a VPC-WAN, and attach a VPC to the shared segment. In the policy data, the VPC will be accessible by endpoints in other segments named “segment 1” and “segment 2.”

TABLE 3

```
{
  "core-network-configuration": {
    "edge-locations": [
      {"location": "east"},
      {"location": "west"}
    ]
  },
  "segments": [
    {"name": "segment 1"},
    {"name": "segment 2"},
    {"name": "shared-services"}
  ],
  "segment-actions": [
    {
      "action": "share",
      "mode": "attachment-route",
      "segment": "shared-services",
      "share-with": "*"
    }
  ],
  "attachment-policies": [
    {
      "rule-number": 1000,
      "conditions": [{
          "type": "resource-id",
          "operator": "equals",
          "value": "vpc-123"
      }],
      "action": {
        "association-method": "constant",
        "segment": "shared-services"
      }
    }
  ]
}
```

In this example, computing resources in the VPC (e.g., an authentication server) are to be made available to instances executing in other segments of the VPC-WAN. The specific policy data that defines this effect is in the "segment-actions" section, where a "share" action for the "shared-services" segment has a "shared-with" attribute of "*". In this particular implementation of the network policy language, the "*" may be a wild card and the manner in which it is used may indicate that attachments to the "shared-services" segment, including "vpc-123," are to be shared with all other segments and attachments thereto. This high-level policy statement in about four lines may be mapped to dozens or hundreds of lower-level implementation operations. For example, routes to "vpc-123" and any other attachment to the "shared-services" segment are to be propagated to all other attachments to all other segments in all other regions, including regions "east" and "west" as defined in the "edge-locations" section. Moreover, because bi-directional communication may be needed (e.g., to establish TCP connections), routes providing communication to all other attachments to all other segments in all other regions are to be propagated for use by the "vpc-123" attachment and any other attachment to the "shared services" segment. This example illustrates the declarative nature of the policy data and its mapping to underlying implementation operations that may be an order of magnitude greater in number than the policies represented by the policy data.

As shown in FIG. 18, policy data 1800 includes an excerpt from the "segment-actions" segment in Table 3 above. The translation engine 1700 may use a set of translation rules 1750 to translate this policy data 1800 into a set of routing criteria 1802, including any number of routes and routing rules for propagating the routes as described above. Illustratively, this translation may be performed when a deployed network is to be validated against the policy data that was used to deploy the network.

In some embodiments, translation of policy data 1800 into routing criteria 1802 may include generating metadata regarding the implementation actions that are to implement policies specified in policy data, and/or generating metadata regarding the routing criteria 1802 deployed to implement the policies. The metadata may reference or otherwise associate individual routing criteria (or subsets thereof) with the portions of the policy data from which the routing criteria was generated. For example, the rule in Table 3 that attaches the "vpc-123" isolated network to the "shared-services" segment may result in: addition of routes to the "shared-services" segment-specific route table used by one or more gateway nodes to route traffic associated with the segment; addition of routes to a gateway node or other routing device of the "vpc-123" isolated network to route traffic to the gateway node(s) associated with the segment; addition of some or all of those routes to route tables for other segments due to the shared nature of the "shared-services" segment; etc. The routes may be tagged or otherwise associated with metadata regarding the portion of the policy data from which the routes are derived. The metadata may be used to trace routes back to higher-level policy data during a subsequent translation operation, as described below.

In addition, or alternatively, the translation engine 1700 may use a second set of translation rules to translate the routing criteria 1802 (or a subset thereof) into the policy data 1800. Illustratively, this translation may be performed when the reasoning engine 1210 generates output indicating why a particular set of endpoints is or is not permitted to communicate, and that output includes routing criteria 1802.

In some embodiments, translation of routing criteria 1802 into policy data 1800 may include evaluating metadata associated with routing criteria that affect a particular communication, such as routing data prohibiting or otherwise not permitting communication between two endpoints, or routing data permitting communication between two endpoints. When the reasoning engine 1210 identifies a particular routing criterion or set of routing criteria that are affecting a queried communication path, metadata associated with the identified routing criterion or criteria may be evaluated. For example, metadata generated during translation of policy data into the routing criterion may be evaluated to determine the portion of the policy data from which the identified routing criterion was derived. Based on this metadata, the translation engine 1700 may produce output in the form of one or more high-level declarative policy statements that are affecting the queried communication path.

Figure 19:
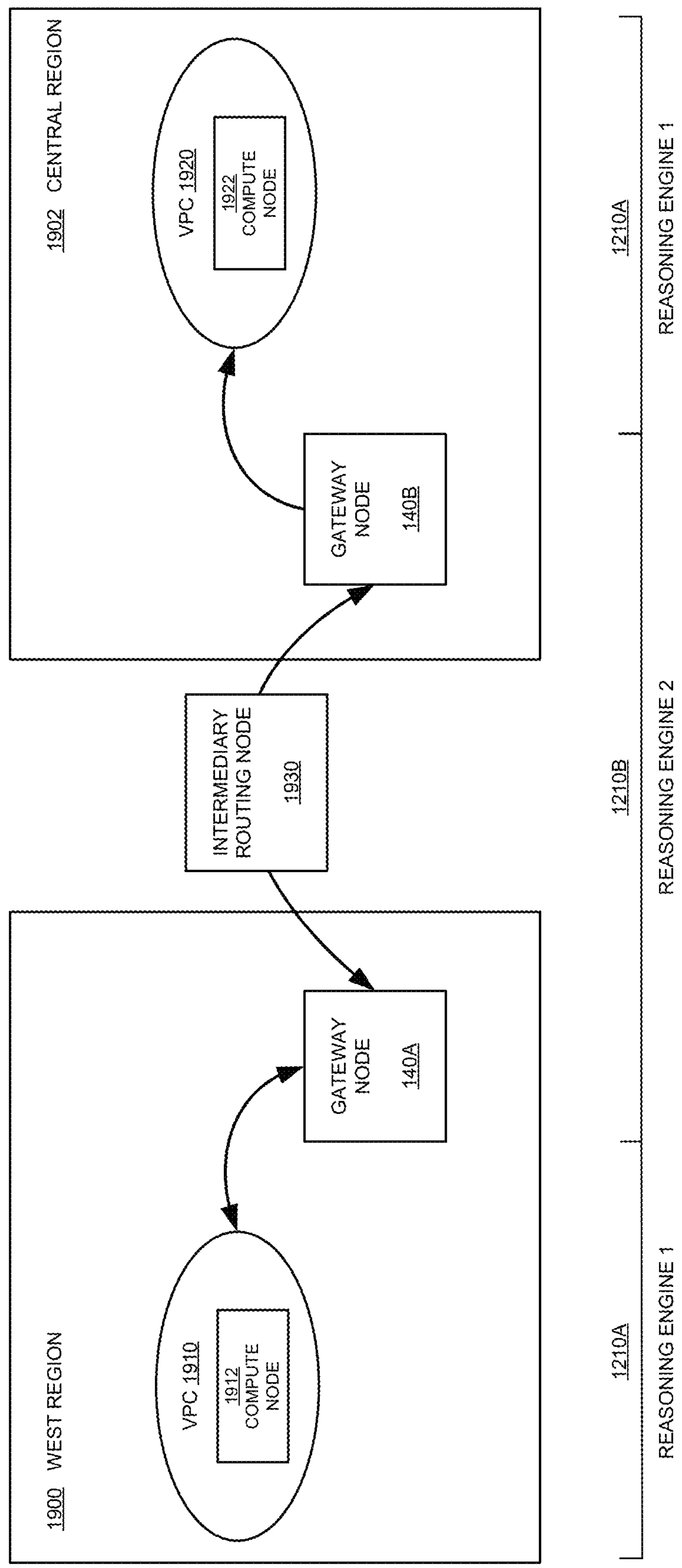
FIG. 19 is a block diagram of evaluation of a cross-region network according to some embodiments.

In some embodiments, different portions of a network may not be able to be evaluated using a single reasoning engine, or it may otherwise be desirable to evaluate different portions of a network using different reasoning engines. FIG. 19 illustrates an example in which models of different portions of a deployed network are evaluated using different reasoning engines. As shown, a deployed network may include regions 1900 and 1902. In region 1900, an isolated network such as VPC 1910 may be attached to a segment. The VPC 1910 may include a compute node 1912. In region 1902, an isolated network such as VPC 1920 may be attached to the segment. The VPC 1920 may include a compute node 1922.

One particular reasoning engine 1210A may be configured to evaluate connectivity and other network queries and validation requests within isolated networks, while a separate reasoning engine 1210B may be configured to evaluate connectivity and other network queries and validation requests between regions. In this embodiment, to evaluate connectivity between compute nodes 1912 and 1922, both reasoning engines may be used. For example, a first analysis may be performed using reasoning engine 1210A to determine connectivity between compute node 1812 and a gateway node 140A that serves as the gateway to other regions. A second analysis may be performed using reasoning engine 1210B to determine connectivity between gateway node 140A in region 1900 and gateway node 140B in region 1902. A third analysis may be performed using reasoning engine 1210A again, this time to evaluate connectivity between gateway node 140B and compute node 1920 in VPC 1922.

If the communication to be analyzed is bi-directional, then the reciprocal evaluations may be performed using reasoning engine 1210A to evaluate connectivity from compute node 1920 to gateway node 140B, reasoning engine 1210B to evaluate connectivity from gateway node 140B to gateway node 140A, and reasoning engine 1210A to evaluate connectivity from gateway node 140A to compute node 1912.

In some embodiments, a full evaluation of connectivity between two points may not be possible using the reasoning engines if an opaque intermediary is present. For example, an intermediary routing node 1930 may be a firewall or some other routing device for which routing rules are not available to any reasoning engine. In this case, the reasoning engine(s) may determine connectivity to and/or from the intermediary routing node 1930, and may produce output indicating that a separate inspection of the routing criteria used by intermediary routing node 1930 will be required to fully evaluate the query.

Example Evaluation System

Figure 20:
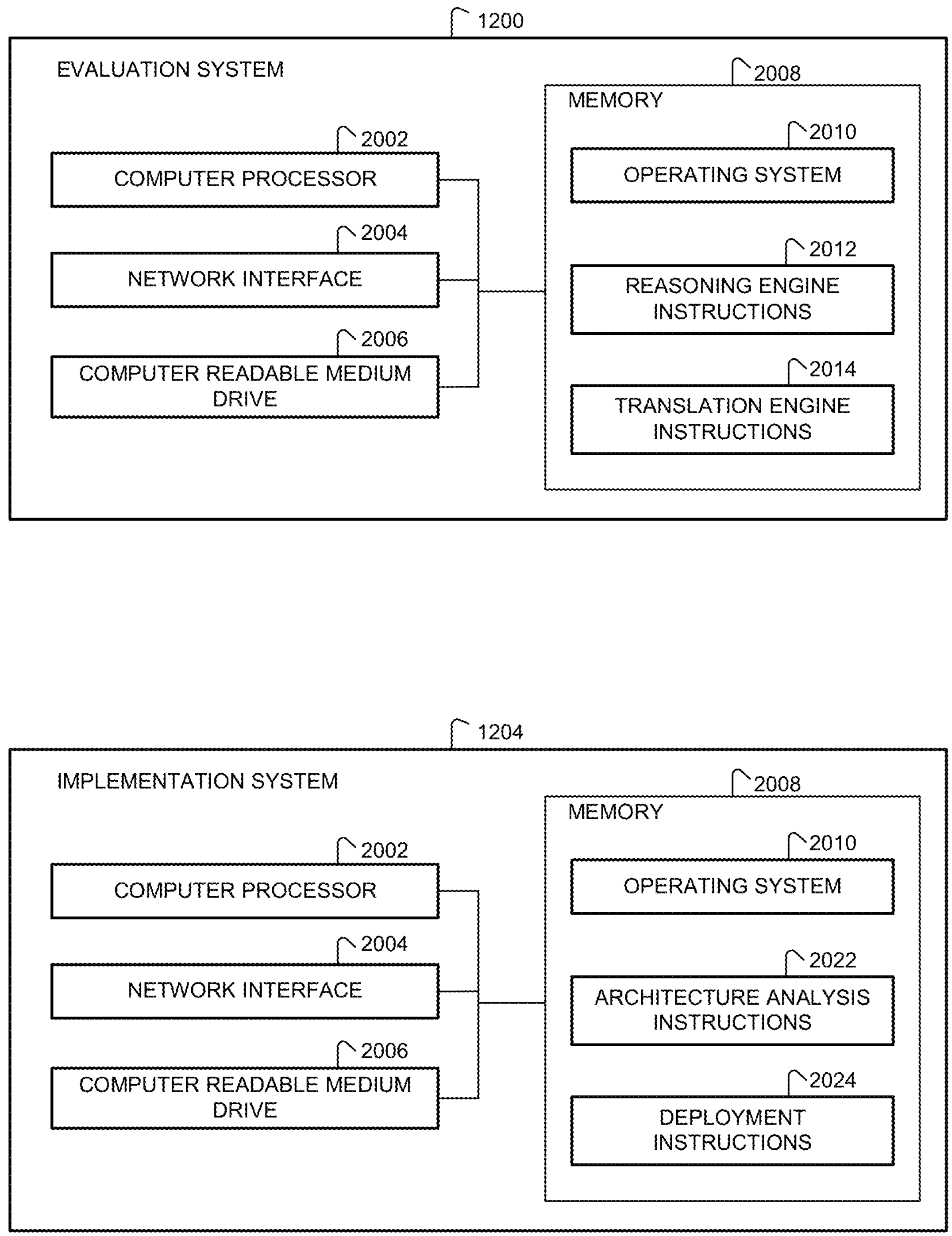
FIG. 20 is a block diagram of an illustrative evaluation system and an illustrative implementation system configured to implement features of some embodiments.

FIG. 20 illustrates various components of an evaluation system 1200 configured to implement various functionality described herein. The evaluation system 1200 may be implemented on a physical host computing device of the cloud provider network 100, such as a control server 112 or a compute server 122.

In some embodiments, as shown, an evaluation system 1200 may include: one or more computer processors 2002, such as physical central processing units ("CPUs"); one or more network interfaces 2004, such as a network interface cards ("NICs"); one or more computer readable medium drives 2006, such as a high density disk ("HDDs"), solid state drives ("SSDs"), flash drives, and/or other persistent non-transitory computer-readable media; and one or more computer readable memories 2008, such as random access memory ("RAM") and/or other volatile non-transitory computer-readable media.

The computer readable memory 2008 may include computer program instructions that one or more computer processors 2002 execute and/or data that the one or more computer processors 2002 use in order to implement one or more embodiments. For example, the computer readable memory 2008 can store an operating system 2010 for general administration and operation of the evaluation system 1200. As another example, the computer readable memory 2008 may store reasoning engine instructions 2012 for evaluating network models and queries. As another example, the computer readable memory 2008 may include translation engine instructions 2014 for translating declarative network policy data into lower-level routing data, and vice versa.

FIG. 20 further illustrates various components of an implementation system 1204 configured to implement various functionality described herein. The implementation system 1204 may be implemented on a physical host computing device of the cloud provider network 100, such as a control server 112 or a compute server 122.

In some embodiments, as shown, an implementation system 1204 may include: one or more computer processors 2002, such as physical central processing units ("CPUs"); one or more network interfaces 2004, such as a network interface cards ("NICs"); one or more computer readable medium drives 2006, such as a high density disk ("HDDs"), solid state drives ("SSDs"), flash drives, and/or other persistent non-transitory computer-readable media; and one or more computer readable memories 2008, such as random access memory ("RAM") and/or other volatile non-transitory computer-readable media.

The computer readable memory 2008 may include computer program instructions that one or more computer processors 2002 execute and/or data that the one or more computer processors 2002 use in order to implement one or more embodiments. For example, the computer readable memory 2008 can store an operating system 2010 for general administration and operation of the implementation system 1204. As another example, the computer readable memory 2008 may store architecture analysis instructions 2022 for evaluating network architectures, such as to determine a configuration of firewalls and gateway node routing information to enforce traffic symmetricity as described in greater detail below. As another example, the computer readable memory 2008 may include deployment instructions 2024 for deploying routing data to gateway nodes and firewalls, and otherwise deploying networks and changes to networks.

Enforcing Symmetric Traffic Flow for Use of Firewalls

Figure 21:
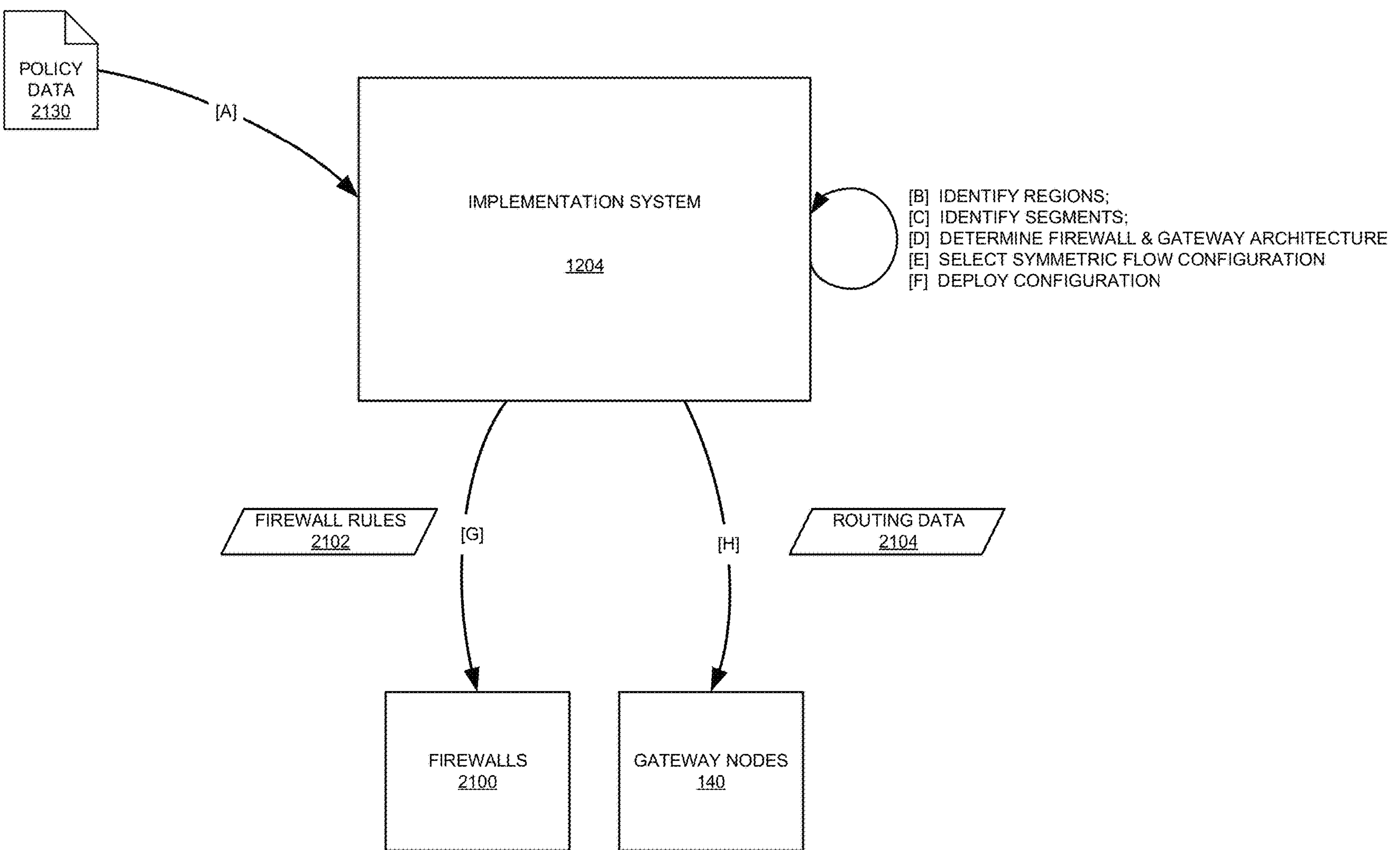
FIG. 21 is a block diagram of illustrative data flows and interactions between an implementation system and various gateway nodes and firewalls according to some embodiments.

FIG. 21 illustrates data flows and interactions between an implementation system 1204 and various gateway nodes 140 and firewalls 2100 to determine and implement routing configurations to enforce symmetric flow of traffic across regions when firewalls are to be used.

The implementation system 1204 may receive policy data 2130 at [A]. For example, the policy data 2130 may be received from a data store or a computing system, such as a client computing device 1202. In some embodiments, a user such as a network administrator managing a private network, such as a VPC-WAN to be implemented within the cloud provider network 100, may use the client computing device 1202 to submit, to the implementation system 1204, policy data 2130 representing a network policy to be implemented or changed. For example, the policy data 2130 may be in the form of one or more declarative statements provided in a standardized format, such as using JSON, XML, YAML, or the like as described above. The policy data 2130 may be a complete network policy for a private network to be deployed (e.g., policy data 300 as described above), or policy data regarding a change to a network policy of a private network that has already been deployed. Changes to network polices may include changes affecting objects that are part of the private network, properties of those objects, actions affecting the objects, or the like. For example, a change may be or include: addition of a segment, removal of a segment, modification to a segment property, addition of a route filter, or removal of a route filter.

The implementation system 1204 may analyze the policy data to determine various architectural characteristics of the network and/or of changes to be deployed to the network. At [B], the implementation system 1204 may identify the regions of the network. For example, in the illustrative policy data shown in Table 3, the "edge-locations" section identifies two regions: "west" and "east." To implement these regions, at least one gateway node may be configured in each region to route traffic associated with the network. Although the description and examples that follow focus on two regions with one gateway node per region, the examples are illustrative only and are not intended to be limiting, required, or exhaustive. In some embodiment, a network may have three or more regions. In some embodiments, individual regions may have multiple gateway nodes (e.g., a region may have two or more availability zones, and each availability zone may have one or more gateway nodes as described in greater detail above).

At [C], the implementation system 1204 may identify one or more segments of the network. The segments may be single-region segments or cross-region segments. Some networks may have combination of single region segments and cross-region segments. In the illustrative policy data shown in Table 3, the "segments" section includes three segments: "segment 1," "segment 2," and "shared-services." In some embodiments, by default the segments may be cross-region segments due to the specification of two regions in the policy data, without any property applied to a segment indicating it is to be a single region segment or otherwise only span a subset of the available segments. To implement these segments, routing information may be generated for the gateway nodes to route segment traffic within and across regions, and to isolate traffic of the segments from each other as described in greater detail above.

In some cases, certain segments may be permitted to communicate with each other. For example, in the illustrative policy data shown in Table 3, the "shared-services" segment is to be accessible from any other segment via sharing of routes to/from the segment. In this case, "segment-1" may communicate with "shared-services," "segment-2" may communicate with "shared-services," while "segment-1" and "segment-2" may remain isolated from each other due to a lack of route sharing between these two segments. To protect the "shared-services" segment from any undesirable traffic of "segment-1" and "segment-2," and vice versa, the policy data may specify that cross-segment communications are to be passed through a firewall for inspection.

At [D], the implementation system 1204 may determine the firewall and gateway node architecture of the network. As described above, the gateway node architecture may depend on the regions and particular configurations thereof. Firewalls may be deployed one region, all regions, or some subset thereof.

At [E], the implementation system 1204 may select a traffic symmetricity enforcement configuration to ensure that bi-directional traffic is routed across symmetric paths in each direction, thus allowing any firewall(s) in the path to maintain and use appropriate state data. The traffic symmetricity enforcement configuration may depend on the particular manner in which firewalls are implemented across the network. For example, not all regions have firewalls, then a "hub and spoke" configuration may be selected. As another example, if all regions have firewalls, then a "full mesh" configuration may be selected in which each cross-region packet is inspected by a firewall in each region. As another example, if all regions have firewalls but it is desired to avoid inspecting packets with multiple firewalls, then an "modified full mesh" or "modified hub and spoke" configuration may be used in which intra-region traffic is inspected by the in-region firewall, but cross-region traffic is inspected by only one firewall in one of the regions regardless of the direction in which the packets are being forwarded.

To implement the selected traffic symmetricity enforcement configuration, the implementation system 1204 or some other system may generate routing data for gateway nodes and/or firewall rules for firewalls. Illustratively, route table data may be generated for gateway nodes and firewall rules may be generated for one or more firewalls, as described below with respect to several example configuration.

At [F], the implementation system 1204 may deploy routing information to implement the desired traffic symmetricity enforcement configuration. As shown, firewall rules 2102 may be deployed to the firewall(s) in the network at [G], and routing data 2104 may be deployed to the gateway nodes in the network at [H].

Several example configurations of gateway nodes and firewalls that may be used to enforce traffic symmetricity will now be described. The examples are illustrative only, and are not intended to be limiting, required, or exhaustive. In some embodiments, additional, fewer, and/or alternative configurations may be used. For example, some embodiments may include combinations of aspects of one or more of the configurations described herein.

Figure 22:
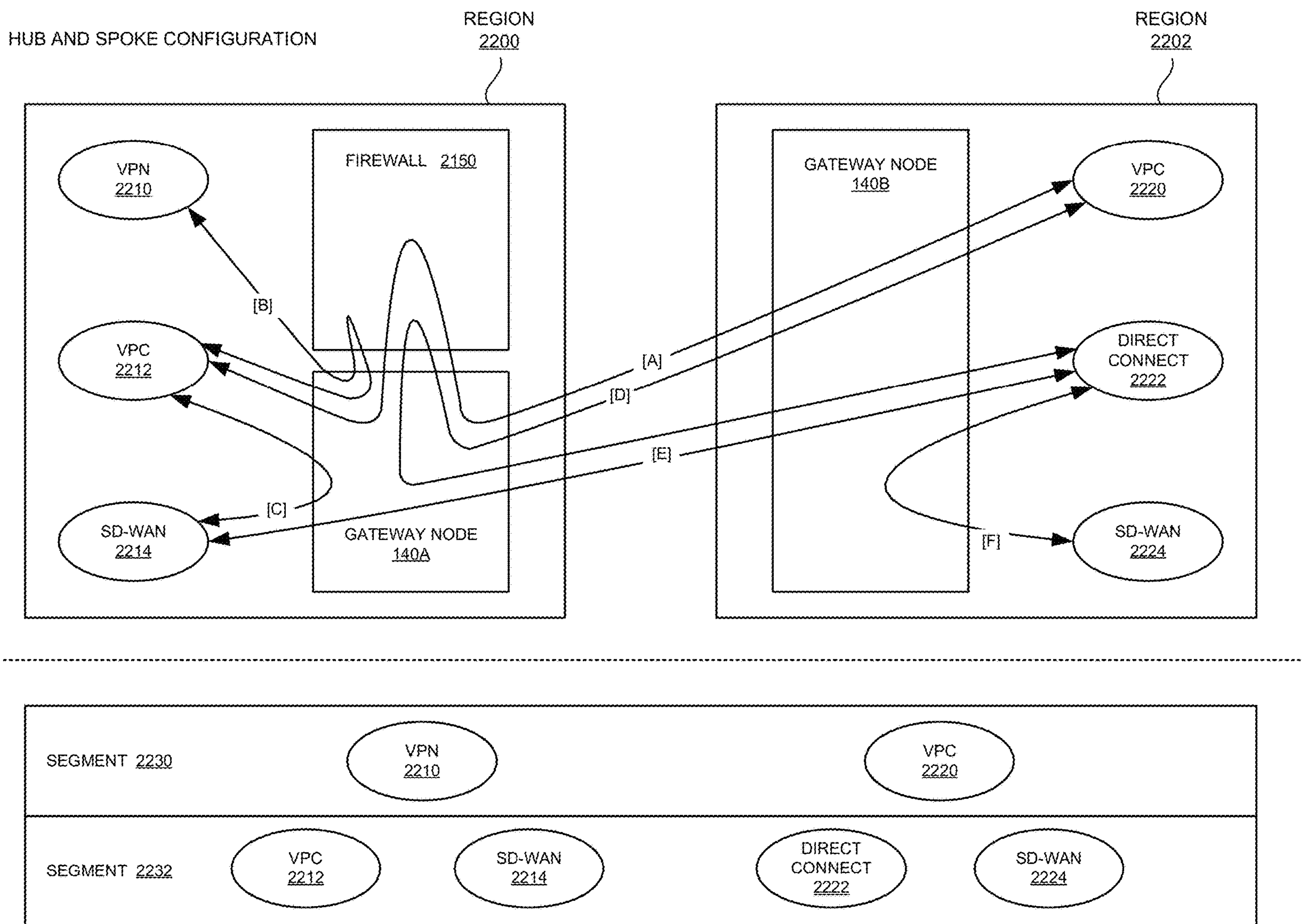
FIG. 22 is a block diagram of an illustrative architecture to enforce traffic symmetricity across regions for using a firewall, according to some embodiments.

FIG. 22 illustrates data flows and interactions between gateway nodes, a firewall, and endpoints in multiple regions when the regions have been configured to enforce traffic symmetricity for use of the firewall. In some embodiments, the illustrated architecture and configuration of gateway nodes and firewalls may be used in scenarios where a firewall has not been deployed to some regions, but a network policy of inspecting cross-segment traffic by a firewall is to be implemented. In such cases, a region in which a firewall has been implemented may be configured as a hub, while other regions in which no firewall has been deployed may be configured as spokes. When cross-segment traffic is communicated, the traffic may be routed to a hub region that includes a firewall. If the destination for the traffic is within the hub region, then the traffic may be routed to that destination after inspection by the firewall. Otherwise, if the destination traffic is in another spoke region, then the traffic may be routed to the other spoke region after inspection by the firewall in the hub region. Advantageously, this architecture allows for centralized management of firewall rules and deployment of a small number of firewalls (e.g., one), and may thus reduce the administration burden on clients.

The illustrated embodiment includes two regions: regions 2200 and 2202. Each region may include or be associated with one or more gateway nodes that manage the routing of traffic into and out of regions, and within the regions themselves. For example, region 2200 includes gateway node 140A, firewall 2150, and three isolated networks: VPN 2210, VPC 2212, and SD-WAN 2214. Region 2202 includes gateway node 140B and three isolated networks of its own: VPC 2220, direct connect 2222, and SD-WAN 2224.

There may be two segments implemented in the network—segments 2230 and 2232—and those segments may cross regions. Such segments may be referred to as cross-region segments. Segment 2230 may include VPN 2210 and VPC 2220. Segment 2232 may include VPC 2212, SD-WAN 2214, VPC 2220, and SD-WAN 2224. The example attachments to the segments in FIG. 22 are illustrative only, and are not intended to be limiting, required, or exhaustive. In some embodiments, fewer, additional, and/or alternative attachments (e.g., isolated networks and/or connections with the internet) may be present.

Policy data may indicate that any cross-segment communication between segments 2230 and 2232 is to be routed through a firewall, even if the communication is an intra-region communication. The policy data may further indicate that any intra-segment communication is not to be routed through a firewall, even if the communication is a cross-region communication. Based on this configuration of regions, firewalls, segments, and firewall policy, the implementation system 1204 may determine to use a hub and spoke architecture and configure the gateway nodes 140A, 140B accordingly.

In particular, routing data may be deployed to gateway node 140B to route cross-segment traffic (traffic between segments 2230 and 2232) to gateway node 140A for inspection by firewall 2150 in region 2200. The routing data may be a routing table, or routing table data to be added to a routing table to be used by gateway node 140B to route traffic. The routing table data may indicate that for any packet sent from an endpoint in an attachment to segment 2232 to a destination in segment 2230—or vice versa—the next hop is gateway node 140A.

Additional routing data may be deployed to gateway node 140A. The additional routing data may be routing table data indicating that the next hop is firewall 2150 for all traffic coming from gateway node 140B and addressed to an endpoint in a different segment than the source endpoint.

Further routing data may be deployed to gateway node 140B to route intra-segment traffic (traffic wholly within segment 2230 or 2232) to the destination within region 2202 without first going to gateway node 140A in region 2200, unless the destination is in region 2200.

Additional routing data may be deployed to gateway node 140A to route intra-segment traffic (traffic wholly within segment 2230 or 2232) to or towards the destination without first going through firewall 2150.

Several example bi-directional flows will now be described, which make use of the routing data deployed to gateway nodes 140A and 140B in various ways to enforce traffic symmetricity through firewall 2150 when required.

At [A], an endpoint within VPC 2220 may send a packet (e.g., a SYN TCP packet to start a handshake) to an endpoint within VPC 2212. As shown, the two endpoints are in different segments and in different regions. Thus, the communication is a cross-region cross-segment communication. The packet may be routed to gateway node 140B within region 2202, which based on its routing data forwards the packet to gateway node 140A (e.g., because the packet must be passed through a firewall, which is in region 2200). Gateway node 140A determines that the packet is from segment 2230 to segment 2232 (e.g., based on packet routing metadata as described above) and, based on its routing data, forwards the packet to firewall 2150. Firewall 2150 may apply one or more rules to determine whether to drop the packet or forward it on to its destination. If the packet is to be forwarded on, it may be forwarded back to gateway node 140A which, based on its routing data, forwards the packet from the firewall 2150 on to VPC 2212.

A return packet from VPC 2212 (e.g., a SYN ACK TCP packet) may be sent in a symmetrical path back to VPC 2220. First, the packet is sent to gateway node 140A, which routes the packet to firewall 2150 due to the routing data deployed to gateway node 140A and the cross-segment nature of the communication. Firewall 2150 may maintain state metadata regarding the prior packet sent to VPC 2212, recognize the current packet as a response to the request, and forward the packet back to the gateway node 140A to be sent out of region 2200 and on to its destination in VPC 2220 via gateway node 140B.

At [B], an endpoint within VPC 2210 may send a packet (e.g., a SYN TCP packet to start a handshake) to an endpoint within VPC 2212. As shown, the two endpoints are in different segments but in the same region. Thus, the communication is an intra-region cross-segment communication. The packet may be routed to gateway node 140A which determines that the packet is from segment 2230 to segment 2232 (e.g., based on packet routing metadata as described above) and, based on its routing data, forwards the packet to firewall 2150. Firewall 2150 may apply one or more rules to determine whether to drop the packet or forward it on to its destination. If the packet is to be forwarded on, it may be forwarded back to gateway node 140A which, based on its routing data, forwards the packet from the firewall 2150 on to VPC 2212.

A return packet from VPC 2212 (e.g., a SYN ACK TCP packet) may be sent in a symmetrical path back to VPC 2210. First, the packet is sent to gateway node 140A, which routes the packet to firewall 2150 due to the routing data deployed to gateway node 140A and the cross-segment nature of the communication. Firewall 2150 may maintain state metadata regarding the prior packet sent to VPC 2212, recognize the current packet as a response to the request, and forward the packet back to the gateway node 140A to be sent to its destination in VPC 2210.

At [C], an endpoint within VPC 2212 may send a packet (e.g., a SYN TCP packet to start a handshake) to an endpoint within SD-WAN 2214. As shown, the two endpoints are in the same segment and the same region. Thus, the communication is an intra-region intra-segment communication. The packet may be routed to gateway node 140A which determines that the packet is being communicated wholly within segment 2232 and, based on its routing data, forwards the packet on to SD-WAN 2214 without first being sent to firewall 2150. A return packet from SD-WAN 2214 (e.g., a SYN ACK TCP packet) may be sent in a symmetrical path back to VPC 2212 via gateway node 140A without going through firewall 2150.

At [D], an endpoint within VPC 2220 may send a packet (e.g., a SYN TCP packet to start a handshake) to an endpoint within direct connect 2222. As shown, the two endpoints are in different segments but in the same region. Thus, the communication is an intra-region cross-segment communication, and therefore is to be routed through a firewall. However, region 2202 does not have a firewall; firewall 2150 is in region 2200. The packet may be routed to gateway node 140B which determines that the packet is from segment 2230 to segment 2232 (e.g., based on packet routing metadata as described above) and, based on its routing data, forwards the packet to gateway node 140A, which in turn uses its routing data to forward the packet to firewall 2150. Firewall 2150 may apply one or more rules to determine whether to drop the packet or forward it on to its destination. If the packet is to be forwarded on, it may be forwarded back to gateway node 140A which, based on its routing data, forwards the packet from the firewall 2150 back to gateway node 140B, which forwards the packet to direct connect 2222. A return packet from direct connect 2222 follows a symmetrical path back to VPC 2220, by going out of region 2202 to region 2200 and through the firewall 2150 there before being forwarded back to region 2202.

At [E], an endpoint within direct connect 2222 may send a packet (e.g., a SYN TCP packet to start a handshake) to an endpoint within SD-WAN 2214. As shown, the two endpoints are in the same segment but different regions. Thus, the communication is a cross-region intra-segment communication. The packet may be routed to gateway node 140B which forwards the packet on to gateway node 140A in the destination region 2200. Gateway node 140A determines that the packet is being communicated wholly within segment 2232 and, based on its routing data, forwards the packet on to SD-WAN 2214 without first being sent to firewall 2150. A return packet from SD-WAN 2214 (e.g., a SYN ACK TCP packet) may be sent in a symmetrical path back to direct connect 2222 via gateway nodes 140A and 140B without going through firewall 2150.

At [F], an endpoint within direct connect 2222 may send a packet (e.g., a SYN TCP packet to start a handshake) to an endpoint within SD-WAN 2224. As shown, the two endpoints are in the same segment and the same region. Thus, the communication is an intra-region intra-segment communication. The packet may be routed to gateway node 140B which determines that the packet is being communicated wholly within segment 2232 and, based on its routing data, forwards the packet on to SD-WAN 2224 without first being sent to region 2200 for inspection by firewall 2150. A return packet from SD-WAN 2224 (e.g., a SYN ACK TCP packet) may be sent in a symmetrical path back to VPC 222 via gateway node 140B.

Figure 23:
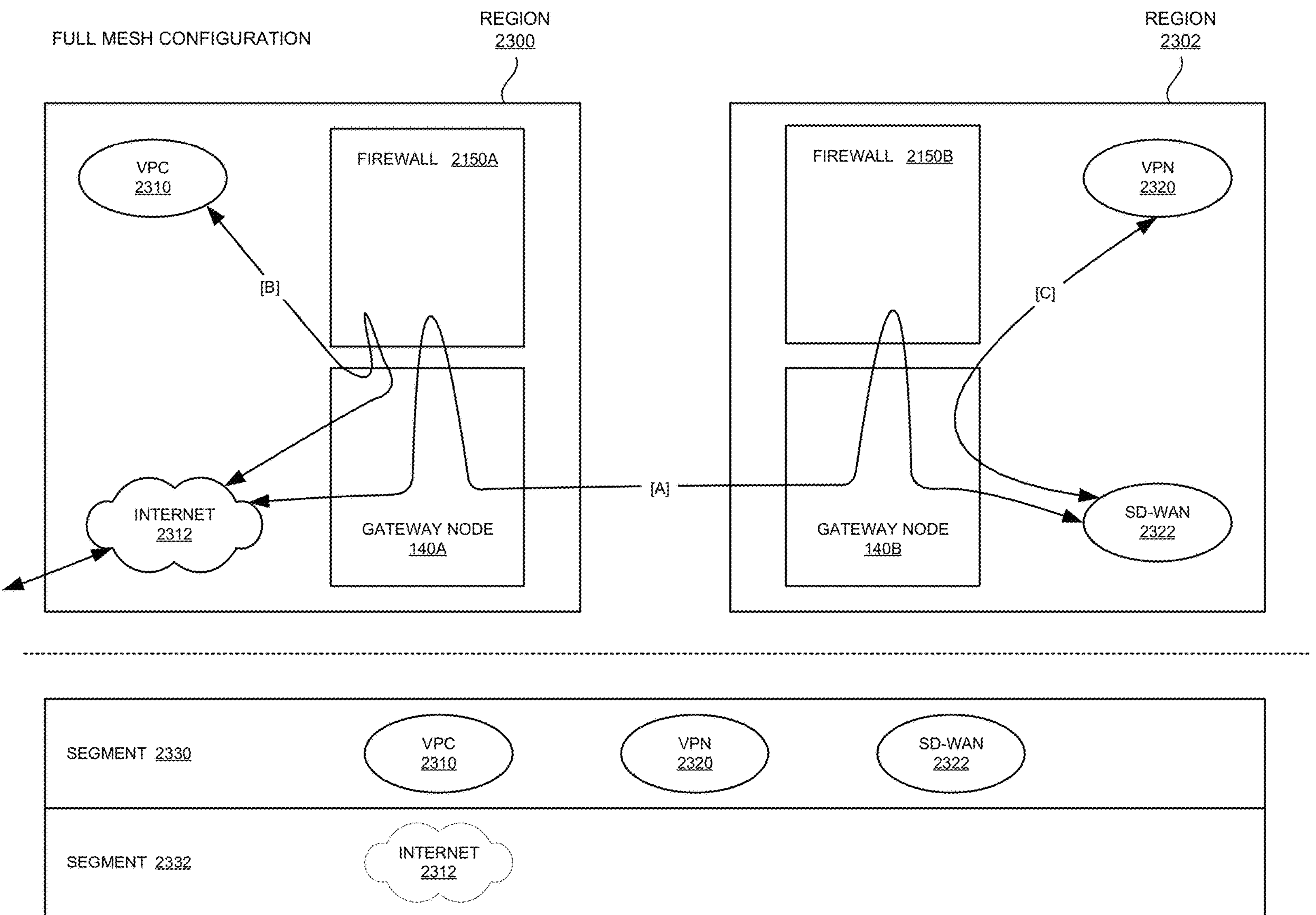
FIG. 23 is a block diagram of another illustrative architecture to enforce traffic symmetricity across regions for using firewalls, according to some embodiments.

FIG. 23 illustrates data flows and interactions between gateway nodes, firewalls, and endpoints in multiple regions when the regions have been configured to enforce traffic symmetricity for use of the firewalls. In some embodiments, the illustrated architecture and configuration of gateway nodes and firewalls may be used in scenarios where a firewall has been deployed to each of the regions, and a network policy of inspecting cross-segment traffic using a firewall is to be implemented. In such cases, when cross-region, cross-segment traffic is communicated, the traffic may be routed through a firewall in each region. Advantageously, this architecture allows for intra-region traffic to remain within the region, without first being communicated out of the region for inspection by an extra-region firewall.

The illustrated embodiment includes two regions: regions 2300 and 2302. Each region may include or be associated with one or more gateway nodes that manage the routing of traffic into and out of regions, and within the regions themselves. Each region may also include one or more firewalls to inspect traffic and apply firewall rules. For example, region 2300 includes gateway node 140A, firewall 2150A, isolated network VPC 2310, and an ingress/egress point for access to/from the internet, shown as internet 2312. Region 2302 includes gateway node 140B, firewall 2150B, and two isolated networks of its own: VPN 2320 and SD-WAN 2322.

There may be two segments implemented in the network—segments 2330 and 2332—and those segments may cross regions. Segment 2330 may include VPC 2310, VPN 2320, and SD-WAN 2322. Segment 2332 may include internet 2312. The example attachments to the segments in FIG. 23 are illustrative only, and are not intended to be limiting, required, or exhaustive. In some embodiments, fewer, additional, and/or alternative attachments (e.g., isolated networks and/or connections with the internet) may be present.

Policy data may indicate that any cross-segment communication between segments 2330 and 2332 is to be inspected by a firewall, even if the communication is an intra-region communication. The policy data may further indicate that any intra-segment communication is not to be routed through a firewall, even if the communication is a cross-region communication. Based on this configuration of regions, firewalls, segments, and firewall policy, the implementation system 1204 may determine to use an architecture in which firewalls in each region are leveraged, and configure the gateway nodes 140A, 140B accordingly.

In particular, routing data may be deployed to gateway nodes 140A and 140B to route cross-segment traffic (traffic between segments 2330 and 2332) through the firewalls 2150A and 2150B in each region 2300 and 2302, respectively, for firewall inspection prior to being forwarded on to a destination. The routing data may be a routing table, or routing table data to be added to a routing table to be used by gateway nodes 140A, 140B to route traffic. For example, the routing table data may indicate that for any packet sent from an endpoint in an attachment to segment 2330 to a destination in segment 2332, or vice versa, the next hop is the firewall 2150A or 2150B within the region in which the respective gateway node 140A or 140B sits.

Additional routing data may be deployed to gateway nodes 140A and 140B to route intra-segment traffic. For example, the routing data may indicate that for any packet sent from an endpoint in an attachment to a segment to a destination within the same segment, the packet is to be routed toward the destination (e.g., to the attachment within the region, or to a gateway node in another region) without first being inspected by a firewall.

Several example bi-directional flows will now be described, which make use of the routing data deployed to gateway nodes 140A and 140B in various ways to enforce traffic symmetricity through firewalls 2150A and 2150B when required.

At [A], an endpoint within SD-WAN 2322 may send a packet (e.g., a SYN TCP packet to start a handshake) to an endpoint within internet 2312. As shown, the two endpoints are in different segments and in different regions. Thus, the communication is a cross-region cross-segment communication. The packet may be routed to gateway node 140B within region 2302, which based on its routing data forwards the packet to firewall 2150B for inspection prior to sending the packet to gateway node 140A in region 2300. Firewall 2150B may apply one or more rules to determine whether to drop the packet or forward it on to its destination. If the packet is to be forwarded on, it may be forwarded back to gateway node 140B which, based on its routing data, forwards the packet from firewall 2150B on to gateway node 140A.

In some embodiments, the implementation system 1204 may deploy firewall rules to firewall 2150A and/or firewall 2150B that indicate any outgoing traffic (e.g., any packet leaving a segment) is permitted to be sent; no further inspection is required. In this case, the firewalls 2150A and 2150B may still maintain flow metadata about such requests, for use as described below.

Gateway node 140A determines that the packet is from segment 2330 to segment 2332 (e.g., based on packet routing metadata as described above) and, based on its routing data, forwards the packet to firewall 2150A. Firewall 2150A may apply one or more rules to determine whether to drop the packet or forward it on to its destination. If the packet is to be forwarded on, it may be forwarded back to gateway node 140A which, based on its routing data, forwards the packet from the firewall 2150A on to internet 2312.

A return packet from internet 2312 (e.g., a SYN ACK TCP packet) may be sent in a symmetrical path back to SD-WAN 2322. First, the packet is sent to gateway node 140A, which routes the packet to firewall 2150A due to the routing data deployed to gateway node 140A and the cross-segment nature of the communication. Firewall 2150A may maintain state metadata regarding the prior packet sent to internet 2312, recognize the current packet as a response to the request, and forward the packet back to the gateway node 140A to be sent out of region 2300 and on to its destination in SD-WAN 2322 via gateway node 140B. Gateway node 140B routes the packet to firewall 2150B due to the routing data deployed to gateway node 140B and the cross-segment nature of the communication. Like firewall 2150A, firewall 2150B may maintain state metadata regarding the prior packet sent to internet 2312, recognize the current packet as a response to the request, and forward the packet back to the gateway node 140B to be sent on to its destination in SD-WAN 2322.

At [B], an endpoint within VPC 2310 may send a packet (e.g., a SYN TCP packet to start a handshake) to an endpoint within internet 2312. As shown, the two endpoints are in different segments but in the same region. Thus, the communication is an intra-region cross-segment communication. The packet may be routed to gateway node 140A which determines that the packet is from segment 2330 to segment 2332 (e.g., based on packet routing metadata as described above) and, based on its routing data, forwards the packet to firewall 2150A. Firewall 2150A may apply one or more rules to determine whether to drop the packet or forward it on to its destination. If the packet is to be forwarded on, it may be forwarded back to gateway node 140A which, based on its routing data, forwards the packet from the firewall 2150 on to internet 2312.

A return packet from internet 2312 (e.g., a SYN ACK TCP packet) may be sent in a symmetrical path back to VPC 2310. First, the packet is sent to gateway node 140A, which routes the packet to firewall 2150A due to the routing data deployed to gateway node 140A and the cross-segment nature of the communication. Firewall 2150A may maintain state metadata regarding the prior packet sent to internet

2312, recognize the current packet as a response to the request, and forward the packet back to the gateway node 140A to be sent to its destination in VPC 2310.

At [C], an endpoint within SD-WAN 2322 may send a packet (e.g., a SYN TCP packet to start a handshake) to an endpoint within VPN 2320. As shown, the two endpoints are in the same segment and the same region. Thus, the communication is an intra-region intra-segment communication. The packet may be routed to gateway node 140B which determines that the packet is being communicated wholly within segment 2330 and, based on its routing data, forwards the packet on to VPN 2320 without first being sent to firewall 2150. A return packet from VPN 2320 (e.g., a SYN ACK TCP packet) may be sent in a symmetrical path back to SD-WAN 2322 via gateway node 140B without going through firewall 2150B.

Figure 24:
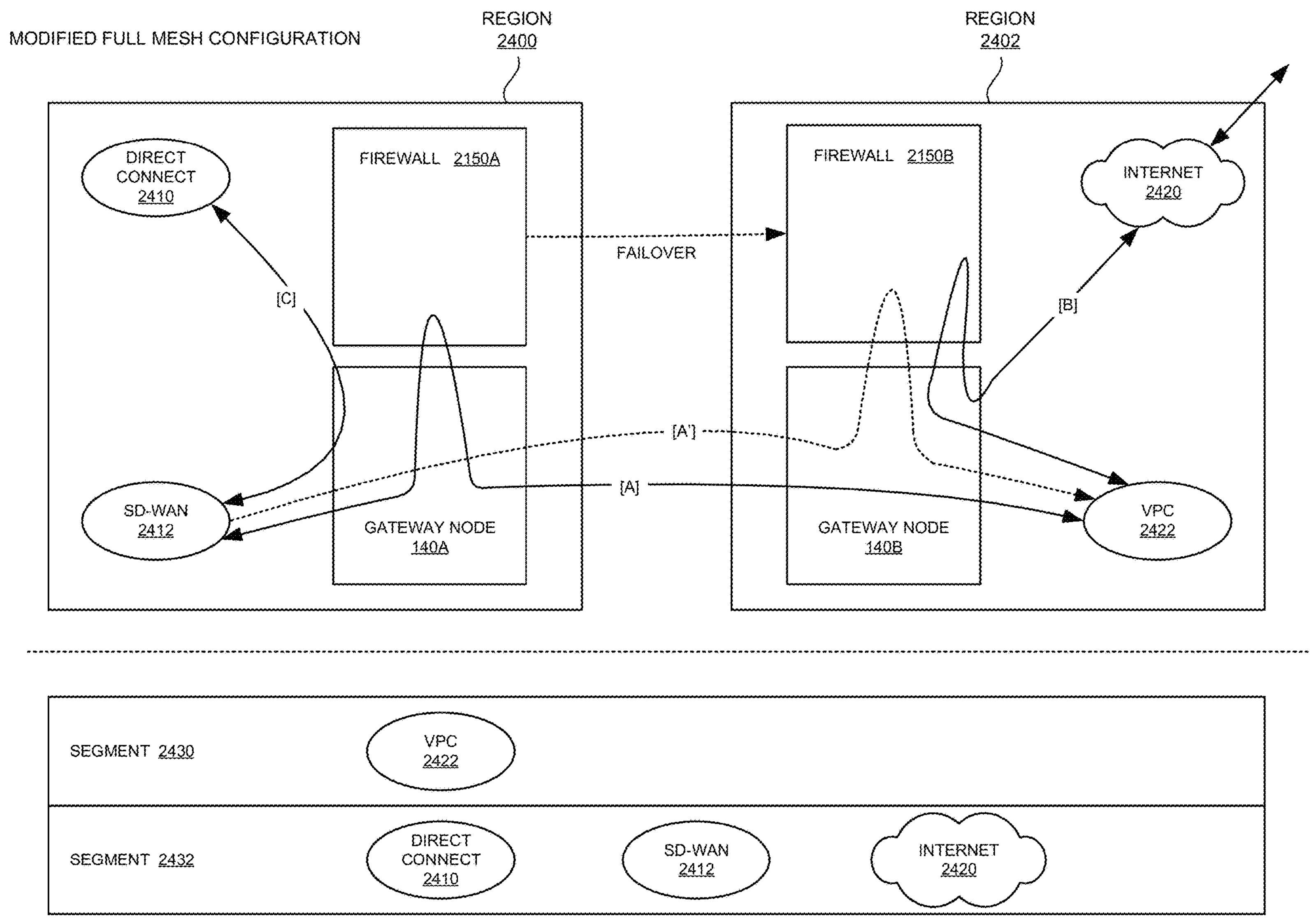
FIG. 24 is a block diagram of another illustrative architecture to enforce traffic symmetricity across regions for using firewalls, according to some embodiments.

FIG. 24 illustrates data flows and interactions between gateway nodes, firewalls, and endpoints in multiple regions when the regions have been configured to enforce traffic symmetricity for use of the firewalls. In some embodiments, the illustrated architecture and configuration of gateway nodes and firewalls may be used in scenarios where a firewall has been deployed to each of the regions, and a network policy of inspecting cross-segment traffic using a firewall is to be implemented. In such cases, when cross-region, cross-segment traffic is communicated, the traffic may be routed through a firewall in one of the two regions, rather than a firewall in each region. When intra-region, cross-segment traffic is communicated, the traffic may be routed through an in-region firewall. Advantageously, this architecture allows for intra-region traffic to remain within the region, without first being communicated out of the region for inspection by an extra-region firewall. Moreover, cross-region traffic is routed through only one firewall, thereby minimizing latency, computing resource requirements, and the like in comparison with implementing firewall inspection in multiple regions.

The illustrated embodiment includes two regions: regions 2400 and 2402. Each region may include or be associated with one or more gateway nodes that manage the routing of traffic into and out of regions, and within the regions themselves, and one or more firewalls to inspect traffic and apply firewall rules. For example, region 2400 includes gateway node 140A, firewall 2150A, and two isolated networks: direct connect 2410 and SD-WAN 2412. Region 2402 includes gateway node 140B, firewall 2150B, and two isolated networks of its own: an ingress/egress point to/from the internet, shown as internet 2420, and VPC 2422.

There may be two segments implemented in the network—segments 2430 and 2432—and those segments may cross regions. Segment 2430 may include VPC 2422. Segment 2432 may include direct connect 2410, SD-WAN 2412, and internet 2420. The example attachments to the segments in FIG. 24 are illustrative only, and are not intended to be limiting, required, or exhaustive. In some embodiments, fewer, additional, and/or alternative attachments (e.g., isolated networks and/or connections with the internet) may be present.

Policy data may indicate that any cross-segment communication between segments 2430 and 2432 is to be routed through a firewall, even if the communication is an intra-region communication. The policy data may further indicate that any intra-segment communication is not to be routed through a firewall, even if the communication is a cross-region communication. Based on this configuration of regions, firewalls, segments, and firewall policy, the implementation system 1204 may determine to use an architecture in which firewalls in each region are leveraged, and configure the gateway nodes 140A, 140B accordingly.

In particular, routing data may be deployed to gateway nodes 140A and 140B to route cross-segment traffic (traffic between segments 2430 and 2432) through only one of the firewalls 2150A or 2150B for firewall inspection prior to being forwarded on to a destination. The routing data may be a routing table, or routing table data to be added to a routing table to be used by gateway nodes 140A, 140B to route traffic. For example, the routing table data deployed to gateway node 140A may indicate that for any packet sent from an endpoint in an attachment to segment 2430 to a destination in segment 2432, or vice versa, the next hop is firewall 2150A. Routing table data deployed to gateway node 140B may distinguish between cross-region cross-segment traffic on the one hand, and intra-region cross-segment traffic on the other hand. For example, the routing table data may indicate that for any cross-region traffic originating in an endpoint within region 2402 and addressed to an endpoint in region 2400, the next hop is gateway node 140A, while for any intra-region cross-segment traffic, the next hop is firewall 2150B.

Additional routing data may be deployed to gateway nodes 140A and 140B to route intra-segment traffic. For example, the routing data may indicate that for any packet sent from an endpoint in an attachment to a segment to a destination within the same segment, the packet is to be routed toward the destination (e.g., to the attachment within the region, or to a gateway node in another region) without first being inspected by a firewall.

Several example bi-directional flows will now be described, which make use of the routing data deployed to gateway nodes 140A and 140B in various ways to enforce traffic symmetricity through firewalls 2150A and 2150B when required.

At [A], an endpoint within VPC 2422 may send a packet (e.g., a SYN TCP packet to start a handshake) to an endpoint within SD-WAN 2412. As shown, the two endpoints are in different segments and in different regions. Thus, the communication is a cross-region cross-segment communication. The packet may be routed to gateway node 140B within region 2402, which based on its routing data forwards the packet to gateway node 140A in region 2400. Gateway node 140A determines that the packet is from segment 2430 to segment 2432 (e.g., based on packet routing metadata as described above) and, based on its routing data, forwards the packet to firewall 2150A. Firewall 2150A may apply one or more rules to determine whether to drop the packet or forward it on to its destination. If the packet is to be forwarded on, it may be forwarded back to gateway node 140A which, based on its routing data, forwards the packet from the firewall 2150A on to internet 2420.

A return packet from SD-WAN 2412 (e.g., a SYN ACK TCP packet) may be sent in a symmetrical path back to VPC 2422. First, the packet is sent to gateway node 140A, which routes the packet to firewall 2150A due to the routing data deployed to gateway node 140A and the cross-segment nature of the communication. Firewall 2150A may maintain state metadata regarding the prior packet sent to SD-WAN 2412, recognize the current packet as a response to the request, and forward the packet back to the gateway node 140A to be sent out of region 2400 and on to its destination in VPC 2422 via gateway node 140B. Gateway node 140B routes the packet on to its destination in VPC 2422.

At [B], an endpoint within internet 2420 may send a packet (e.g., a SYN TCP packet to start a handshake) to an endpoint within VPC 2422. As shown, the two endpoints are in different segments but in the same region. Thus, the communication is an intra-region cross-segment communication. The packet may be routed to gateway node 140B which determines that the packet is from segment 2430 to segment 2432 (e.g., based on packet routing metadata as described above) and, based on its routing data, forwards the packet to firewall 2150B. Firewall 2150B may apply one or more rules to determine whether to drop the packet or forward it on to its destination. If the packet is to be forwarded on, it may be forwarded back to gateway node 140B which, based on its routing data, forwards the packet from the firewall 2150B on to VPC 2422.

A return packet from VPC 2422 (e.g., a SYN ACK TCP packet) may be sent in a symmetrical path back to internet 2420. First, the packet is sent to gateway node 140B, which routes the packet to firewall 2150B due to the routing data deployed to gateway node 140B and the cross-segment nature of the communication. Firewall 2150B may maintain state metadata regarding the prior packet sent to VPC 2422, recognize the current packet as a response to the request, and forward the packet back to the gateway node 140B to be sent to its destination in internet 2420.

At [C], an endpoint within direct connect 2410 may send a packet (e.g., a SYN TCP packet to start a handshake) to an endpoint within SD-WAN 2412. As shown, the two endpoints are in the same segment and the same region. Thus, the communication is an intra-region intra-segment communication. The packet may be routed to gateway node 140A which determines that the packet is being communicated wholly within segment 2432 and, based on its routing data, forwards the packet on to SD-WAN 2412 without first being sent to firewall 2150A. A return packet from SD-WAN 2412 (e.g., a SYN ACK TCP packet) may be sent in a symmetrical path back to direct connect 2410 via gateway node 140A without going through firewall 2150A.

In some embodiments, firewalls may be configured such that if one fails, the other can seamlessly perform firewall inspection when necessary. In such a case, routing criteria may be updated at the gateway nodes to use one firewall instead of an unavailable firewall. For example, after failover of firewall 2150A to 2105B, the flow shown as [A] may be altered to the flow shown in dotted line as [A']. As another example, firewall 2150B may failover to firewall 2150A, and routing criteria may be updated at the gateway nodes 140A and 140B to use firewall 2150A instead of firewall 2150B. In such a case (not shown), the intra-region cross-segment communication shown as [B] between the internet 2420 and VPC 2422 may be routed by gateway node 140B to gateway node 140A, inspected by firewall 2150A in region 2400, and then routed by gateway node 140A back to region 2402 via gateway node 140B. Although firewall failover and flow alteration are only shown in FIG. 24 with respect to the modified full mesh configuration, in some embodiments other architectures such as those illustrated in FIGS. 22 and 23 may include such firewall failover.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Disjunctive language such as the phrase “at least one of X, Y, Z,” unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as “a” or “an” should generally be interpreted to include one or more described items. Accordingly, phrases such as “a device configured to” are intended to include one or more recited devices. Such one or more recited devices can also be collectively configured to carry out the stated recitations. For example, “a processor configured to carry out recitations A, B and C” can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:

obtaining policy data regarding a private network to be implemented on a cloud provider network, wherein the cloud provider network is organized into a plurality of regions;

determining that the policy data indicates traffic between a first segment of the private network and a second segment of the private requires firewall inspection, wherein each segment of the private network comprises one or more endpoints, wherein a first region of the plurality of regions comprises a first gateway node and a first firewall, and wherein a second region of the plurality of regions comprises a second gateway node; and deploying, to the first gateway node, first routing criteria specifying that traffic associated with the one or more endpoints in the first segment in the first region and the one or more endpoints in the second segment in the second region is to be routed to the first firewall, wherein second routing criteria deployed to the first gateway node specifies that traffic associated with a first subset of the one or more endpoints in the first segment in the first region and a second subset of the one or more endpoints in the first segment in the second region is permitted without firewall inspection;

wherein the computer-implemented method is executed under control of a computing system comprising memory and one or more computer processors configured to execute specific instructions.

2. The computer-implemented method of claim 1, further comprising deploying the private network as a virtual private cloud-based wide area network connecting two or more client on-premise networks to each other via the cloud provider network.

3. The computer-implemented method of claim 1, further comprising deploying the second routing criteria to the first gateway node, where the second routing criteria does not specify that the traffic associated with the first subset of the one or more endpoints in the first segment in the first region and the second subset of the one or more endpoints in the first segment in the second region is to be routed to the first firewall.

4. The computer-implemented method of claim 1, further comprising deploying, to the second gateway node, third routing criteria specifying that the traffic associated with the one or more endpoints in the first segment in the first region and the one or more endpoints in the second segment in the second region is to be routed to a second firewall in the second region.

5. The computer-implemented method of claim 4, further comprising deploying, to the first firewall, a firewall rule regarding the traffic associated with the one or more endpoints in the first segment in the first region and the one or more endpoints in the second segment in the second region, wherein no firewall rule regarding the traffic associated with the one or more endpoints in the first segment in the first region and the one or more endpoints in the second segment in the second region is deployed to the second firewall.

6. The computer-implemented method of claim 4, further comprising deploying, to the first firewall and the second firewall, a firewall rule regarding the traffic associated with the one or more endpoints in the first segment in the first region and the one or more endpoints in the second segment in the second region.

7. The computer-implemented method of claim 4, further comprising:

deploying, to the first firewall, a first firewall rule regarding the traffic associated with the one or more endpoints in the first segment in the first region and the one or more endpoints in the second segment in the second region; and deploying, to the second firewall, a second firewall rule regarding the traffic associated with the one or more endpoints in the first segment in the first region and the one or more endpoints in the second segment in the second region, wherein the second firewall rule is different than the first firewall rule.

8. The computer-implemented method of claim 1, further comprising deploying, to the second gateway node, third routing criteria regarding the traffic associated with the one or more endpoints in the first segment in the first region and the one or more endpoints in the second segment in the second region, wherein the second region comprises a second firewall, and wherein the third routing criteria does not specify that the traffic associated with the one or more endpoints in the first segment in the first region and the one or more endpoints in the second segment in the second region is to be routed to the second firewall.

9. The computer-implemented method of claim 1, further comprising deploying, to the second gateway node, third routing criteria regarding traffic to a fourth endpoint in the first segment, wherein the fourth endpoint is in a third region of the plurality of regions, wherein the third routing criteria specifies that the traffic to the fourth endpoint is to be routed through the first gateway node, and wherein the first gateway node is configured to route, to the first firewall, the traffic to the fourth endpoint.

10. The computer-implemented method of claim 1, further comprising deploying, to the second gateway node, third routing criteria regarding traffic to a fourth endpoint in the first segment, wherein the fourth endpoint is in the second region, wherein the third routing criteria specifies that the traffic to the fourth endpoint is to be routed through the first gateway node, and wherein the first gateway node is configured to route, to the first firewall, the traffic to the fourth endpoint.

11. A system comprising:

computer-readable memory storing executable instructions; and one or more processors in communication with the computer-readable memory and programmed by the executable instructions to at least:

obtain policy data regarding a private network to be implemented on a cloud provider network, wherein the cloud provider network is organized into a plurality of regions;

determine that the policy data indicates traffic between a first segment of the private network and a second segment of the private network requires firewall inspection, wherein each segment of the private network comprises one or more endpoints, wherein a first region of the plurality of regions comprises a first gateway node and a first firewall, and wherein a second region of the plurality of regions comprises a second gateway node; and deploy, to the first gateway node, first routing criteria specifying that traffic associated with the one or more endpoints in the first segment in the first region and the one or more endpoints in the second segment in the second region is to be routed to the first firewall, wherein second routing criteria deployed to the first gateway node specifies that traffic associated with a first subset of the one or more endpoints in the first segment in the first region and a second subset of the one or more endpoints in the first segment in the second region is permitted without firewall inspection.

12. The system of claim 11, wherein the one or more processors are programmed by further executable instructions to deploy the second routing criteria to the first gateway node, where the second routing criteria does not specify that the traffic associated with the first subset of the one or more endpoints in the first segment in the first region and the second subset of the one or more endpoints in the first segment in the second region is to be routed to the first firewall.

13. The system of claim 11, wherein the one or more processors are programmed by further executable instructions to deploy, to the second gateway node, third routing criteria specifying that the traffic associated with the one or more endpoints in the first segment in the first region and the one or more endpoints in the second segment in the second region is to be routed to a second firewall in the second region.

14. The system of claim 13, wherein the one or more processors are programmed by further executable instructions to deploy, to the first firewall, a firewall rule regarding the traffic associated with the one or more endpoints in the first segment in the first region and the one or more endpoints in the second segment in the second region, wherein no firewall rule regarding the traffic associated with the one or more endpoints in the first segment in the first region and the one or more endpoints in the second segment in the second region is deployed to the second firewall.

15. The system of claim 13, wherein the one or more processors are programmed by further executable instructions to deploy, to the first firewall and the second firewall, a firewall rule regarding the traffic associated with the one or more endpoints in the first segment in the first region and the one or more endpoints in the second segment in the second region.

16. The system of claim 11, wherein a first endpoint of the one or more endpoints in the first segment is associated with an attachment to the first segment, and wherein the attachment comprises one of: a virtual private cloud ("VPC"), a virtual private network ("VPN"), a software-defined wide area network ("SD-WAN"), a direct connection to a private network external to the cloud provider network, or an ingress/egress point for internet access.

* * * * *

UNITED STATES PATENT AND TRADEMARK OFFICE

CERTIFICATE OF CORRECTION

PATENT NO. : 11,991,211 B1
APPLICATION NO. : 17/643781
DATED : May 21, 2024
INVENTOR(S) : Hrushikesh Jaibheem Gangur It is certified that error appears in the above-identified patent and that said Letters Patent is hereby corrected as shown below:

In the Specification

In Column 7, Line 29, delete "of the of the" and insert --of the--.

In Column 16, Line 17, delete "serer" and insert --server--.

In Column 17, Line 16 (Approx.), delete ""segments"" and insert --"segments"--.

In the Claims

In Column 56, Claim 1, Line 15, delete "private" and insert --private network--.

Signed and Sealed this
Fifteenth Day of April, 2025

Coke Morgan Stewart
*Acting Director of the United States Patent and Trademark Office*